United States Patent
Tsuji et al.

(10) Patent No.: US 7,403,315 B2
(45) Date of Patent: Jul. 22, 2008

(54) COLOR CONVERSION DEFINITION CREATING METHOD, COLOR CONVERSION DEFINITION CREATING APPARATUS, AND COLOR CONVERSION DEFINITION CREATING PROGRAM STORAGE MEDIUM

(75) Inventors: Tetsuya Tsuji, Kanagawa (JP); Kiyomi Tamagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 938 days.

(21) Appl. No.: 10/406,549

(22) Filed: Apr. 4, 2003

(65) Prior Publication Data
US 2003/0189716 A1    Oct. 9, 2003

(30) Foreign Application Priority Data

| Apr. 4, 2002 | (JP) | ............................. 2002-102903 |
| Sep. 6, 2002 | (JP) | ............................. 2002-261174 |
| Nov. 14, 2002 | (JP) | ............................. 2002-331112 |

(51) Int. Cl.
*G03F 3/08* (2006.01)
*G06F 15/00* (2006.01)
*G06K 9/00* (2006.01)

(52) U.S. Cl. .................... 358/523; 358/1.9; 382/167

(58) Field of Classification Search ............... 358/1.9, 358/523, 518, 520, 522, 534, 539, 1.16; 382/167, 382/162

See application file for complete search history.

(56) References Cited

U.S. PATENT DOCUMENTS

| 5,359,437 A | 10/1994 | Hibi |
| 5,636,290 A * | 6/1997 | Kita et al. .................... 382/167 |
| 5,838,333 A * | 11/1998 | Matsuo ........................ 345/604 |
| 6,002,806 A | 12/1999 | Morikawa |
| 6,229,916 B1 | 5/2001 | Ohkubo |
| 6,266,152 B1 * | 7/2001 | Nakajima .................... 358/1.9 |
| 6,686,953 B1 * | 2/2004 | Holmes ....................... 348/179 |
| 6,781,716 B1 * | 8/2004 | Yoda .......................... 358/1.9 |
| 6,807,315 B1 * | 10/2004 | Walmsley et al. ........... 382/263 |

(Continued)

FOREIGN PATENT DOCUMENTS

EP    2001-103329 A    4/2001

(Continued)

OTHER PUBLICATIONS

Japanese Patent Office Action dated May 24, 2007 for corresponding Japanese Patent Application No. 2002-331112.

*Primary Examiner*—Madeleine A Nguyen
(74) *Attorney, Agent, or Firm*—Sughrue Mion, PLLC

(57) ABSTRACT

A color conversion definition (CCD) creating method of creating CCD converting coordinate points within a color reproduction area (CRA) of 1st device mediating between an image and image data, in 1st RGB color space, depending on 1st device, into coordinate points within CRA of printing in CMYK color space for printing, has 1st CCD creating step of creating 1st CCD for converting the coordinate points within CRA of 1st device in 1st RGB color space into coordinate points within CRA of 2nd device mediating between an image and image data, in 2nd RGB color space, depending on 2nd device, CRA of 2nd device being closer to CRA of the printing than 1st device, and 2nd CCD creating step of creating 2nd CCD for converting the coordinate points within CRA of 2nd device in 2nd RGB color space into coordinate points within CRA of printing in CMYK color space.

3 Claims, 38 Drawing Sheets

U.S. PATENT DOCUMENTS

| | | | |
|---|---|---|---|
| 6,839,151 B1* | 1/2005 | Andree et al. | 358/2.1 |
| 7,145,574 B2* | 12/2006 | Kondo | 345/591 |
| 2001/0038468 A1 | 11/2001 | Hiramatsu | |
| 2001/0040983 A1* | 11/2001 | Nishikawa | 382/109 |
| 2002/0018225 A1 | 2/2002 | Okamoto | |
| 2002/0029715 A1* | 3/2002 | Ogatsu et al. | 101/494 |
| 2002/0033957 A1* | 3/2002 | Takahata et al. | 358/1.9 |
| 2002/0054314 A1* | 5/2002 | Takahashi | 358/1.13 |
| 2002/0071120 A1* | 6/2002 | Tamagawa | 356/402 |
| 2002/0122193 A1* | 9/2002 | Shirasawa | 358/1.9 |
| 2003/0019381 A1* | 1/2003 | Yamamoto | 101/483 |
| 2003/0090691 A1 | 5/2003 | Okamoto | |
| 2003/0103222 A1* | 6/2003 | Kato et al. | 358/1.9 |
| 2006/0007459 A1* | 1/2006 | Kumada et al. | 358/1.9 |
| 2006/0203270 A1* | 9/2006 | Shirasawa | 358/1.9 |

FOREIGN PATENT DOCUMENTS

| | | |
|---|---|---|
| JP | 9-83824 | 3/1997 |
| JP | 2001-103329 | 4/2001 |
| JP | 2002-27270 | 1/2002 |
| JP | 2002-64722 | 2/2002 |
| JP | 2002-094813 A | 3/2002 |

\* cited by examiner

COLOR CONVERSION DEFINITION CREATING METHOD, COLOR CONVERSION DEFINITION CREATING APPARATUS, AND COLOR CONVERSION DEFINITION CREATING PROGRAM STORAGE MEDIUM

BACKGROUND OF THE INVENTION

1. Field of the Invention

The present invention relates to color conversion definition creating method and color conversion definition creating apparatus for creating a color conversion definition converting coordinate points within a color reproduction area of a device (for example, a printer) mediating between an image and image data in a three-dimensional color space (an RGB color space) taking as axes R (red), G (green) and B (blue), depending on the device, into coordinate points within a color reproduction area of printing in a four-dimensional color space (a CMYK color space) taking as axes C (cyan), M (magenta), Y (yellow) and K (black) for printing, and a color conversion definition creating program storage medium storing a color conversion definition creating program which causes a computer to operate as the color conversion definition creating apparatus when the color conversion definition creating program is incorporated into the computer.

2. Description of the Related Art

Hitherto, as an apparatus for applying a high quality of color processing for printing to image data representative of an image, there is known an apparatus (for example, U.S. Pat. No. 6,002,806) in which upon receipt of CMY data representative of a combination (coordinate points within a CMY color space) of density values of C, M and Y, CMYK data representative of a combination (coordinate points within a CMYK color space) of dot % of C, M, Y, and K is outputted.

This apparatus receives the CMY data and performs a color processing. Even recently, while there are proposed various improvements on such an apparatus, such an apparatus is concerned with a well-established technology in base, and there exist many skilled persons capable of operating such an apparatus to perform a high quality of color processing (this color processing is referred to "set up").

Recently, as color management technologies have come into wide use, there is increased a necessity for obtaining a high quality of CMYK data for printing in accordance with color data other than the CMY data. As one of the examples, it may be required that upon receipt of RGB data representative of a combination (coordinate points within a RGB color space) of values of R, G, and B, an image, in which a color of a printed image obtained through an output of a printer based on the RGB data is faithfully reproduced, is printed.

When the RGB data is converted into the CMYK data, not only it is necessary to convert the RGB data into the CMYK data capable of obtaining the same color as the colorimetric value, but also it is necessary to convert the RGB data into the CMYK data excellent in printability. A large factor as to whether there is the printability is a value of K. And when the RGB data is converted into the CMYK data capable of obtaining the same color as the colorimetric value, there is a need to determine the value of K in accordance with a printing company, a printing machine and the like.

Even if the use of various techniques makes it possible that the RGB data is converted into the CMYK data excellent in printability and capable of obtaining the same color as the colorimetric value, matching of a color of an image outputted from a specified printer in accordance with the RGB data to a color of an image reproduced in printing is concerned with only areas wherein a color reproduction area of the printer overlaps with a color reproduction area of printing. In the event that a color reproduction area (an outline of a printer profile) of the printer is greatly different from a color reproduction area (an outline of a printing profile) of printing (usually, the outline of the printing profile is narrower), this involves a problem as to how a portion exceeding out of the color reproduction area of printing, of the color reproduction area of the printer is converted into the color reproduction area of printing (this is referred to as a gamut mapping) so that an image, which has a color very approximating the color of the image outputted from the printer in accordance with the RGB data and involves no feeling of wrongness in a color tone, is reproduced by a printing

SUMMARY OF THE INVENTION

In view of the foregoing, it is an object of the present invention to provide color conversion definition creating method and color conversion definition creating apparatus for creating a color conversion definition converting coordinate points (RGB data) within a color reproduction area of a device, for example, a printer, in an RGB color space, depending on the device, into coordinate points (CMYK data) within a color reproduction area of printing in a CMYK color space for printing, in which even when the color reproduction area of the device is different from the color reproduction area of printing, the RGB data is converted into the CMYK data capable of obtaining a printed image reproducing a color very approximating a color of an image outputted from the device in accordance with the RGB data, and a color-conversion definition creating program storage medium storing a color conversion definition creating program which causes a computer to operate as the color conversion definition creating apparatus when the color conversion definition creating program is incorporated into the computer.

To achieve the above-mentioned object, the present invention provides a first color conversion definition creating method of creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating method comprising:

a first color conversion definition creating step of creating a first color conversion definition for converting the coordinate points within the color reproduction area of the first device in the first RGB color space into coordinate points within a color reproduction area of a second device mediating between an image and image data, in a second RGB color space, depending on the second device, the color reproduction area of the second device being closer to the color reproduction area of the printing than the first device; and a second color conversion definition creating step of creating a second color conversion definition for converting the coordinate points within the color reproduction area of the second device in the second RGB color space into coordinate points within a color reproduction area of printing in a CMYK color space.

In the event that a color reproduction area of a device dealing with an RGB color space is greatly different from a color reproduction area of printing dealing with a CMYK color space, there is found no technology of converting data (RGB data) representative of coordinate points within the RGB color space dealt with by the device into data (CMYK data) representative of coordinate points within the CMYK color space for printing with great accuracy.

According to the present invention, there are created a first color conversion definition for converting coordinate points within the RGB color space (the first RGB color space depending on the first device) depending on a device into coordinate points within the second RGB color space, depending on the second device, the color reproduction quality (gamut) of the second device being closer to the color reproduction quality, and a second color conversion definition for converting the coordinate points within the second RGB color space into coordinate points within the CMYK color space. A provision of such two steps of color conversion definitions makes it possible to convert the coordinate points within the first RGB color space depending on the first device into coordinate points (CMYK data) within the CMYK color space capable of obtaining a printing image of which a color is very close to a color of an image dealt with by the first device. It is noted that the two stages of color conversion definitions (the first color conversion definition and the second color conversion definition) are of processes of creating a color conversion definition. And thus, finally, it is acceptable that the two stages of color conversion definitions are combined into a single color conversion definition.

Here, there will be explained the reason why the intermediate RGB color space such as the second RGB color space is adopted.

To create a color conversion definition defining a three-dimensional to four-dimensional conversion from RGB data for a first device to CMYK data for printing, there is considered a method of performing a gamut mapping from the color reproduction area of the first device to the color reproduction area of printing directly, without passing through the intermediate RGB color space. However, according to this way, the gamut mapping has to be carried out in accordance with only information on the color reproduction area defined on the common color space (for example, an L*a*b* space) of a device non-dependence. Thus, there is a possibility that discontinuity of a tone and unnatural image may be caused by the gamut mapping.

In view of the foregoing, according to the present invention, the use of the intermediate RGB color space makes it possible to adopt an algorithm of the effective three-dimensional to three-dimensional conversion. The gamut mapping according to such an algorithm makes it possible to maintain the continuity of a tone and natural impression for an image. Conversion of coordinates of the intermediate RGB color space via the gamut mapping into coordinates of CMYK space for printing on an equal color basis makes it possible to obtain CMYK data excellent in printing quality, which is greatly faithful to the color expressed by the first device on a colorimetric basis, and has a preferable approximation, even if there is a difference, and is extremely less in tone damage.

In the first color conversion definition creating method according to the present invention as mentioned above, it is preferable that the first color conversion definition creating step is a step of creating a color conversion definition defining an association between the coordinate points in the first RGB color space and the coordinate points in the second RGB color space via a first coordinate conversion step, a second coordinate conversion step, and a third coordinate conversion step, the first coordinate conversion step converting coordinate points within the color reproduction area of the first device in the first RGB color space depending on the first device into the coordinate points within the color reproduction area of the first device transferred to a common color space of device non-dependence, the second coordinate conversion step converting the coordinate points within the color reproduction area of the first device transferred to the common color space, which is obtained by the first coordinate conversion step, into the coordinate points within the color reproduction area of the second device transferred to the common color space, and the third coordinate conversion step converting the coordinate points within the color reproduction area of the second device transferred to the common color space, which is obtained by the second coordinate conversion step, into the coordinate points within the color reproduction area of the second device in the second RGB color space, and wherein when a first coordinate point within the color reproduction area of the first device transferred to the common color space is converted into a second coordinate point within the color reproduction area of the second device transferred to the common color space, the second coordinate conversion step includes a first step of:

determining a first reference coordinate point in the color reproduction area of the first device transferred to the common color space, in accordance with the first coordinate point;

determining a second reference coordinate point associated with the first reference coordinate point, in the color reproduction area of the second device transferred to the common color space, in accordance with a first algorithm including a coordinate operation in at least either one of the first RGB color space and the second RGB color space; and determining the second coordinate point associated with the first coordinate point in accordance with a second algorithm using a basic difference vector that is representative of a difference between the first reference coordinate point and the second reference coordinate point.

According to the first color conversion definition creating step, there is determined the second reference coordinate point in accordance with the first algorithm including a coordinate operation in at least either one of the first RGB color space and the second RGB color space, so that the basic difference vector coupling the first reference coordinate point with the second reference coordinate point is determined. That is, in this case, a direction of a color conversion (the gamut mapping) is determined in the RGB color space (the first RGB color space or the second RGB color space) depending on the device, and the actual color conversion is performed in the common color space.

Structure of the first color conversion definition creating step as mentioned above makes it possible to determine a direction of the mapping in the RGB color space suitable for a feeling of a person, depending on the device. Accordingly, an adjustment of mapping quality is easy and in addition the actual mapping is carried out in the common color space of device non-dependence. Thus, it is possible to perform the mapping with great accuracy including the vicinity of the boundary of the color reproduction area of the device.

Here, it is preferable that the second coordinate conversion step determines:

the first reference coordinate point on the boundary of the color reproduction area of the first device transferred to the common color space, in accordance with the first coordinate point; and the second reference coordinate point on the boundary of the color reproduction area of the second device transferred to the common color space, in accordance with a first algorithm.

Determination of the first reference coordinate point and the second reference coordinate point on the boundaries of the color reproduction areas of the first device and the second device transferred to the common color space, respectively makes it possible to easily determine the basic difference vector which is an index in a direction of the color conversion.

In this case, it is acceptable that the first step in the second coordinate conversion step determines:

an intersection point of the straight line coupling a predetermined coordinate conversion reference coordinate point within a common area of the color reproduction area of the first device transferred to the common color space and the color reproduction area of the second device transferred to the common color space with the first coordinate point, and the boundary of the color reproduction area of the first device transferred to the common color space, the intersection point being determined as the first reference coordinate point;

coordinate points on the boundary of the color reproduction area of the second device transferred to the common color space, determined on the common color space in such a manner that in a case where the first reference coordinate point is out of the color reproduction area of the second device transferred to the common color space, the first reference coordinate point is transferred to the second RGB color space so that the first reference coordinate point is subjected to a mapping on the boundary of the color reproduction area of the second device in the second RGB color space, and coordinate points obtained through the mapping on the boundary of the color reproduction area of the second device are transferred to the common color space, the coordinate points on the boundary of the color reproduction area of the second device transferred to the common color space being determined as the second reference coordinate point; and an intersection point of the straight line coupling the coordinate conversion reference coordinate point with the second reference coordinate point, and a straight line passing through the first coordinate point and drawn in parallel to the direction of the basic difference vector, the intersection point being determined as a second coordinate point associated with the first coordinate point.

Further, it is acceptable that the first step in the second coordinate conversion step determines:

an intersection point of the straight line coupling a predetermined coordinate conversion reference coordinate point within a common area of the color reproduction area of the first device transferred to the common color space and the color reproduction area of the second device transferred to the common color space with the first coordinate point, and the boundary of the color reproduction area of the first device transferred to the common color space, the intersection point being determined as the first reference coordinate point;

coordinate points on the boundary of the color reproduction area of the second device transferred to the common color space, determining coordinate points coincident with the first reference coordinate point or close to the first reference coordinate point in view of a predetermined decision criterion, via a coordinate conversion process determining coordinate points in the common color space in such a manner that in a case where the first reference coordinate point is within the color reproduction area of the second device transferred to the common color space, coordinate points of a portion out of the color reproduction area of the first device transferred to the common color space, of the boundary of the color reproduction area of the second device transferred to the common color space, is transferred to the first RGB color space so that the coordinate points of the portion out of the color reproduction area of the first device transferred to the common color space are subjected to a mapping on the boundary of the color reproduction area of the first device in the first RGB color space, and coordinate points obtained through the mapping on the boundary of the color reproduction area of the first device are transferred to the common color space, the coordinate points on the boundary of the color reproduction area of the second device transferred to the common color space, before passing through the coordinate conversion process, associated with the determined coordinate points coincident with or close to the first reference coordinate point, being determined as the second reference coordinate point; and an intersection point of the straight line coupling the coordinate conversion reference coordinate point with the second reference coordinate point, and a straight line passing through the first coordinate point and drawn in parallel to the direction of the basic difference vector, the intersection point being determined as a second coordinate point associated with the first coordinate point.

Alternatively, it is acceptable that the first step in the second coordinate conversion step determines:

an intersection point of the straight line coupling a predetermined coordinate conversion reference coordinate point within a common area of the color reproduction area of the first device transferred to the common color space and the color reproduction area of the second device transferred to the common color space with the first coordinate point, and the boundary of the color reproduction area of the first device transferred to the common color space, the intersection point being determined as the first reference coordinate point;

an intersection point of a straight line parallel to a straight line coupling a third reference coordinate point with a fourth reference coordinate point, passing through the first reference coordinate point, and the boundary of the color reproduction area of the second device transferred to the common color space, determining the fourth reference coordinate point on the boundary of the color reproduction area of the first device transferred to the common color space in such a manner that in a case where the first reference coordinate point is within the color reproduction area of the second device transferred to the common color space, an intersection point of the straight line coupling the predetermined coordinate conversion reference coordinate point with the first coordinate point and the boundary of the color reproduction area of the second device transferred to the common color space is determined in form of the third reference coordinate point, and the third reference coordinate point is transferred to the first RGB color space so that the third reference coordinate point is subjected to a mapping on the boundary of the color reproduction area of the first device in the first RGB color space, and coordinate points obtained through the mapping on the boundary of the color reproduction area of the first device are transferred to the common color space, the intersection point of the straight line parallel to the straight line coupling the third reference coordinate point with the fourth reference coordinate point and the boundary of the color reproduction area of the second device being determined as the second reference coordinate point; and an intersection point of the straight line coupling the coordinate conversion reference coordinate point with the second reference coordinate point, and a straight line passing through the first coordinate point and drawn in parallel to the direction of the basic difference vector, the intersection point being determined as a second coordinate point associated with the first coordinate point.

Further alternatively, it is acceptable that the first step in the second coordinate conversion step determines:

an intersection point of the straight line coupling a predetermined coordinate conversion reference coordinate point within a common area of the color reproduction area of the first device transferred to the common color space and the color reproduction area of the second device transferred to the common color space with the first coordinate point, and the boundary of the color reproduction area of the first device transferred to the common color space, the intersection point being determined as the first reference coordinate point;

coordinate points on the boundary of the color reproduction area of the second device transferred to the common color space, determined on the common color space in such a manner that the first reference coordinate point is transferred to the first RGB color space to determine coordinate points on the first RGB color space, so that coordinate points on the second RGB color space having coordinate values associated with coordinate values of coordinate points on the first RGB color space are determined, and the coordinate points on the second RGB color space are transferred to the common color space, the coordinate points on the boundary of the color reproduction area of the second device transferred to the common color space being determined as the second reference coordinate point; and an intersection point of the straight line coupling the coordinate conversion reference coordinate point with the second reference coordinate point, and a straight line passing through the first coordinate point and drawn in parallel to the direction of the basic difference vector, the intersection point being determined as a second coordinate point associated with the first coordinate point.

Here, with respect to the above-mentioned various aspects of determining the second coordinate point associated with the first coordinate point, when the first step in the second coordinate conversion step determines the second coordinate point, it is acceptable that the feature of determination of "an intersection point of the straight line coupling the coordinate conversion reference coordinate point with the second reference coordinate point, and a straight line passing through the first coordinate point and drawn in parallel to the direction of the basic difference vector, the intersection point being determined as a second coordinate point associated with the first coordinate point" is replaced by the feature of determination of—an intersection point of a straight line passing through an intersection point of the straight line coupling the coordinate conversion reference coordinate point with the first reference coordinate point and the boundary of a predetermined area including the coordinate conversion reference coordinate point and also passing through the second reference coordinate point, and a straight line passing through the first coordinate point and drawn in parallel to the direction of the basic difference vector, the intersection point being determined as a second coordinate point associated with the first coordinate point—.

This feature makes it possible to secure an area in which a color is saved around the coordinate conversion reference coordinate point, without being subjected to a mapping.

Further, in the above-mentioned various aspects of determining the second coordinate point associated with the first coordinate point, it is preferable that the first step in the second coordinate conversion step selects, as the coordinate conversion reference coordinate point, a point on the grey axis of the common color space.

As to the coordinate conversion reference coordinate point, a color is saved as it is, without being subjected to a mapping. Accordingly, establishing the coordinate conversion reference coordinate point on the grey axis makes it possible to save the grey balance.

In the first color conversion definition creating method as mentioned above, it is preferable that the second coordinate conversion step has, before the first step, a second step of converting coordinate points within the color reproduction area of the first device transferred to the common color space into coordinate points in which the coordinate points within the color reproduction area of the first device are converted in accordance with an adaptational conversion algorithm providing such a conversion that coordinate points of white of the color reproduction area of the first device transferred to the common color space are coincident with coordinate points of white of the color reproduction area of the second device transferred to the common color space, and the first step of the second coordinate conversion step converts coordinate points of a conversion object obtained through the second step adopting a color reproduction area in which the color reproduction area of the first device transferred to the common color space is converted using the adaptational conversion algorithm.

In this case, it is preferable that the second step in the second coordinate conversion step converts coordinate points using the adaptational conversion algorithm providing such a conversion that coordinate points of white of the color reproduction area of the first device transferred to the common color space are coincident with coordinate points of white of the color reproduction area of the second device transferred to the common color space, and coordinate points of black of the color reproduction area of the first device transferred to the common color space are coincident with coordinate points of black of the color reproduction area of the second device transferred to the common color space.

In this manner, performing the first step after coincidence of white (or white and black) of the color reproduction area of the first device with white (or white and black) of the color reproduction area of the second device makes it possible to create the first color conversion definition capable of performing a color conversion with greater accuracy.

In the first color conversion definition creating method according to the present invention as mentioned above, it is preferable that the second color conversion definition creating step comprises:

a first conversion step of converting coordinate points in the second RGB color space into coordinate points within the common color space of device non-dependence in accordance with a color reproduction quality of the second device;

a second conversion step of converting the coordinate points within the common color space determined in the first conversion step into coordinate points within a CMY color space;

a first K-function creating step of setting up a first color conversion parameter and determining a first function of K from coordinate points of $C=M=Y$ of coordinate points in the CMY color space determined in the second conversion step in accordance with a data conversion algorithm for converting the coordinate points in the CMY color space into coordinate points in the CMYK color space having a printability according to the first color conversion parameter set up;

a first association creating step of determining coordinate points within the CMYK color space bound by the first function of K determined in the first K-function creating step, associated with coordinate points of $C=M=Y$ of the coordinate points within the CMY color space determined in the second conversion step, in accordance with a color reproduction quality of the printing, so that a first association for providing an association between the coordinate points in the CMY color space of $C=M=Y$ and the coordinate points in the CMYK color space is determined;

a second K-function creating step of setting up a second color conversion parameter based on the first association determined in the first association creating step instead of the first color conversion parameter, on the data conversion algorithm, and determining a second function of K from the coordinate points consisting of an arbitrary combination of C, M and Y in the CMY color space determined in the second conversion step, in accordance with the data conversion algorithm on which the second color conversion parameter is set up; and a second association creating step of determining coordinate points in the CMYK color space bound by the second function of K determined in the second K-function creating step, associated with the same coordinate points as the coordinate points in the common color space associated with the coordinate points consisting of an arbitrary combination of C, M and Y in the CMY color space determined in the second conversion step, in accordance with a color reproduction quality of the printing, so that a second association for providing an association between the coordinate points consisting of an arbitrary combination of C, M and Y in the CMY color space and the coordinate points in the CMYK color space is determined.

The second color conversion definition creating step in the first color conversion definition creating method determines the above-mentioned data conversion algorithm, that is, by way of example, a K-function using the apparatus as proposed in the above-referenced Japanese Patent publication, and determines CMYK data in such a way that a colorimetric value associated with RGB data (coordinate points within the second RGB color space) via the color reproduction quality of the second device (the profile of the second device) is the same as a colorimetric value associated with CMYK data via the color reproduction quality of printing (the printing profile), using the K-function in form of the restriction condition. This makes it possible to determine the second color conversion definition capable of obtaining a printing image excellent in the printability and faithfully reproducing a color of an image dealt with by the second device.

The way of determining the K-function is not so simple too. First, the first function of K based on CMY data of C=M=Y (on the grey axis) is determined, and the association (the first association) between the CMY data of C=M=Y (on the grey axis) and CMYK data that is faithful to the CMY data in colorimetry and is restricted by the first function of K is determined. Next, a color conversion parameter set up on the above-mentioned data conversion algorithm is altered to a color conversion parameter (a second color conversion parameter) in which an element of "taste" with respect to at least K based on the first association, is removed from a color conversion parameter (a first color conversion parameter) including the element of "taste".

In this manner, an element of "taste" with respect to at least K is removed from the above-mentioned data conversion algorithm, and then a function of K (the second function) is determined over an arbitrary combination of C, M and Y from the CMY data. This makes it possible to determine a function of K involving printability throughout the color space.

Here, it is acceptable that the second step in the second coordinate conversion step consists of a three primary colors RGB conversion step of converting coordinate points within the common color space into coordinate points within the three primary colors RGB color space, and a CMY conversion step of converting the coordinate points within the three primary colors RGB color space, which is obtained in the three primary colors conversion step, into coordinate points within the CMY color space by means of performing a logarithmic transformation for values of three primary colors R, G and B represented by the coordinate points in the three primary colors RGB color space.

In this case, it is preferable that there is provided a parameter computing step of computing a parameter for converting coordinate points within the common color space into coordinate points within the three primary colors RGB color space, in accordance with a chromaticity value of a predetermined white point on an x-y chromaticity diagram and chromaticity value of three points associated with the three primary colors of R, G and B on the x-y chromaticity diagram, and the three primary colors RGB conversion step converts the coordinate points within the common color space into the coordinate points within the three primary colors RGB color space in accordance with the parameter computed in the parameter computing step.

Further, in this case, it is preferable that parameter computing step establishes, as three points associated with the three primary colors of R, G and B, vertexes of a triangle including a color reproduction area on the x-y chromaticity diagram associated with a set of colors including full colors reproducible by a color reversal film, which vertexes are located on three straight lines on the x-y chromaticity diagram, coupling three points representative of main wavelengths of three primary colors of R, G and B of the color reproduction area on the x-y chromaticity diagram with a predetermined white point on the x-y chromaticity diagram, respectively.

To achieve the above-mentioned object of the present invention, the present invention provides a second color conversion definition creating method of creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating method comprising:

a first color conversion definition creating step of creating a first color conversion definition for converting the coordinate points within the color reproduction area of the first device in the first RGB color space into coordinate points within a color reproduction area of an imaginary second device mediating between an image and image data, in a second RGB color space, depending on the imaginary second device, the imaginary second device having a color reproduction area that is coincident with the color reproduction area for printing; and a second color conversion definition creating step of creating a second color conversion definition for converting the coordinate points within the color reproduction area of the second device in the second RGB color space into coordinate points within a color reproduction area of printing in a CMYK color space.

In the event that a color reproduction area of a device dealing with an RGB color space is greatly different from a color reproduction area of printing dealing with a CMYK color space, there is found no technology of converting data (RGB data) representative of coordinate points within the RGB color space dealt with by the device into data (CMYK data) representative of coordinate points within the CMYK color space for printing with great accuracy.

According to the present invention, there are created a first color conversion definition for converting coordinate points within the RGB color space (the first RGB color space depending on the first device) depending on a device into coordinate points within the second RGB color space, depending on the second device, the color reproduction quality (gamut) of the second device being coincident with the color reproduction quality, and a second color conversion definition for converting the coordinate points within the second RGB color space into coordinate points within the CMYK color space. A provision of such two steps of color conversion definitions makes it possible to convert the coordinate points within the first RGB color space depending on the first device into coordinate points (CMYK data) within the CMYK color space capable of obtaining a printing image of which a color is very close to a color of an image dealt with by the first device. It is noted that the two stages of color conversion definitions (the first color conversion definition and the second color conversion definition) are of processes of creating a color conversion definition. And thus, finally, it is acceptable that the two stages of color conversion definitions are combined into a single color conversion definition.

Also in the second color conversion definition creating method according to the present invention as mentioned above, it is preferable that the second color conversion definition creating step comprises:

a first conversion step of converting coordinate points in the second RGB color space into coordinate points within the common color space of device non-dependence in accordance with a color reproduction quality of the second device;

a second conversion step of converting the coordinate points within the common color space determined in the first conversion step into coordinate points within a CMY color space;

a first K-function creating step of setting up a first color conversion parameter and determining a first function of K from coordinate points of C=M=Y of coordinate points in the CMY color space determined in the second conversion step in accordance with a data conversion algorithm for converting the coordinate points in the CMY color space into coordinate points in the CMYK color space having a printability according to the first color conversion parameter set up;

a first association creating step of determining coordinate points within the CMYK color space bound by the first function of K determined in the first K-function creating step, associated with coordinate points of C=M=Y of the coordinate points within the CMY color space determined in the second conversion step, in accordance with a color reproduction quality of the printing, so that a first association for providing an association between the coordinate points in the CMY color space of C=M=Y and the coordinate points in the CMYK color space is determined;

a second K-function creating step of setting up a second color conversion parameter based on the first association determined in the first association creating step instead of the first color conversion parameter, on the data conversion algorithm, and determining a second function of K from the coordinate points consisting of an arbitrary combination of C, M and Y in the CMY color space determined in the second conversion step, in accordance with the data conversion algorithm on which the second color conversion parameter is set up; and a second association creating step of determining coordinate points in the CMYK color space bound by the second function of K determined in the second K-function creating step, associated with the same coordinate points as the coordinate points in the common color space associated with the coordinate points consisting of an arbitrary combination of C, M and Y in the CMY color space determined in the second conversion step, in accordance with a color reproduction quality of the printing, so that a second association for providing an association between the coordinate points consisting of an arbitrary combination of C, M and Y in the CMY color space and the coordinate points in the CMYK color space is determined.

The second color conversion definition creating step in the second color conversion definition creating method determines the above-mentioned data conversion algorithm, that is, by way of example, a K-function using the apparatus as proposed in the above-referenced Japanese Patent Application No. 2001-291691, and determines CMYK data in such a way that a colorimetric value associated with RGB data (coordinate points within the second RGB color space) via the color reproduction quality of the second device (the profile of the second device) is the same as a colorimetric value associated with CMYK data via the color reproduction quality of printing (the printing profile), using the K-function in form of the restriction condition. This makes it possible to determine the second color conversion definition capable of obtaining a printing image excellent in the printability and faithfully reproducing a color of an image dealt with by the second device.

The way of determining the K-function is not so simple too. First, the first function of K based on CMY data of C=M=Y (on the grey axis) is determined, and the association (the first association) between the CMY data of C=M=Y (on the grey axis) and CMYK data that is faithful to the CMY data in colorimetry and is restricted by the first function of K is determined. Next, a color conversion parameter set up on the above-mentioned data conversion algorithm is altered to a color conversion parameter (a second color conversion parameter) in which an element of "taste" with respect to at least K based on the first association, is removed from a color conversion parameter (a first color conversion parameter) including the element of "taste".

In this manner, an element of "taste" with respect to at least K is removed from the above-mentioned data conversion algorithm, and then a function of K (the second function) is determined over an arbitrary combination of C, M and Y from the CMY data. This makes it possible to determine a function of K involving printability throughout the color space.

Also here, it is acceptable that the second step in the second coordinate conversion step consists of a three primary colors RGB conversion step of converting coordinate points within the common color space into coordinate points within the three primary colors RGB color space, and a CMY conversion step of converting the coordinate points within the three primary colors RGB color space, which is obtained in the three primary colors conversion step, into coordinate points within the CMY color space by means of performing a logarithmic transformation for values of three primary colors R, G and B represented by the coordinate points in the three primary colors RGB color space.

In this case, it is preferable that there is provided a parameter computing step of computing a parameter for converting coordinate points within the common color space into coordinate points within the three primary colors RGB color space, in accordance with a chromaticity value of a predetermined white point on an x-y chromaticity diagram and chromaticity value of three points associated with the three primary colors of R, G and B on the x-y chromaticity diagram, and the three primary colors RGB conversion step converts the coordinate points within the common color space into the coordinate points within the three primary colors RGB color space in accordance with the parameter computed in the parameter computing step.

Further, in this case, it is preferable that parameter computing step establishes, as three points associated with the three primary colors of R, G and B, vertexes of a triangle including a color reproduction area on the x-y chromaticity diagram associated with a set of colors including full colors reproducible by a color reversal film, which vertexes are located on three straight lines on the x-y chromaticity diagram, coupling three points representative of main wavelengths of three primary colors of R, G and B of the color reproduction area on the x-y chromaticity diagram with a predetermined white point on the x-y chromaticity diagram, respectively.

To achieve the above-mentioned object of the present invention, the present invention provides a first color conversion definition creating apparatus for creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating apparatus comprises:

a first color conversion definition creating section for creating a first color conversion definition for converting the coordinate points within the color reproduction area of the first device in the first RGB color space into coordinate points within a color reproduction area of a second device mediating between an image and image data, in a second RGB color space, depending on the second device, the color reproduction area of the second device being closer to the color reproduction area of the printing than the first device; and a second color conversion definition creating section for creating a second color conversion definition for converting the coordinate points within the color reproduction area of the second device in the second RGB color space into coordinate points within a color reproduction area of printing in the CMYK color space.

To achieve the above-mentioned object of the present invention, the present invention provides a second color conversion definition creating apparatus for creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating apparatus comprises:

a first color conversion definition creating section for creating a first color conversion definition for converting the coordinate points within the color reproduction area of the first device in the first RGB color space into coordinate points within a color reproduction area of an imaginary second device mediating between an image and image data, in a second RGB color space, depending on the imaginary second device, the imaginary second device having a color reproduction area that is coincident with the color reproduction area for printing; and a second color conversion definition creating section for creating a second color conversion definition for converting the coordinate points within the color reproduction area of the second device in the second RGB color space into coordinate points within a color reproduction area of printing in the CMYK color space.

Here, the first and second color conversion definition creating apparatuses include all the aspects corresponding to those of the first and second color conversion definition creating methods, respectively.

To achieve the above-mentioned object of the present invention, the present invention provides a first color conversion definition creating program storage medium storing a color conversion definition creating program which is executed in a computer and causes the computer to operate as a color conversion definition creating apparatus for creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating program comprising:

a first color conversion definition creating section for creating a first color conversion definition for converting the coordinate points within the color reproduction area of the first device in the first RGB color space into coordinate points within a color reproduction area of a second device mediating between an image and image data, in a second RGB color space, depending on the second device, the color reproduction area of the second device being closer to the color reproduction area of the printing than the first device; and a second color conversion definition creating section for creating a second color conversion definition for converting the coordinate points within the color reproduction area of the second device in the second RGB color space into coordinate points within a color reproduction area of printing in a CMYK color space.

To achieve the above-mentioned object of the present invention, the present invention provides a second color conversion definition creating program storage medium storing a color conversion definition creating program which is executed in a computer and causes the computer to operate as a color conversion definition creating apparatus for creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating program comprising:

a first color conversion definition creating section for creating a first color conversion definition for converting the coordinate points within the color reproduction area of the first device in the first RGB color space into coordinate points within a color reproduction area of an imaginary second device mediating between an image and image data, in a second RGB color space, depending on the imaginary second device, the imaginary second device having a color reproduction area that is coincident with the color reproduction area for printing; and a second color conversion definition creating section for creating a second color conversion definition for converting the coordinate points within the color reproduction area of the second device in the second RGB color space into coordinate points within a color reproduction area of printing in a CMYK color space.

Here, the first and second color conversion definition creating program storage mediums apparatuses include all the aspects corresponding to those of the first and second color conversion definition creating methods, respectively.

DETAILED DESCRIPTION OF PREFERRED EMBODIMENTS

Embodiments of the present invention will be described with reference to the accompanying drawings.

Figure 1:
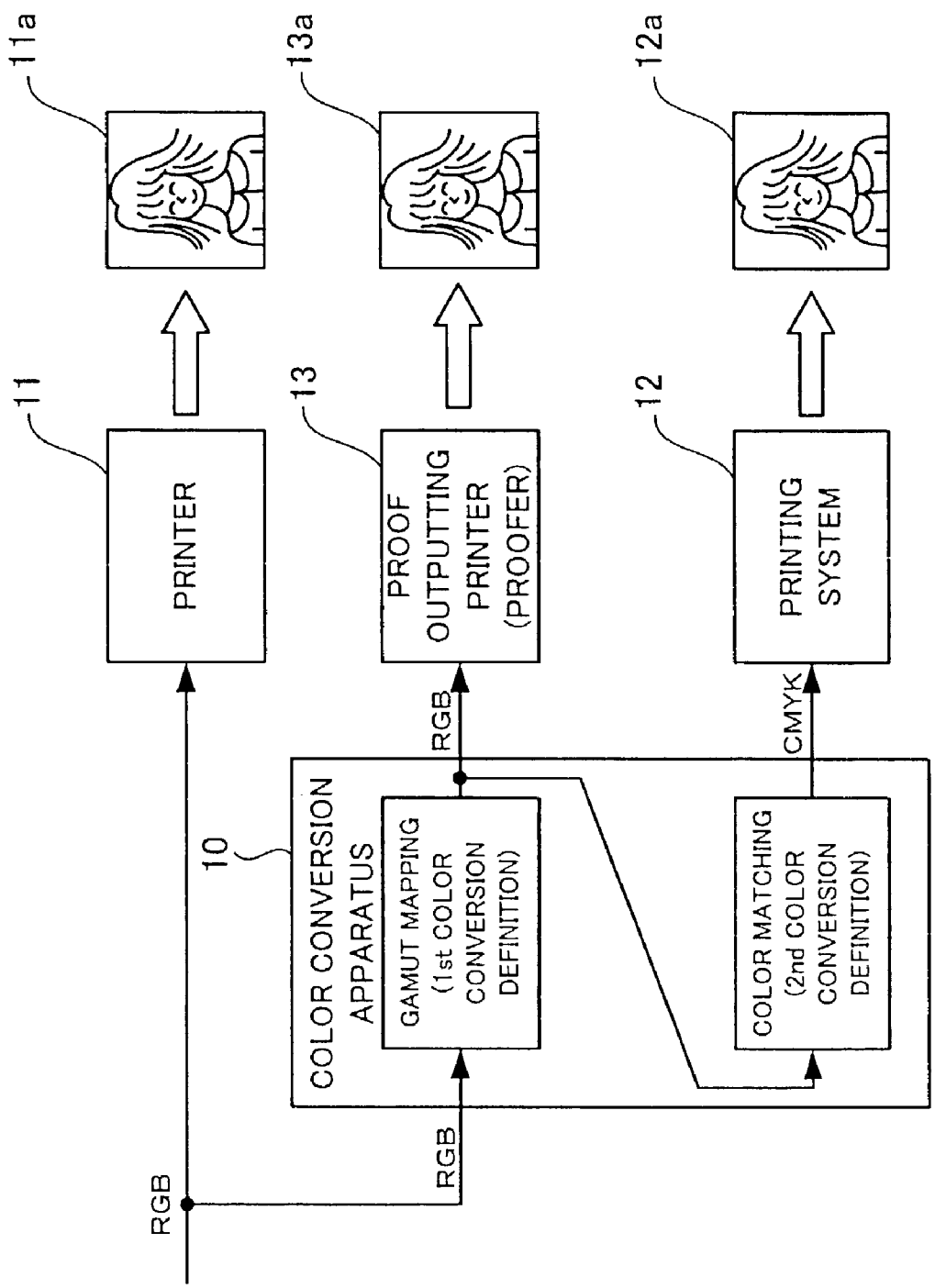
FIG. 1 is a view showing a system adopting a color conversion definition created in accordance with the present invention.

FIG. 1 is a view showing a system adopting a color conversion definition created in accordance with the present invention. Here, first, there will be described a position of the present invention referring to FIG. 1.

RGB data representative of an image is fed to a printer 11. The printer 11 outputs a printed image 11a in accordance with the fed RGB data. Here, it is desired to create a printing image 12a reproducing the same color as the printed image 11a. In this case, the RGB data is fed to a color conversion apparatus 10. While details of the color conversion apparatus 10 will be described later, the color conversion apparatus 10 stores a first color conversion definition for converting RGB data (RGB data suitable for the printer 11) at the input side into RGB data suitable for a proof outputting printer (a proofer) 13, and a second color conversion definition for converting the RGB data subjected to the conversion using the first color conversion definition into CMYK data for printing, which are created beforehand. The color conversion apparatus 10 performs a color conversion based on the first color conversion definition (this color conversion is referred to as a gamut mapping) and in addition a color conversion based on the second color conversion definition (this color conversion is referred to as a color matching), so that the RGB data at the input side is converted into the CMYK data for printing. Incidentally, here, for the sake of convenience of an explanation, the color conversion based on the first color conversion definition (the gamut mapping) and the color conversion based on the second color conversion definition (the color matching) are separately explained. However, according to the actual conversion of the RGB data at the input side into the CMYK data for printing, the first color conversion definition is combined with the second color conversion definition to create one color conversion definition, and the RGB data at the input side is converted into the CMYK data for printing in accordance with the combined one color conversion definition.

The CMYK data thus created is fed to a printing system 12. The printing system 12 creates a film original plate in accordance with the CMYK data for instance, and creates a machine plate in accordance with the film original plate to perform a printing, so the printing image 12*a* is created.

In the event that the printing system 12 is used to create a printing image, it may happen that there is performed a prior confirmation for prediction of a finish for a printing image 12*a* prior to obtaining the printing image 12*a* through printing by the printing system 12, since the printing system 12 is a large scale of system. In this case, the RGB data, which is obtained through performing only the gamut mapping using the first color conversion definition in the color conversion apparatus 10, is fed to the proofer 13 so that a proof image 13*a* is printed out. The proofer 13 is intended to print out a proof image 13*a* which is closely similar to the printing image 12*a* in color. A color reproduction area (an outline of a proofer profile) of the proofer 13 is coincident with a color reproduction area (an outline of a printing profile) of the printing system 12 with great accuracy. To the contrary, the printer 11 is not produced taking into consideration a color reproduction area of the printing system 12, and it often happens that the a color reproduction area (an outline of a printer profile) of the printer 11 is greatly different from the color reproduction area (an outline of a printing profile) of the printing system 12.

A finish of the printing image 12*a* is confirmed beforehand in view of the proof image 13*a*, and the printing image 12*a* is created in the manner as mentioned above.

As far as the color conversion apparatus 10 'properly' converts the RGB data at the input side into CMYK data, the printing image 12*a* will be an image having the same color as the printed image 11*a*.

In order that the color conversion apparatus 10 'properly' converts the RGB data at the input side into CMYK data, it is insufficient that the RGB data is converted into the CMYK data simply "well" in color conversion taking into consideration a difference between the color reproduction quality (the printer profile) of the printer 11 and the color reproduction quality (the printing profile) of the printing system 12, and there is a need that the CMYK data obtained through the color conversion is data (having printability) suitable for the printing system 12.

When it is intended to create the color conversion definition for converting the RGB data into the CMYK data representative of the same color as the RGB data on a colorimetric basis in accordance with a color reproduction quality (a printer profile) of the printer 11, and a color reproduction quality (a printing profile) of the printing system 12, the RGB data consists of three variables of R, G and B, while the CMYK data consists of four variables of C, M, Y and K. Thus there exists a lot of CMYK data for one RGB data, which is same on a colorimetric basis, and thus it is impossible to unequivocally perform a conversion. Further, a selection of optional one of a lot of CMYK data, which is same on a colorimetric basis, does not always select the CMYK data having the printability.

On the other hand, in the event that the RGB data is converted into data (CMY data) representative of CMY such as block CMY, and the CMY data is fed to a color conversion apparatus, which is adjusted so as to be suitable for the printing system 12 by operation of a skilled person, so that the CMY data is converted into the CMYK data, it is possible to obtain the CMYK data having a printing aptitude for the printing system 12. In this case, however, the CMY data is not always converted into the CMYK data representative of the same color as the original RGB data, and may be converted into CMYK data representative of color involving "one's taste" of the skilled person who performed color regulation and the printing company.

Further, as mentioned above, there is a difference between the color reproduction quality (a printer profile) of the printer 11 and the color reproduction quality (a printing profile) of the printing system 12, and this involves a problem that there is a need to "well" absorb the difference.

Hereinafter, there will be described a technique of creating a color conversion definition (a first color conversion definition and a second color conversion definition) capable of converting RGB data (coordinate points in the RGB color space) for a printer suitable for the printer 11, which is set to the color conversion apparatus 10, into CMYK data having a printability for the printing system 12 and being capable of creating a printing image which is greatly similar in color to the printed image 11*a* obtained when the printer 11 prints out in accordance with the RGB data, even if there is a difference between the color reproduction quality (a printer profile) of the printer 11 and the color reproduction quality (a printing profile) of the printing system 12.

Figure 2:
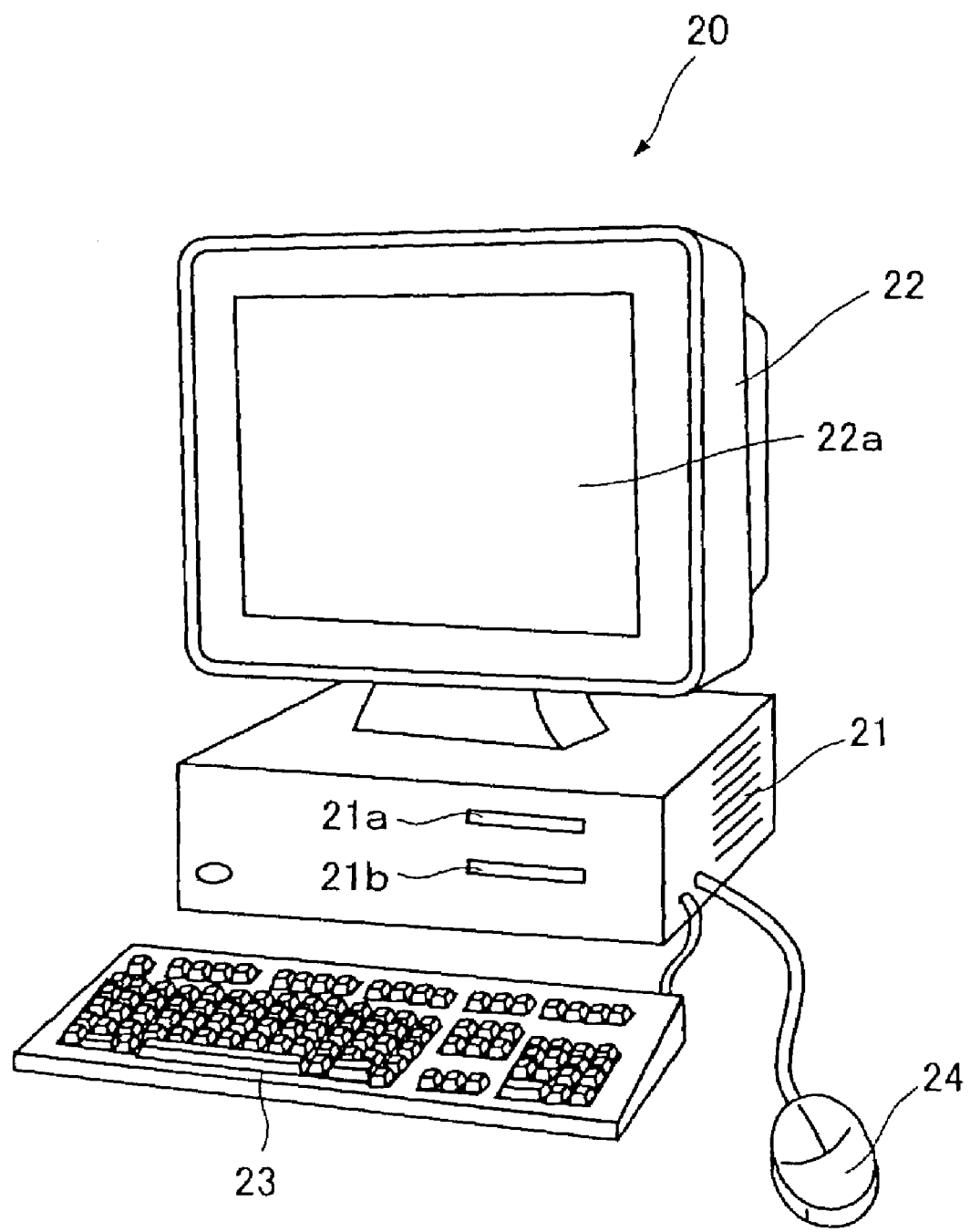
FIG. 2 is a perspective view of a personal computer constructing a color conversion definition creating apparatus according to an embodiment of the present invention.
Figure 3:
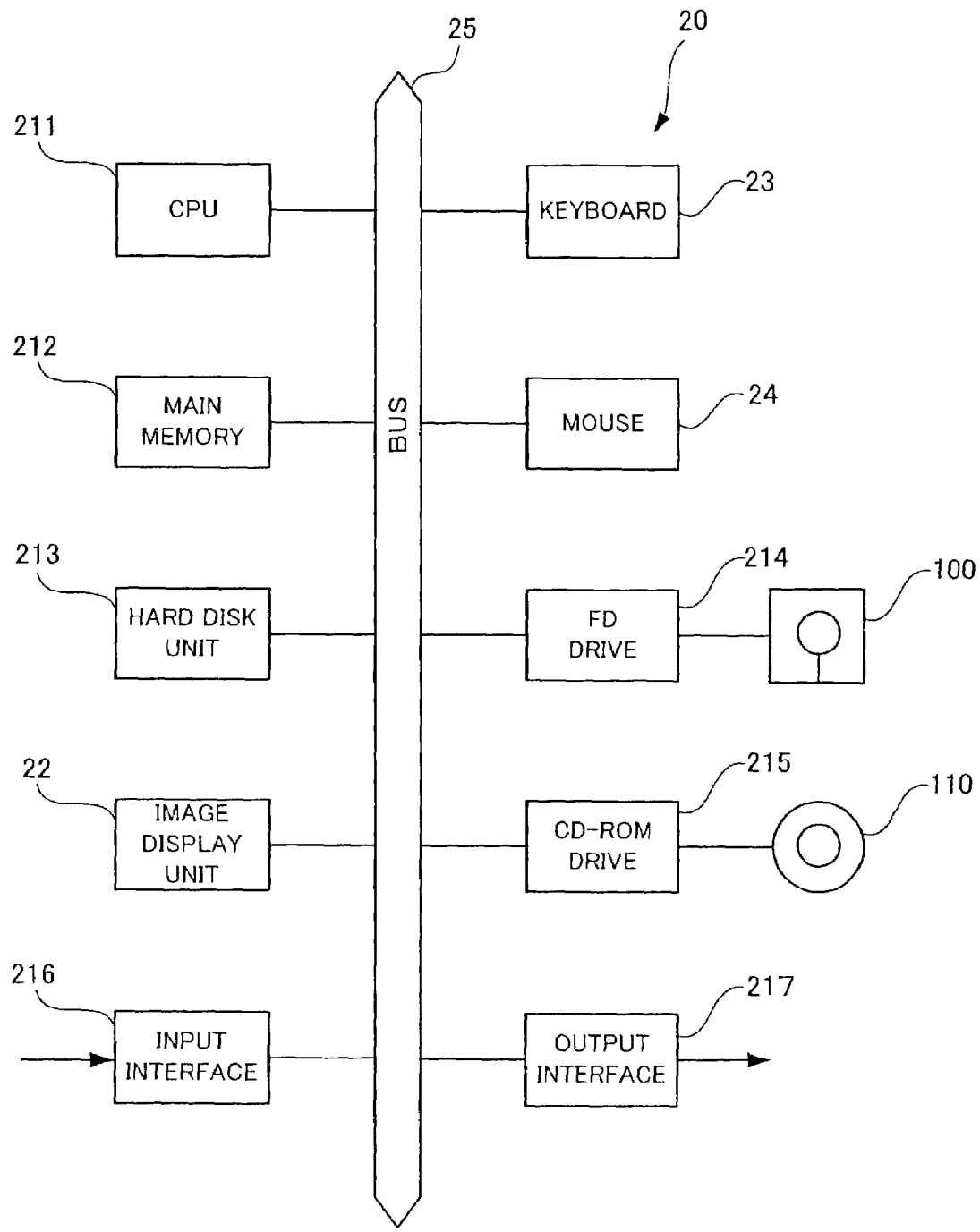
FIG. 3 is a hardware structural view of the personal computer.

FIG. 2 is a perspective view of a personal computer constructing a color conversion definition creating apparatus according to an embodiment of the present invention. FIG. 3 is a hardware structural view of the personal computer.

A hardware and OS (operation system) of a personal computer 20 and a color conversion definition creating program to be installed in the personal computer 20 and executed by the same constitute a color conversion definition creating apparatus according to an embodiment of the present invention.

The color conversion apparatus 10 shown in FIG. 1 can also be implemented by a personal computer. According to the present embodiment, the personal computer 20 shown in FIG. 2 and FIG. 3, which constitutes a color conversion definition creating apparatus according to the present embodiment, serves as the color conversion apparatus 10 shown in FIG. 1 on a hardware basis. However, it is acceptable that the personal computer constituting the color conversion definition creating apparatus is a personal computer different from the personal computer constituting the color conversion apparatus 10 shown in FIG. 1, and the color conversion definition created in the color conversion definition creating apparatus is installed in the color conversion apparatus 10 shown in FIG. 1.

Hereinafter, first, there will be explained a hardware of the personal computer shown in FIG. 2 and FIG. 3, and then there will be explained an embodiment of a color conversion definition creating method of the present invention.

As shown in FIG. 2, the personal computer 20 comprises, on an external appearance, a main frame unit 21, an image display unit 22 for displaying an image on a display screen 22*a* in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22*a*, the icon and the like being displayed on the position on the display screen 22a. The main frame unit 21 has a flexible disk (FD) mounting slot 21a for mounting a flexible disk (FD), and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a flexible disk 100 mounted thereon, a CD-ROM drive 215 for accessing a CD-ROM 110 mounted thereon, an input interface 216 to receive RGB data from the exterior, and an output interface 217 to output CMYK data to the printing system 12. These various types of elements are connected via a bus 25 to the image display unit 22, the keyboard 23 and the mouse 24. It is noted that the personal computer 20 serves as the color conversion apparatus 10 shown in FIG. 1.

The CD-ROM 110 stores therein a color conversion definition creating program which causes the personal computer 20 to operate as the color conversion definition creating apparatus. The CD-ROM 110 is mounted on the CD-ROM drive 215 so that the color conversion definition creating program, which is stored in the CD-ROM 110, is up-loaded on the personal computer 20 and is stored in the hard disk unit 213.

Figure 4:
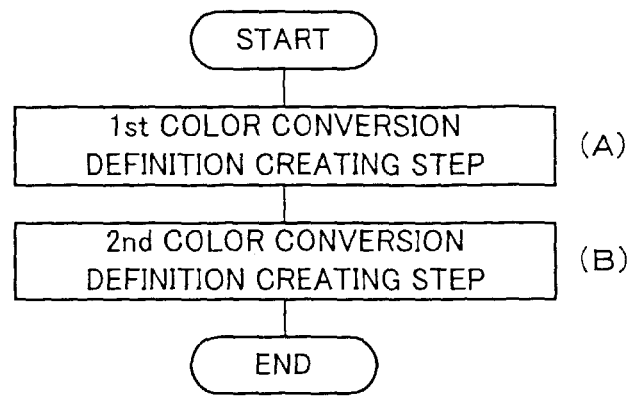
FIG. 4 is a flowchart useful for understanding a color conversion definition creating method according to an embodiment of the present invention.

FIG. 4 is a flowchart useful for understanding a color conversion definition creating method according to an embodiment of the present invention.

This color conversion definition creating method creates a color conversion definition converting coordinate points within a color reproduction area of a first device (for example, the printer 11 shown in FIG. 1) mediating between an image and image data, in a first RGB color space, depending on the first device, into coordinate points within a color reproduction area of printing in a CMYK color space for printing of the printing system 12 shown in FIG. 1. The color conversion definition creating method comprises:

a first color conversion definition creating step (a step (A)) of creating a first color conversion definition for converting the coordinate points within the color reproduction area of the first device (for example, the printer 11) in the first RGB color space into coordinate points within a color reproduction area of a second device (for example, the proofer 13 for obtaining the proof image of the printing system 12) mediating between an image and image data, in a second RGB color space, depending on the second device, the color reproduction area of the second device being closer to the color reproduction area of the printing than the first device; and a second color conversion definition creating step (a step (B)) of creating a second color conversion definition for converting the coordinate points within the color reproduction area of the second device (for example, the proofer 13) in the second RGB color space into coordinate points within a color reproduction area of printing in a CMYK color space.

Details of the first color conversion definition creating step (the step (A)) and the second color conversion definition creating step (the step (B)) will be described latter.

Figure 5:
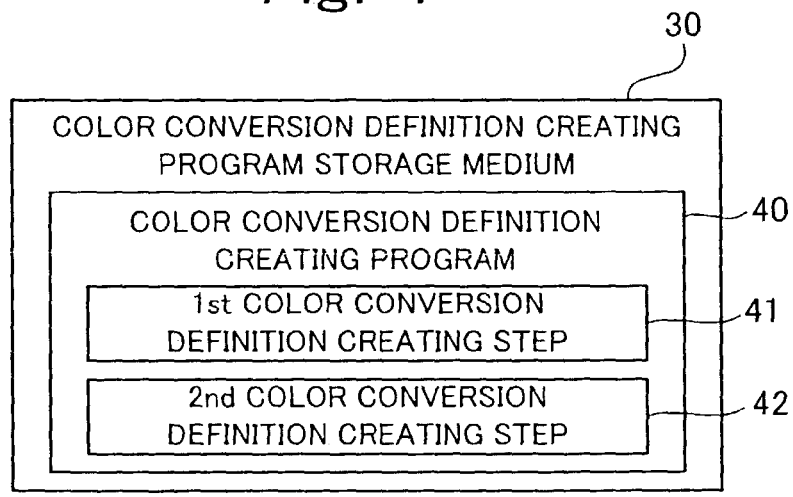
FIG. 5 is a view useful for understanding a color conversion definition creating program stored in a color conversion definition creating program storage medium according to an embodiment of the present invention.

FIG. 5 is a view useful for understanding a color conversion definition creating program stored in a color conversion definition creating program storage medium according to an embodiment of the present invention.

A color conversion definition creating program storage medium 30 shown in FIG. 5 representatively shows the CD-ROM 110 (cf. FIG. 3) in a state that a color conversion definition creating program 40 is stored, and the hard disk unit 213 in a state that the color conversion definition creating program 40 is stored after the CD-ROM 110 is mounted on the CD-ROM drive 215 and accessed, and the color conversion definition creating program 40 stored in the CD-ROM 110 is up loaded on the personal computer 20.

The color conversion definition creating program 40 is executed in the personal computer 20 shown in FIG. 2 and FIG. 3, and causes the personal computer 20 to operate as a color conversion definition creating apparatus for creating a color conversion definition converting coordinate points within a color reproduction area of a first device (for example, the printer 11 shown in FIG. 1) mediating between an image and image data, in a first RGB color space, depending on the first device, into coordinate points within a color reproduction area of printing in a CMYK color space for printing. The color conversion definition creating program 40 comprises a first color conversion definition creating section 41, and a second color conversion definition creating section 42.

The first color conversion definition creating section 41 constituting the color conversion definition creating program 40 creates a first color conversion definition for converting the coordinate points within the color reproduction area of the first device (for example, the printer 11) in the first RGB color space into coordinate points within a color reproduction area of a second device (for example, the proofer 13 for obtaining the proof image of the printing system 12) mediating between an image and image data, in a second RGB color space, depending on the second device, the color reproduction area of the second device being closer to the color reproduction area of the printing than the first device.

The second color conversion definition creating section 42 constituting the color conversion definition creating program 40 creates a second color conversion definition for converting the coordinate points within the color reproduction area of the second device (for example, the proofer 13) in the second RGB color space into coordinate points within a color reproduction area of printing in a CMYK color space.

Detailed explanation for the first color conversion definition creating section 41 and the second color conversion definition creating section 42 constituting the color conversion definition creating program 40 will be described later.

Figure 6:
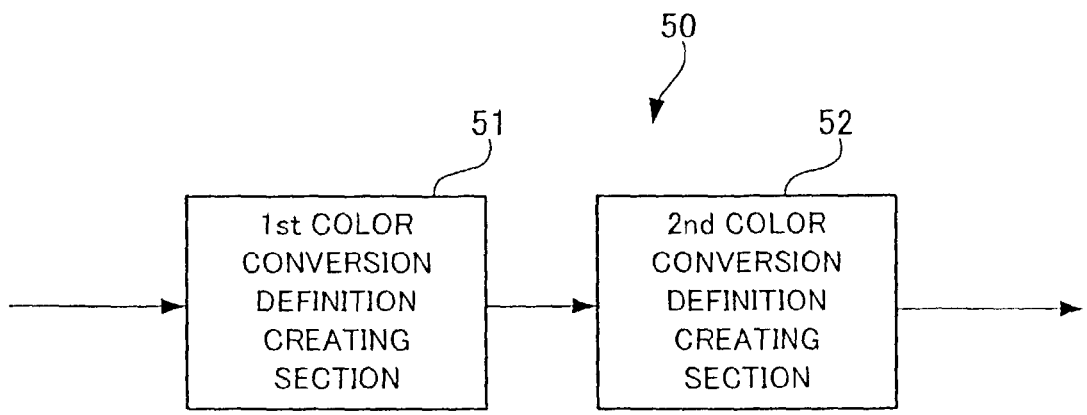
FIG. 6 is a functional block diagram of a color conversion definition creating apparatus according to an embodiment of the present invention.

FIG. 6 is a functional block diagram of a color conversion definition creating apparatus according to an embodiment of the present invention.

A color conversion definition creating apparatus 50 shown in FIG. 6 is constituted in such a manner that the color conversion definition creating program 40 shown in FIG. 5 is installed in the personal computer 20 shown in FIG. 2 and FIG. 3 and then executed.

The color conversion definition creating apparatus 50 is a color conversion definition creating apparatus for creating a color conversion definition converting coordinate points within a color reproduction area of a first device (for example, the printer 11 shown in FIG. 1) mediating between an image and image data, in a first RGB color space, depending on the first device, into coordinate points within a color reproduction area of printing in a CMYK color space for printing of the printing system 12 shown in FIG. 1. The color conversion definition creating apparatus comprises:

a first color conversion definition creating section 51 of creating a first color conversion definition for converting the coordinate points within the color reproduction area of the first device (for example, the printer 11) in the first RGB color space into coordinate points within a color reproduction area of a second device (for example, the proofer 13 for outputting the proof image 13a of printed image 12a created by the printing system 12 shown in FIG. 1) mediating between an image and image data, in a second RGB color space, depending on the second device, the color reproduction area of the second device being closer to the color reproduction area of the printing than the first device; and a second color conversion definition creating section 52 of creating a second color conversion definition for converting the coordinate points within the color reproduction area of the second device (for example, the proofer 13) in the second RGB color space into coordinate points within a color reproduction area of printing in a CMYK color space.

Hereinafter, there will be described details of the first color conversion definition creating step (the step (A)) of the color conversion definition creating method in FIG. 4, the first color conversion definition creating section 41 of the color conversion definition creating program 40 in FIG. 5 and the first color conversion definition creating section 51 of the color conversion definition creating apparatus 50 in FIG. 6, and then there will be described details of the second color conversion definition creating step (the step (B)) of the color conversion definition creating method in FIG. 4, the second color conversion definition creating section 42 of the color conversion definition creating program 40 in FIG. 5 and the second color conversion definition creating section 52 of the color conversion definition creating apparatus 50 in FIG. 6.

Figure 7:
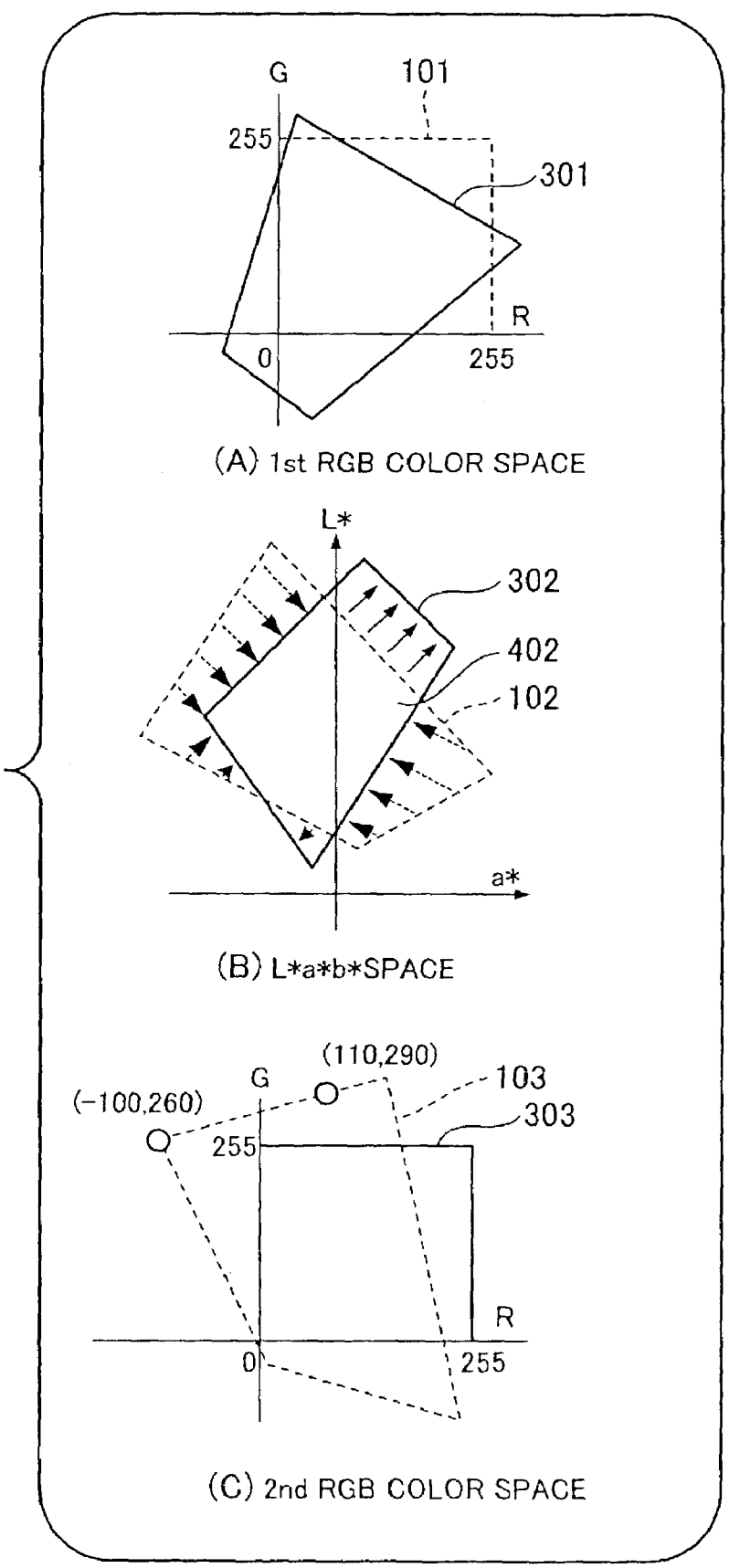
FIG. 7 is a typical illustration of color reproduction areas of the printer and the proofer shown in FIG. 1.

FIG. 7 is a typical illustration of color reproduction areas of the printer 11 and the proofer 13 shown in FIG. 1.

A part (A) of FIG. 7 shows a first RGB color space depending on the printer 11. For the purpose of simplification, the part (A) of FIG. 7 shows an R-G plane of the first RGB color space. With respect to a part (B) of FIG. 7 and a part (C) of FIG. 7, likely, the part (B) of FIG. 7 shows an L*-a* plane of an L*a*b* space, which is one of the common color spaces, and the part (C) of FIG. 7 shows an R-G plane of a second RGB color space depending on the proofer 13.

The printer 11 prints out the printed image 11*a* in accordance with image data representative of numeral values of 0 to 255 on each of R, G and B. In this case, the color reproduction area of the printer 11 offers a rectangular area 101 shown in the part (A) of FIG. 7.

When the color reproduction area 101 of the printer 11, as shown in the part (A) of FIG. 7, is transferred to the L*a*b* space referring to the color reproduction quality (printer profile) of the printer 11, the color reproduction area of the printer 11 appears in form of an area 102. And when the area 102 is transferred to the second RGB color space depending on the proofer 13 referring to the color reproduction quality (the proofer profile) of the proofer 13, the color reproduction area of the printer 11 appears in form of an area 103 as shown in the part (C) of FIG. 7.

To the contrary, the color reproduction area (the proofer profile) of the proofer 13 shown in FIG. 1 appears, on the second RGB color space shown in the part (C) of FIG. 7, in form of a cubic area (a rectangular area 303 on the R-G plane in the part (C) of FIG. 7) which is expressed in a numerical range of 0 to 255 on each of R, G and B. More in detail, when image data representative of coordinate points within the numerical range of 0 to 255 on each of R, G and B in the first RGB color space depending on the printer 11 is converted via the L*a*b* space into image data on the second RGB color space, it may happen that the image data is converted into values exceeding colors (a range of 0 to 255 on each of R, G and B on the image data) capable of being represented by the proofer 14, for example, values such as (R, G)=(110, 290), and (R, G)=(−100, 260) as exemplarily shown in the part (C) of FIG. 7. In this case, since those image data, that is, image data out of the color reproduction area of the proofer 13, cannot be outputted by the proofer 13, it is proposed that those image data are clipped in such a manner that the image data become image data located at the boundary of the color reproduction area of the proofer 13. Particularly, (R, G)=(110, 290) is converted into (R, G)=(110, 255), and (R, G)=(−100, 260) is converted into (R, G)=(0, 255).

In case of the mapping in the color space depending on the side (here the proofer 13) to be subjected to the conversion as mentioned above, a degree of freedom of the mapping is small, and there is performed such a mapping that data out of the color reproduction area of the proofer 13 is simply clipped to be moved to the boundary of the color reproduction area. Thus, in this case, when a transfer of an image is carried out from the color reproduction area of a device (for example the printer 11) to the color reproduction area of another device (for example the proofer 13), it may happen that an accuracy of the transfer particularly in the vicinity of the boundary of the color reproduction areas is greatly degraded.

On the other hand, a color reproduction area 303 of the proofer 13 indicated with the rectangular area of 0 to 255 in the part (C) of FIG. 7 is transferred to the L*a*b* space using the color reproduction quality (the proofer profile) of the proofer 13, the color reproduction area 303 is expressed in form of an area 302 shown in the part (B) of FIG. 7. Hitherto, there are proposed several techniques of converting data in the color reproduction area 102 of the printer 11 (the first device) into data in the color reproduction area 302 of the proofer 13 (the second device) in the common color space represented by the L*a*b* space.

According to the color conversion (mapping) in the L*a*b* space, when it is intended that the color reproduction area capable of being represented in the proofer 13 is utilized as much as possible, generally, there are performed both "compression" in which data out of a common area 402 between the color reproduction area 102 of the printer 11, as shown in the part (B) of FIG. 7 with the arrow of the broken line, and the color reproduction area 302 of the proofer 13, is subjected to the mapping inside the common area 402, and "expansion" in which data inside the common area 402 is extended to the outside of the common area 402, as shown in the part (B) of FIG. 7 with the arrow of the solid line, maintaining condition that the limit is the inside of the color reproduction area 302 of the proofer 13.

The mapping in the common color space represented by the L*a*b* space now proposed is too large in the degree of freedom of the mapping, and thus there is a large possibility that a tone is discontinuous or unnatural image offers.

When the color reproduction area 302 of the proofer 13 transferred to the L*a*b* space in the part (B) of FIG. 7 is further transferred to the first RGB color space of the part (A) of FIG. 7, the color reproduction area 302 is expressed in form of an area 301 of a figure of "being flattened" having portions going out of the color reproduction area 101 of the printer 11.

Next, there will be explained the common color space. While the common color space has been explained with an example in which the L*a*b* color space is adopted, there is no need that the common color space is the L*a*b* color space. Any one is acceptable, as the common color space, which is a color space defined as being not dependent on a specified input device or a specified output device. Other than the L*a*b* color space, for example, it is acceptable that the XYZ color space is adopted as the common color space. Alternatively, as the common color space, it is acceptable to adopt a coordinate system clearly defined in such a manner that coordinate points on the color space are associated with the color spaces one by one. By way of example of such a coordinate system, there is raised a standard RGB signal defined as set forth below.

$$\begin{bmatrix} R_{sRGB} \\ G_{sRGB} \\ B_{sRGB} \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

where when for example $P_{sRGB}$ is expressed with 8 bits, it is denoted as $R_{8bit}$, $$R_{8bit} = 255 \times 12.92 R_{sRGB} (0 < R_{sRGB} < 0.00304)$$

$$R_{8bit} = 255 \times 1.055 R_{sRGB}^{(1.0/2.4)} - 0.055$$
$$(0.00304 \leq R_{sRGB} \leq 1)$$

In a similar fashion to that of $R_{sRGB}$, $G_{8bit}$ and $B_{8bit}$ expressed with 8 bits can be also converted from $G_{sRGB}$ and $B_{sRGB}$, respectively.

Alternatively, it is acceptable that the color space defined by CMY densities of a reversal film is adopted as the common color space. Determination of the common color space may clearly define a color reproduction area in the common color space.

Figure 8:
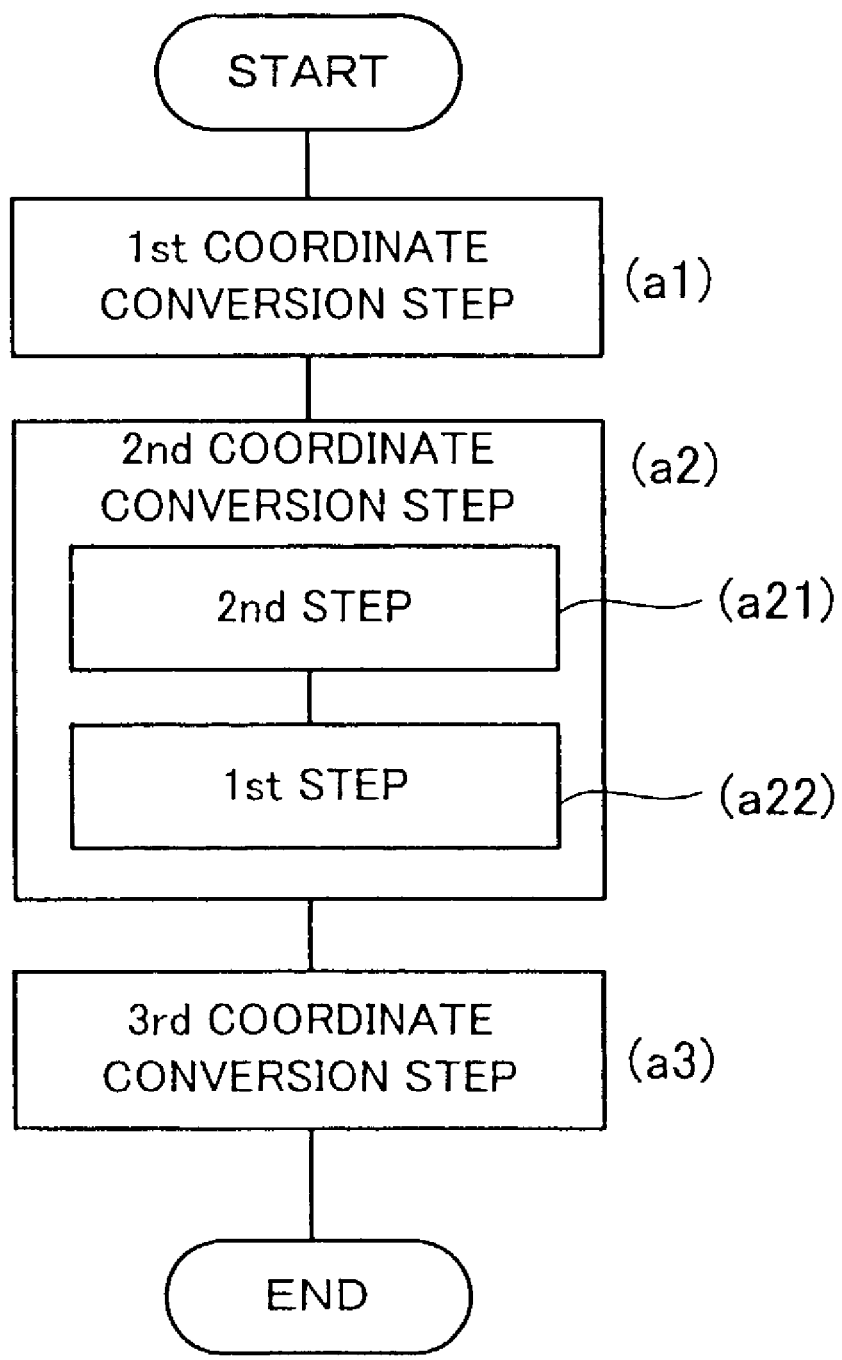
FIG. 8 is a flowchart useful for understanding a first color conversion definition creating step of a color conversion definition creating method.

FIG. 8 is a flowchart useful for understanding a first color conversion definition creating step of a color conversion definition creating method by the color conversion definition creating program to be executed in the computer system shown in FIG. 2 and FIG. 3. FIG. 8 corresponds to the first color conversion definition creating step of the step (A) of FIG. 4 in its entirety.

Here, the first color conversion definition referred to in the present invention is created via a first coordinate conversion step (a step a1), a second coordinate conversion step (a step a2), and a third coordinate conversion step (a step a3). In the second coordinate conversion step (the step a2), basically, a first step (a step a22) is carried out. According to the present embodiment, however, a second step (a step a21) is placed before the first step so that a color conversion definition is created with greater accuracy.

Figure 9:
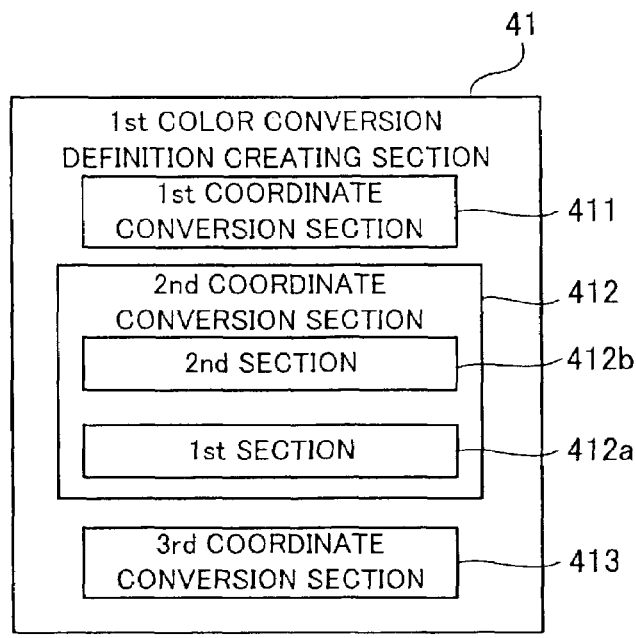
FIG. 9 is a structural view of a first color conversion definition creating section of a color conversion definition creating program.

FIG. 9 is a structural view of the first color conversion definition creating section 41 (cf. FIG. 5) of the color conversion definition creating program to be executed in the computer system shown in FIG. 2 and FIG. 3.

The first color conversion definition creating section 41 comprises a first coordinate conversion section 411, a second coordinate conversion section 412, and a third coordinate conversion section 413. The second coordinate conversion section 412 comprises a first section 412a and a second section 412b, which is executed before the first section 412a.

Figure 10:
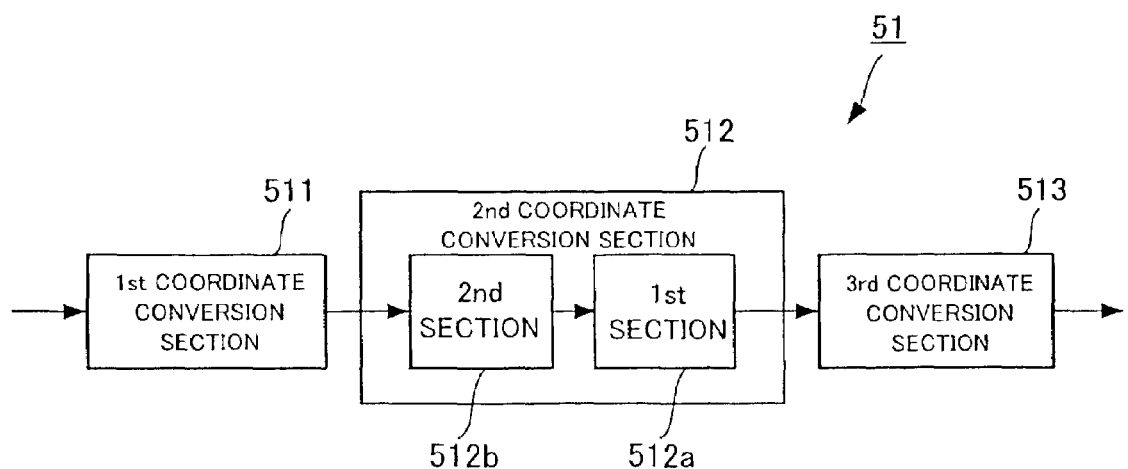
FIG. 10 is a functional block diagram of a first color conversion definition creating section of a color conversion definition creating apparatus.

FIG. 10 is a functional block diagram of the first color conversion definition creating section 51 (cf. FIG. 6) of the color conversion definition creating apparatus 50 constructed in the computer 20 shown in FIG. 2 and FIG. 3 when the color conversion definition creating program is executed in the computer 20.

The first color conversion definition creating section 51 comprises a first coordinate conversion section 511, a second coordinate conversion section 512, and a third coordinate conversion section 513. The second coordinate conversion section 512 comprises a first section 512a and a second section 512b, which is located before the first section 512a.

The steps a1, a2 (a21, a22) and a3 of the first color conversion definition creating step of the color conversion definition creating method shown in FIG. 8 correspond to the sections 411, 412 (412a, 412b) and 413 constituting the first coordinate conversion section 41 of the color conversion definition creating program 40 as shown in FIG. 9, respectively, and also correspond to the sections 511, 512 (512a, 512b) and 513 constituting the first coordinate conversion section 51 of the color conversion definition creating apparatus 50 as shown in FIG. 10, respectively. Hereinafter, there will be explained the steps a1, a2 (a21, a22) and a3 of the first color conversion definition creating step of the color conversion definition creating method shown in FIG. 8. This is applicable to the explanation of the sections 411, 412 (412a, 412b) and 413 constituting the first coordinate conversion section 41 of the color conversion definition creating program 40 as shown in FIG. 9, and the explanation of the sections 511, 512 (512a, 512b) and 513 constituting the first coordinate conversion section 51 of the color conversion definition creating apparatus 50 as shown in FIG. 10.

Hereinafter, there will be explained the steps (a1, a2 (a21, a22) and a3 of the first color conversion definition creating step of the color conversion definition creating method shown in FIG. 8. Incidentally, the first color conversion definition creating step relates to the method disclosed in Japanese Patent Laid Open Gazette Tokukai. 2001-103329.

In the step a1 in FIG. 8, the color reproduction quality (the printer profile) of the printer 11 is referred to so that coordinate points (here coordinate points on the lattices set up discretely) in the first RGB color space depending on the printer 11 are transferred to the common color space (for example, L*a*b* space) of device-non-dependence.

FIG. 11A to FIG. 11D are explanatory views useful for understanding a second step in a second coordinate conversion step, which is executed in the step a21 in FIG. 8, and show the color reproduction area of the printer 11 in the L*a*b* space and the color reproduction area of the proofer 13.

Here, there is carried out an adaptational conversion in which the Von Kries conversion is applied. That is, here, a coordinate conversion is performed in such a manner that coordinate point $W_1$ corresponding to white (a color of a sheet of the printed image 11a) expressed by the printed image 11a (cf. FIG. 1) printed out by the printer 11, and coordinate point $B_1$ corresponding to black (a state that the printer 11 is used to carry out a printing using the maximum amount of inks of R, G and B colors) capable of expressing in form of printed image 11a, are coincident with coordinate point $W_3$ corresponding to white (a color of a sheet of the proof image 13a) of the proof image 13a outputted by the proofer 13, and coordinate point $B_3$ corresponding to black (a state that the proofer 13 is used to carry out a printing using the maximum amount of inks of R, G and B colors) capable of being outputted by the proofer 13, respectively.

Figure 11A:
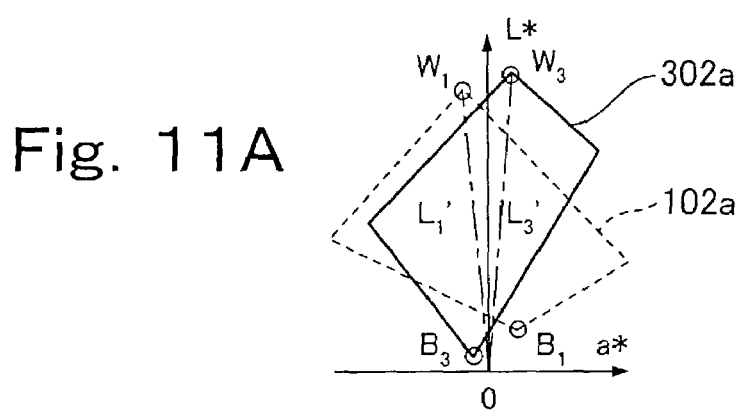
FIG. 11A to FIG. 11D are explanatory views useful for understanding a second step in a second coordinate conversion step.
Figure 11B:
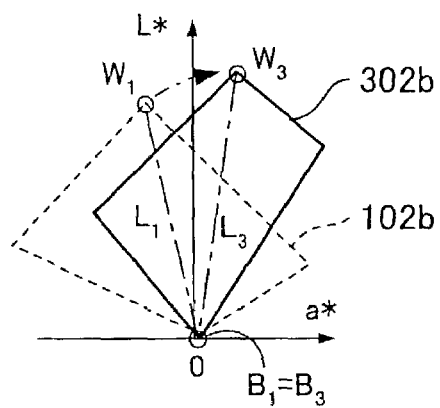

First, a color reproduction area 102a of the printer 11 and a color reproduction area 302a of the proofer 13, as shown in FIG. 11A, are translated, as shown in FIG. 11B, in such a manner that black points $B_1$ and $B_3$ are coincident with the original point 0 (the logical black point). Thus, first, a black point of a color reproduction area 102b of the printer 11 is coincident with a color reproduction area 302b of the proofer 13.

Next, there is performed a coordinate conversion involving rotation and expansion/compression throughout the color reproduction area 102b of the printer 11 in such a manner that the white point $W_1$ of the color reproduction area 102b of the printer 11, after the translation, is coincident with the white point $W_3$ of the color reproduction area 302b of the proofer 13, after the translation, in other words, a straight line $L_1$ of FIG. 11B is coincident with a straight line $L_3$.

Figure 11C:
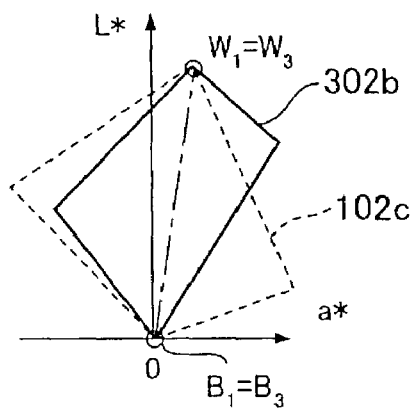

FIG. 11C shows a state after the coordinate conversion involving rotation and expansion/compression is performed. The color reproduction area of the printer 11 is converted from the color reproduction area 102b shown in FIG. 11B to a color reproduction area 102c shown in FIG. 11C. At that time, the white point $W_1$ of the color reproduction area of the printer 11 is coincident with the white point $W_3$ of the color reproduction area of the proofer 13.

Figure 11D:
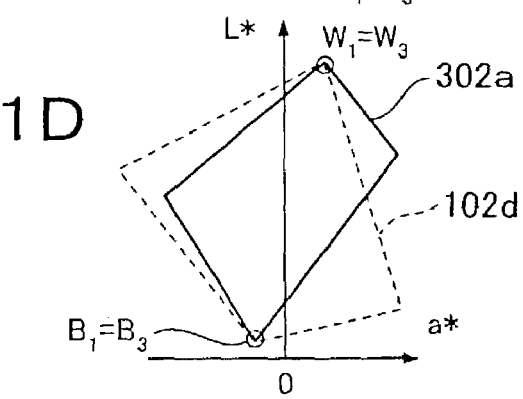

Thereafter, as shown in FIG. 11D, the color reproduction area 102c of the printer 11, in which the white points and the black points are coincident with one another, respectively, as shown in FIG. 11C, is translated to the original color reproduction area of the proofer 13, that is, the position wherein the white point and the black point are coincident with the white point $W_3$ and the black point $B_3$ of the color reproduction area 302a of the proofer 13, respectively, as shown in FIG. 11A.

This makes it possible to obtain a color reproduction area 102d of the printer 11 wherein the white point $W_1$ and the black point $B_1$ are coincident with the white point $W_3$ and the black point $B_3$ of the proofer 13, respectively.

The above-mentioned operation may be expressed by the following expressions. While FIG. 11A to FIG. 11D show the color reproduction area in the L*a*b* space, it often happens that the Von Kries conversion and the above-mentioned adaptational conversion applying the Von Kries conversion are executed in the XYZ space, and thus here the explanation will be made on the assumption that the XYZ space is adopted. It is noted that the XYZ space is one of the common color spaces in which the coordinate points correspond to those of the L*a*b* space one by one.

When it is assumed that XYZ coordinates of the white point $W_1$ and the black point $B_1$ of the color reproduction area 102a of the printer 11 as shown in FIG. 11A are expressed by ($LXW_1$, $LYW_1$, $LZW_1$) and ($LXB_1$, $LYB_1$, $LZB_1$), respectively, and XYZ coordinates of the white point $W_3$ and the black point $B_3$ of the color reproduction area 302a of the proofer 13 as shown in FIG. 11A are expressed by ($LXW_3$, $LYW_3$, $LZW_3$) and ($LXB_3$, $LYB_3$, $LZB_3$), respectively, XYZ coordinates ($LXW_1'$, $LYW_1'$, $LZW_1'$) and ($LXW_3'$, $LYW_3'$, $LZW_3'$) corresponding to the white points $W_1$ and $W_3$ as shown in FIG. 11B, respectively, are determined in accordance with the equations as set forth below:

$$LXW_1'=LXW_1-LXB_1$$
$$LYW_1'=LYW_1-LYB_1$$
$$LZW_1'=LZW_1-LZB_1 \quad (1)$$
$$LXW_3'=LXW_3-LXB_3$$
$$LYW_3'=LYW_3-LYB_3$$
$$LZW_3'=LZW_3-LZB_3 \quad (2)$$

And thus, there is created a Von Kries matrix for providing rotation and expansion/compression so that the white points $W_1$ ($LXW_1'$, $LYW_1'$, $LZW_1'$) are coincident with the white points $W_3$ ($LXW_3'$, $LYW_3'$, $LZW_3'$).

Here, the Von Kries matrix is expressed by the following expression.

$$VK=[MTXVK] \quad (3)$$

This Von Kries matrix is 3×3 matrix.

Next, in the step a1 of FIG. 8, the coordinate points in the first RGB space depending on the printer 11 is transferred to the L*a*b* space, and further transferred to the XYZ space (or directly transferred from the first RGB space depending on the printer 11 to the XYZ space). When those large number of coordinate points are expressed by (X, Y, Z), this (X, Y, Z) is subjected to the black point correction (cf. FIG. 11B) in accordance with the following equations.

$$x1=X-LXB_1$$
$$Y1=Y-LYB_1$$
$$Z1=Z-LZB_1 \quad (4)$$

Next, the Von Kries conversion is performed (cf. FIG. 11C) in accordance with the following equation.

$$\begin{pmatrix} X2 \\ Y2 \\ Z2 \end{pmatrix} = \begin{pmatrix} MTX_{VK} \end{pmatrix} \begin{pmatrix} X1 \\ Y1 \\ Z1 \end{pmatrix} \quad (5)$$

Next, correction (cf. FIG. 11D) for providing a coincidence of the black point with a black point of the proofer 13 is performed in accordance with the following equations.

$$X'=X2-LXB_3$$
$$Y'=Y2-LYB_3$$
$$Z'=Z2-LZB_3 \quad (6)$$

When the arithmetic operation as mentioned above is performed on all the coordinate points, the color reproduction area 102a of the printer 11, as shown in FIG. 11A, expressed in the L*a*b* space, is converted into the color reproduction area 102d, as shown in FIG. 11D, in which the white point and the black point are coincident with white point and black point of the color reproduction area 302a of the proofer 13, respectively.

When the above-mentioned adaptational conversion is performed in the XYZ space, the coordinates (X, Y, Z) of the black points (the black points $B_1$ and $B_3$ as shown in FIG. 11A) before the adaptational conversion are substantially near (0, 0, 0). Accordingly, the correction of the black points simply serves to slightly change the numerical values. Thus, the adaptational conversion is advantageous in the point that a translation amount is a little when coordinates of the white points are translated in accordance with the equation (1) and the equation (2), and the wide area of the XYZ space may be used to perform an adaptational change. It is noted that the adaptational change is not always to have to be performed in the XYZ space. It is acceptable that the adaptational change is performed in the L*a*b* space, or alternatively in another common color space.

While there is explained the adaptational conversion in which both the white points and the black points are coincident with one another, it is acceptable that the adaptational conversion is performed in such a simple way that only the white points are coincident with one another considering no black points, while accuracy of the color conversion is somewhat degraded.

The adaptational conversion, in which only the white points are coincident with one another, implies a coordinate conversion in which a straight line $L_1$ shown in FIG. 11A is coincident with a straight line $L_3$ shown in FIG. 11A, and the white point $W_1$ is coincident with the white point $W_3$. On a numerical formula basis, the adaptational conversion implies that there is determined a Von Kries matrix for rotation and expansion/compression in such a manner that the white points ($LXW_1$, $LYW_1$, $LZW_1$), are coincident with the white points ($LXW_3$, $LYW_3$, $LZW_3$), without performing the subtraction of coordinates of the black points as in the equation (1) and the equation (2), and the Von Kries matrix is used to convert (X, Y, Z) as it is, without performing the subtraction of coordinates of the black points, as in the equation (4).

Further, the adaptational conversion is needed in case of the color conversion between devices involved in mutually considerably different white from one another on a colorimetric basis, such that a "white" displayed on a display screen of a CRT display, for instance, is a considerably bluish white, and there is a need to print out an image displayed on the display screen of the CRT display. However, in a case where both the "whites" are substantially coincident with one another, such that the printed image 11a printed out on a white sheet by the printer 11 for instance is compared with the proof image 13a printed out on a white sheet by the proofer 13 too, it is acceptable to omit the adaptational conversion, or the second step (the step a21) in the second coordinate conversion step in FIG. 8.

Next, there will be explained the first step (the step a22) in the second coordinate conversion step of the flowchart shown in FIG. 8.

Figure 12:
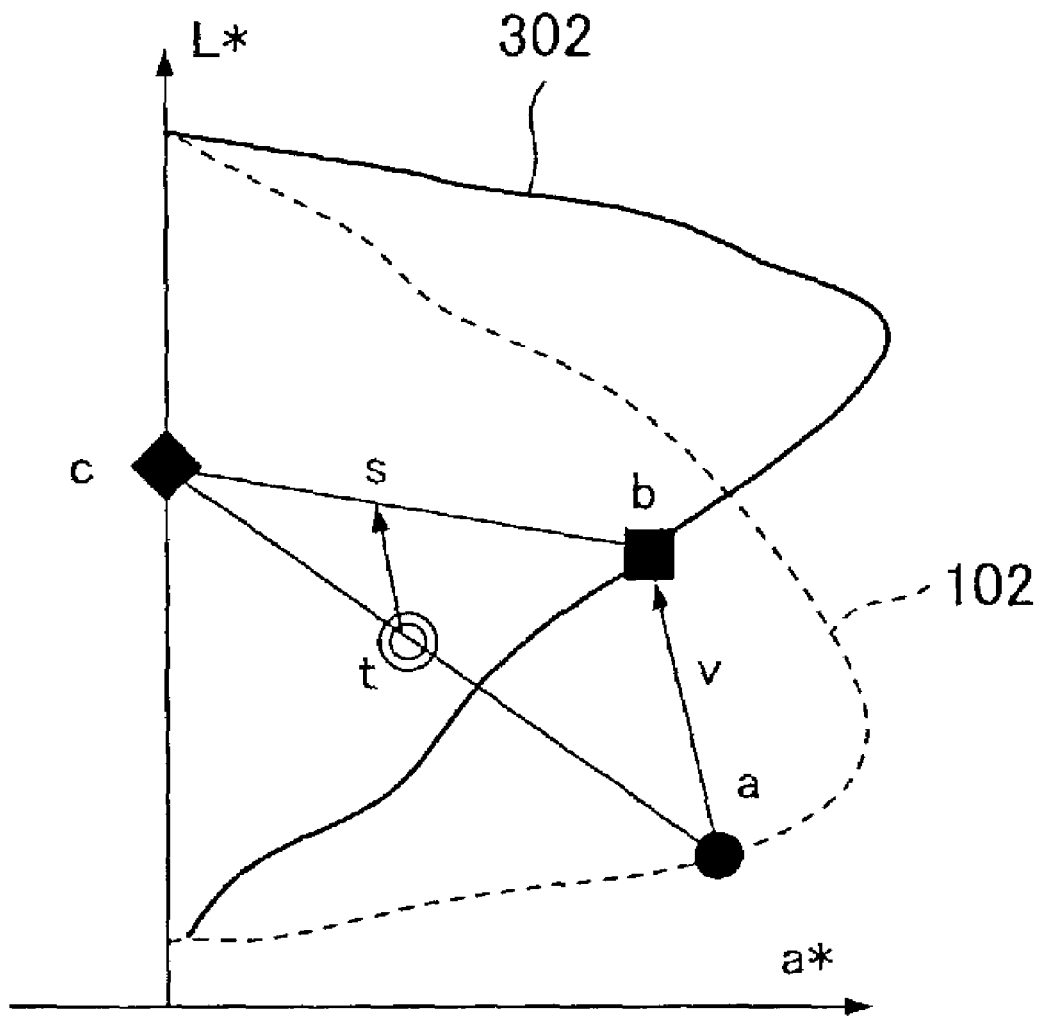
FIG. 12 is an explanatory view useful for understanding a first example of a coordinate conversion in a first step.
Figure 13:
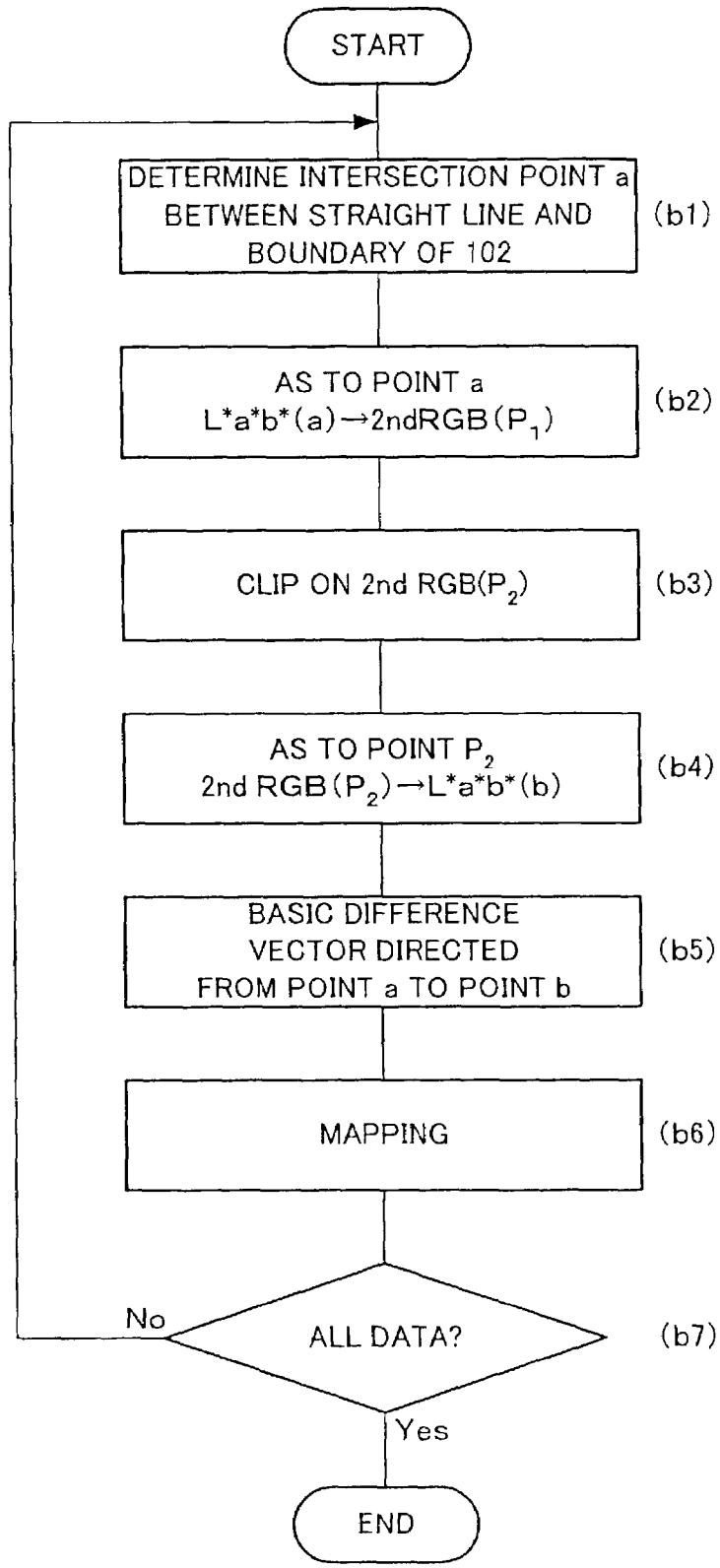
FIG. 13 is a flowchart useful for understanding a first example.

FIG. 12 is an explanatory view useful for understanding a first example of the coordinate conversion in the first step. FIG. 13 is a flowchart useful for understanding the first example. FIG. 12 simply shows, for the sake of convenience of illustration, an $L^*$-$a^*$ plane of the $L^*a^*b^*$ space. Actually, however, a three-dimensional coordinate conversion is carried out in the $L^*a^*b^*$ space. This is applicable to other examples, which will be explained later.

Here, first, a coordinate conversion reference coordinate point c, which is a reference of the coordinate conversion, is set up. While the coordinate conversion reference coordinate point c is arbitrarily set up to some extent empirically or in accordance with a predetermined set up reference, the coordinate conversion reference coordinate point c is set up in a common area of the color reproduction area 102 of the printer 11 transferred to the $L^*a^*b^*$ space and the color reproduction area 302 of the proofer 13. Further, the coordinate conversion reference coordinate point c is set up in the common area and on an $L^*$ axis (a grey axis) according to the present embodiment. As will be understood from explanations set forth below, the above-mentioned set up makes it easy to keep the grey balance, since the coordinate conversion reference coordinate point c has no effect of mapping on other coordinate points. Here, a point of for example, $(L^*a^*b^*) = (50, 0, 0)$ is set up as the coordinate conversion reference coordinate point c.

Incidentally, when the second coordinate conversion step (the step a2) of the flowchart in FIG. 8 includes the adaptational conversion (the step a21) as explained referring to FIG. 11A to FIG. 11D, it is supposed that the color reproduction area 102 of the printer 11 transferred to the $L^*a^*b^*$ space means the color reproduction area after the adaptational conversion.

Here, a coordinate point in the color reproduction area 102 of the printer 11 in the $L^*a^*b^*$ space, which is an object of the mapping, is established as a first coordinate point t.

Now, let us consider a straight line coupling the coordinate conversion reference coordinate point c with the first coordinate point t, and determine an intersection point of the straight line and the boundary of the color reproduction area 102 of the printer 11 (a step b1 in FIG. 13). Here, the intersection point is referred to as a first reference coordinate point a.

The flowchart shown in FIG. 13 is a flowchart in a case where the first reference coordinate point a thus determined is out of the color reproduction area 302 of the proofer 13 transferred to the $L^*a^*b^*$ space, as shown in FIG. 12. When this condition is satisfied, the process advances as follows.

With respect to the first reference coordinate point a thus determined, a transfer from the $L^*a^*b^*$ space to the second RGB color space depending on the proofer 13 is carried out (a step b2). A first reference coordinate point, which is transferred to the second RGB color space, is denoted as $P_1$.

Next, in the second RGB color space, a coordinate value of the first reference coordinate point $P_1$ is clipped, so that the first reference coordinate point $P_1$ is subjected to mapping on the boundary of the color reproduction area of the proofer 13 in the second RGB color space (a step b3). This mapping serves to transfer a point $P_2$, which is obtained on the boundary of the color reproduction area of the proofer 13, from the second RGB color space to the $L^*a^*b^*$ space (a step b4). It is supposed that a coordinate point, which is transferred to the $L^*a^*b^*$ space, is established as a second reference coordinate point b (cf. FIG. 12).

Next, there is determined a basic difference vector v, which is representative of a difference between the first reference coordinate point a shown in FIG. 12 and the second reference coordinate point b shown in FIG. 12, wherein the first reference coordinate point a is a starting point and the second reference coordinate point b is a terminal point (a step b5). And the first coordinate point t of interest for a mapping is translated up to a straight line coupling the coordinate conversion reference coordinate point c with the second reference coordinate point b in the same direction as the basic difference vector v, and this point is established as a second coordinate point s in which the first coordinate point t is subjected to a mapping (a step b6).

Such a coordinate conversion is performed on all the coordinate points in which the first reference coordinate point a determined in the step b1 is out of the color reproduction area 102 of the printer 11, of the coordinate points included in the color reproduction area 102 of the printer 11, transferred to the $L^*a^*b^*$ space (a step b7).

In this manner, the coordinate conversion explained referring to FIG. 12 and FIG. 13 is performed, to determine a direction of the coordinate conversion, or to determine the basic difference vector v, in such a manner that the second RGB color space is used to determine the second reference coordinate point b on the boundary of the color reproduction area of the proofer 13, corresponding to the first reference coordinate point a on the boundary of the color reproduction area of the proofer 13. And the actual mapping is performed in the $L^*a^*b^*$ space.

That is, according to the present embodiment, a direction of the coordinate conversion (mapping) is determined in a color space coincident with a human's sense for color, addressed as the second RGB color space (a color space depending on a device). This makes it possible to suppress discontinuity of a tone and a possibility for providing an unnatural image as less as possible. And since the actual coordinate conversion is performed in the $L^*a^*b^*$ space (the common color space), it is possible to perform the coordinate conversion (mapping) with great accuracy on a color basis.

Incidentally, FIG. 12 is depicted, for the sake of convenience for illustration, in such a way that the coordinate conversion (mapping) is carried out in the two-dimensional plane. Actually, however, as mentioned above, the three-dimensional mapping is performed.

Figure 14:
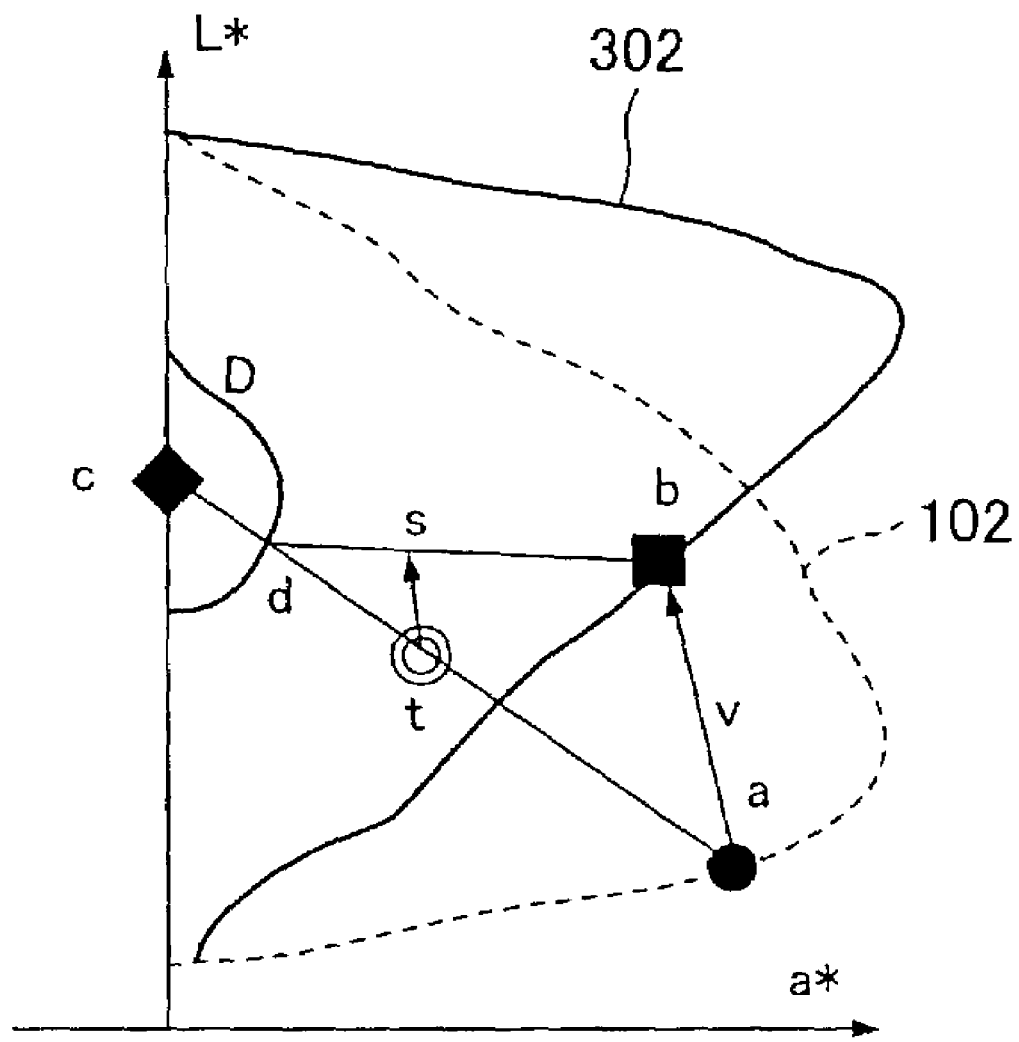
FIG. 14 is a view useful for understanding a modification of the first example of the coordinate conversion.

FIG. 14 is a view useful for understanding a modification of the first example of the coordinate conversion as explained referring to FIG. 12 and FIG. 13.

Here, an area D surrounding the coordinate conversion reference coordinate point c is set up, and there is determined an intersection point d of a straight line coupling the coordinate conversion reference coordinate point c with the first reference coordinate point a and the boundary of the area D. In mapping of the first coordinate point t, the mapping is applied to the coordinate point s on the straight line coupling the intersection point d with the second reference coordinate point b.

This makes it possible to set up an area in which coordinates are not translated, addressed as the area D. As mentioned above, while it was explained that in order to maintain the grey balance it is preferable that coordinates are not translated on the L* axis (the grey axis), setting up the area D as shown in FIG. 14 makes it possible to arbitrarily set up an area in which coordinates are not translated.

Figure 15:
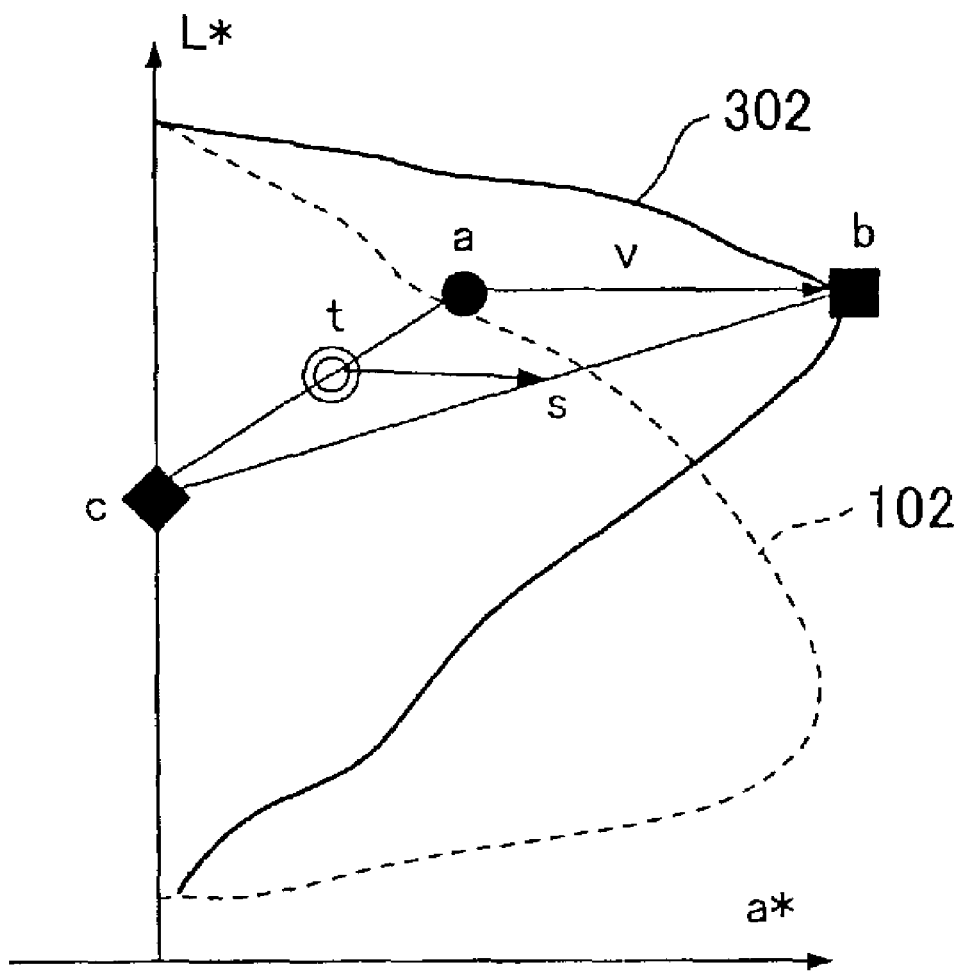
FIG. 15 is an explanatory view useful for understanding a second example of a coordinate conversion in the first step.
Figure 16:
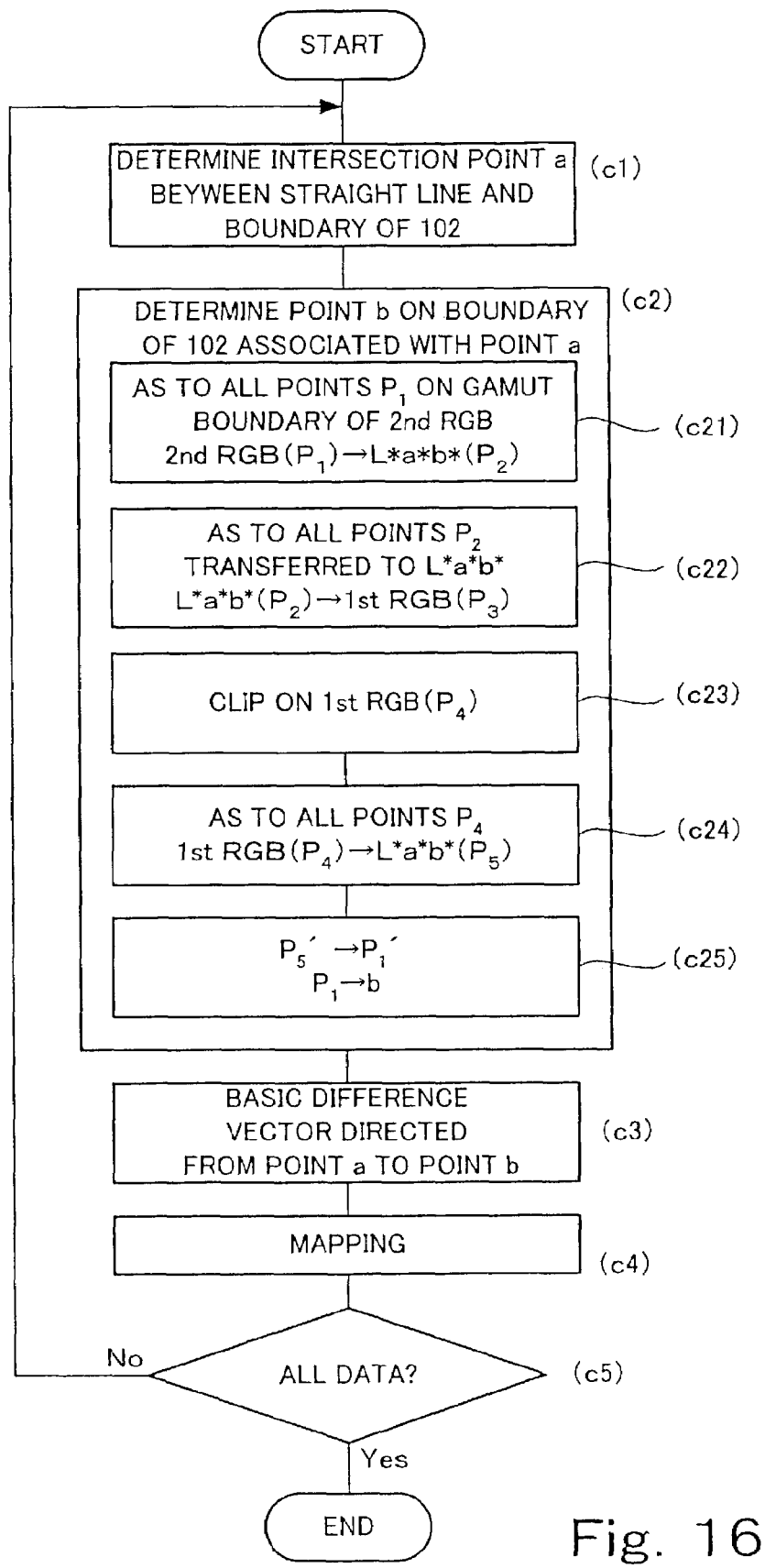
FIG. 16 is a flowchart useful for understanding a second example.

FIG. 15 is an explanatory view useful for understanding a second example of the coordinate conversion in the first step of the flowchart shown in FIG. 8. FIG. 16 is a flowchart useful for understanding the second example.

Here, in a similar fashion to that of the first example explained referring to FIG. 12 and FIG. 13, the coordinate conversion reference coordinate point c, which is a reference of the coordinate conversion, is set up on the L* axis (the grey axis).

Now, let us consider a straight line coupling the coordinate conversion reference coordinate point c with the first coordinate point t, and determine an intersection point of the straight line and the boundary of the color reproduction area 102 of the printer 11 transferred to the L*a*b* space. The intersection point is referred to as a first reference coordinate point a. Here, when the adaptational conversion in the second coordinate conversion step (the step a21) of the flowchart in FIG. 8 is performed, it is supposed that the color reproduction area 102 of the printer 11 transferred to the L*a*b* space means the color reproduction area after the adaptational conversion.

The flowchart shown in FIG. 16 is a flowchart in a case where the first reference coordinate point a thus determined is inside the color reproduction area 302 of the proofer 13 transferred to the L*a*b* space, as shown in FIG. 15, which is different from the flowchart shown in FIG. 13. When this condition is satisfied, the process advances as follows.

Here, there is determined a second reference coordinate point b on the boundary of the color reproduction area of the proofer 14, associated with the first reference coordinate point a on the boundary of the color reproduction area of the printer 11, thus determined (a step c2). To determine the second reference coordinate point b, the technology explained referring to FIG. 12 and FIG. 13 cannot be used, since the first reference coordinate point a is inside the color reproduction area 302 of the proofer 13, as shown in FIG. 15. In other words, in a similar fashion to that of a case where the first reference coordinate point a is out of the color reproduction area 302 of the proofer 13, when the first reference coordinate point a is transferred to the second RGB color space, the transferred first reference coordinate point is located inside the color reproduction area of the proofer 13 in the second RGB color space. And thus it is impossible to use the above-mentioned technology of clipping. For this reason, the second reference coordinate point b is determined in the manner as set forth below.

First, all the points (represented by point $P_1$) on the boundary of the color reproduction area (gamut) of the proofer 13 in the second RGB color space are transferred from the second RGB color space to the L*a*b* space (a step c21). And all the points $P_2$ transferred to the L*a*b* space are transferred to the first RGB color space (a step c22). Next, of points $P_3$ transferred to the first RGB color space, points out of the color reproduction area of the printer 11 on the first RGB color space are subjected to a mapping on the boundary of the color reproduction area of the printer 11, as mentioned above, for example, in such a manner that on each of R, G and B, values of the minus are clipped to 0, and values exceeding 255 are clipped to 255 (a step c23).

All the points $P_4$ transferred to the first RGB color space, thus obtained, and clipped are transferred from the first RGB color space to the L*a*b* space (a step c24). Of points $P_5$ thus transferred to the L*a*b* space, points $P_5'$ coincident to the first reference coordinate point a or closest to the first reference coordinate point are detected, and of all the points $P_1$ on the boundary of the color reproduction area of the proofer 13 in the second RGB color space, points $P_1'$, in accordance with which the points $P_5'$ are obtained, are detected, so that the points $P_1'$ are established as the second reference coordinate point b (a step c25).

Thus, it is possible to determine the second reference coordinate point b associated with the first reference coordinate point a shown in FIG. 15.

Incidentally, in case of the flowchart shown in FIG. 16, all the points $P_1$ on the boundary of the color reproduction area of the proofer 13 in the second RGB color space are transferred uniformly to the first RGB color space. However, it is acceptable that of the coordinate points on the boundary of the color reproduction area 302 of the proofer 13 transferred to the L*a*b* space, shown in FIG. 15, only the coordinate points of the portion going out of the color reproduction area 102 of the printer 11 transferred to the L*a*b* space is transferred to the first RGB color space. Alternatively, regarding the portion going out of the color reproduction area 102, in the event that the coordinate position of the second reference coordinate point b can be further narrowed down in accordance with a conjecture and the like, it is acceptable that only the coordinate points in the narrowed area are transferred to the first RGB color space and then clipped.

In the step c2 shown in FIG. 16, when the second reference coordinate point b is detected, in a similar fashion to that of the flowchart in FIG. 13, as shown in FIG. 15, there is determined a basic difference vector v directed from the first reference coordinate point a to the second reference coordinate point b (a step c3). Further, in a similar fashion to that of the first example in FIG. 12 and FIG. 13, there is determined a second coordinate point associated with the first coordinate point (a step c4).

Such a coordinate conversion is carried out on all the coordinate points in which the first reference coordinate point a determined by the step c1 exists in the color reproduction area 302 of the proofer 13, of the coordinate points in the color reproduction area 102 of the printer 11 transferred to the L*a*b* space (a step c5).

Figure 17:
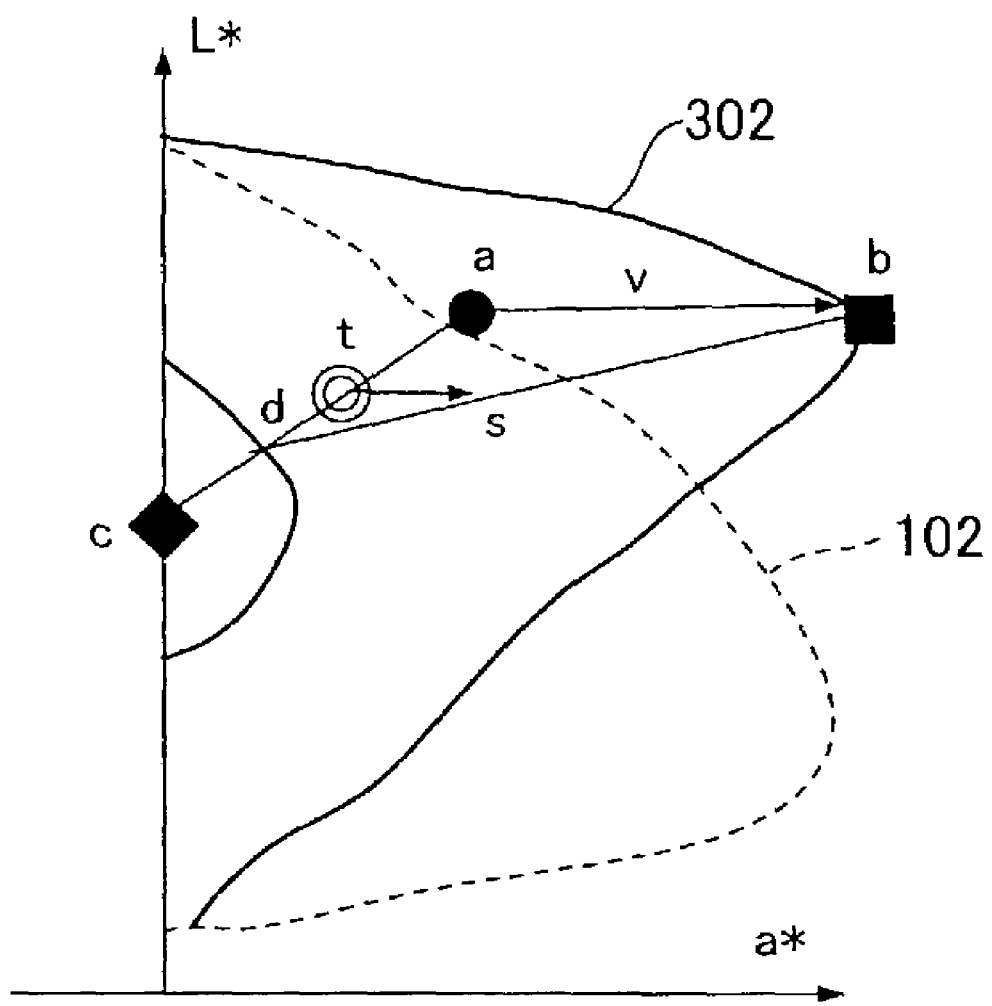
FIG. 17 is a view useful for understanding a modification of the second example of the coordinate conversion.

FIG. 17 is a view useful for understanding a modification of the second example of the coordinate conversion as explained referring to FIG. 15 and FIG. 16.

Here, similar to FIG. 14, an area D surrounding the coordinate conversion reference coordinate point c is set up, and there is determined an intersection point d of a straight line coupling the coordinate conversion reference coordinate point c with the first reference coordinate point a and the boundary of the area D. In mapping of the first coordinate point t, the mapping is applied to the coordinate point s on the straight line coupling the intersection point d with the second reference coordinate point b. This makes it possible to set up an area in which coordinates are not translated, addressed as the area D.

Figure 18:
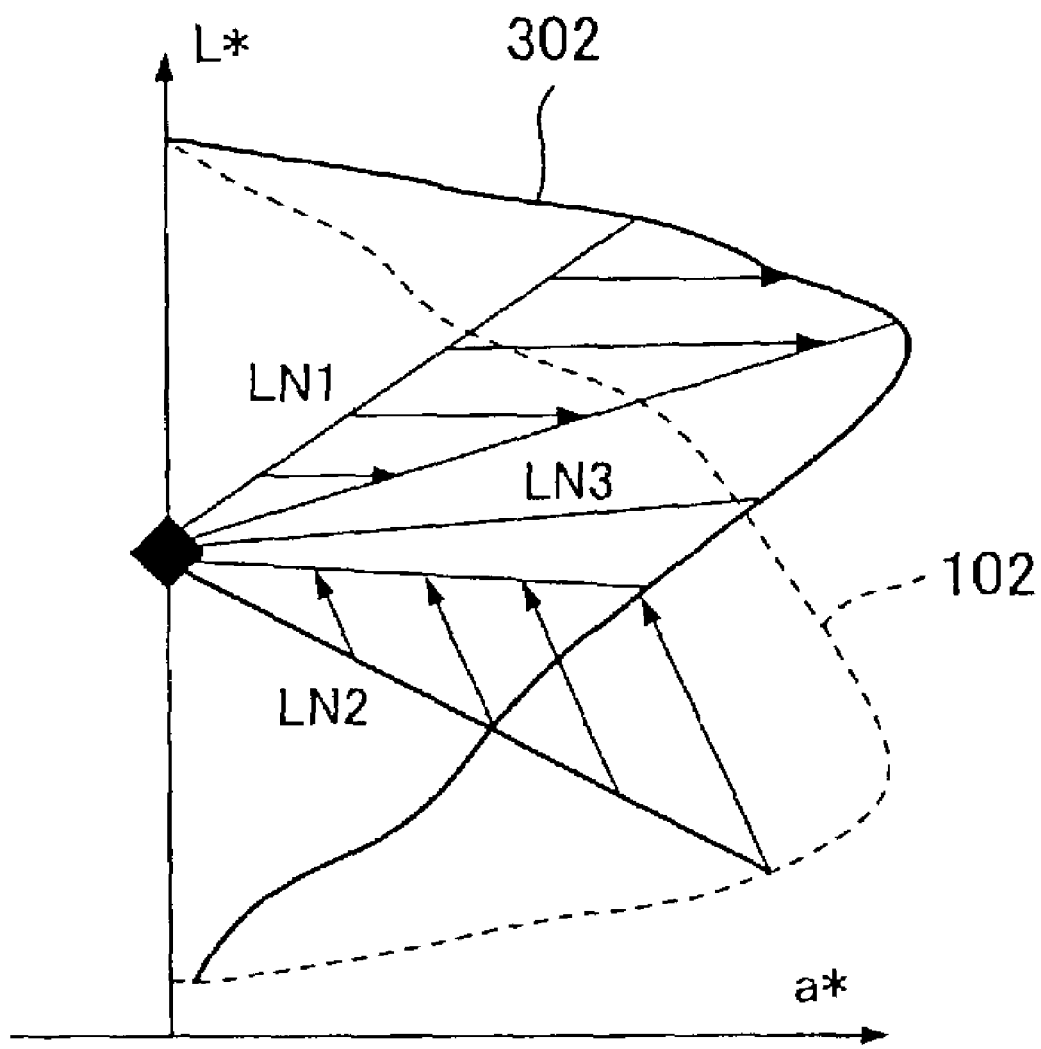
FIG. 18 is an explanatory view useful for understanding an effect of a mapping in combination of "compression" and "expansion".

FIG. 18 is an explanatory view useful for understanding an effect of a mapping in combination of "compression" as explained referring to FIG. 12 and FIG. 13 and "expansion" as explained referring to FIG. 15 and FIG. 16.

Coordinate points on a line LN1, in which the color reproduction area 302 of the proofer 13 on the L*a*b* space is larger than the color reproduction area 102 of the printer 11 on the L*a*b* space, is expanded in such a manner that the color reproduction area 302 of the proofer 13 is used at the maximum. Coordinate points on a line LN2, in which the color reproduction area 102 of the printer 11 is larger than the color reproduction area 302 of the proofer 13, is compressed to such a level that the color reproduction area 302 of the proofer 13 is used at the maximum. The directions of the expansion and the compression are determined utilizing the RGB space depending on the device. Accordingly, even if the mapping is carried out on the L*a*b* space per se, it is possible to suppress discontinuity of a tone and a possibility for providing an unnatural image. And also it is possible to perform a mapping with great accuracy, since the mapping is carried out on the L*a*b* space per se. Coordinate points on a line LN3, in which the color reproduction area 102 of the printer 11 is coincident with the color reproduction area 302 of the proofer 13 in width, are not translated and thereby maintaining the color.

Incidentally, the mapping here to be performed is depicted in FIG. 18 for the sake of convenience for illustration in such a way that it is performed on the L*-a* plane. Indeed, however, the mapping is performed on a three-dimensional basis.

Figure 19:
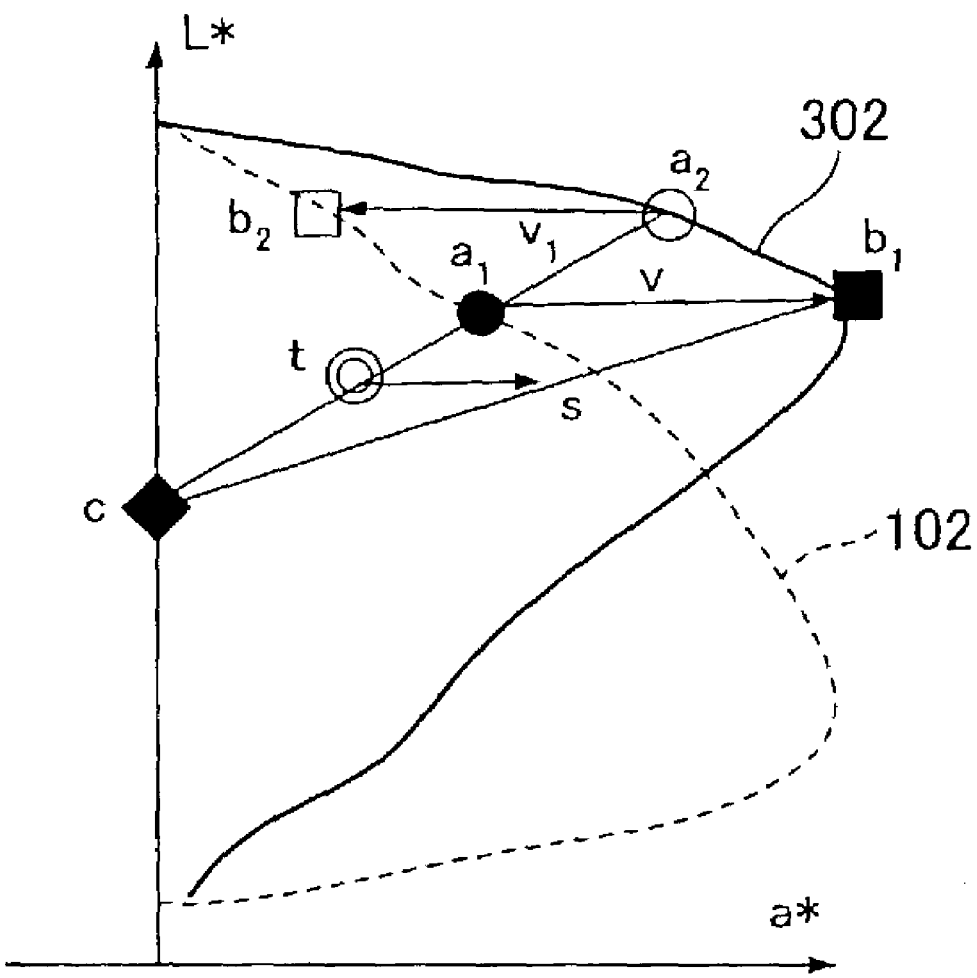
FIG. 19 is an explanatory view useful for understanding a third example of a coordinate conversion in the first step.
Figure 20:
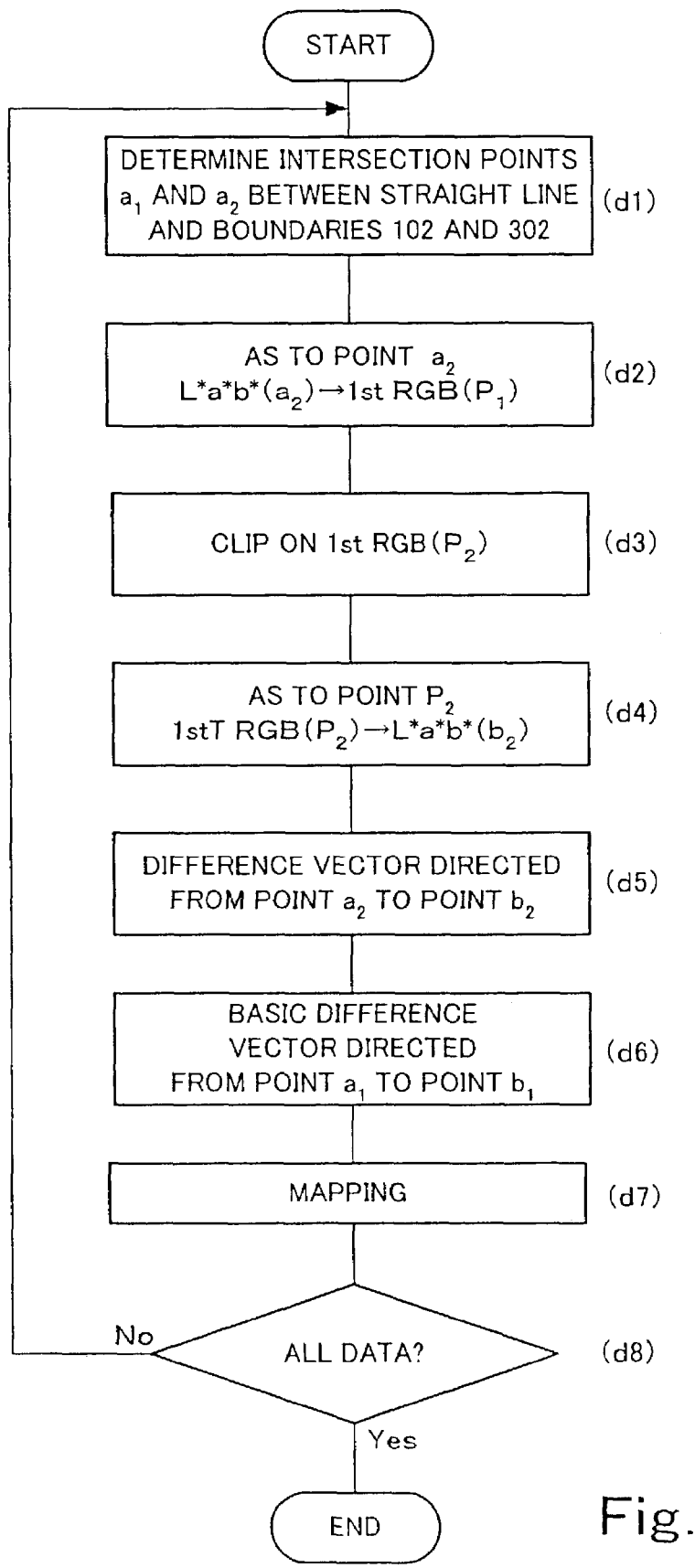
FIG. 20 is a flowchart useful for understanding a third example.

FIG. 19 is an explanatory view useful for understanding a third example of the coordinate conversion in the first step of the flowchart shown in FIG. 8. FIG. 20 is a flowchart useful for understanding the third example. The third example is, in a similar fashion to that of the second example explained referring to FIG. 15 and FIG. 16, an example in which the first reference coordinate point a determined in the step d1 is inside the color reproduction area 302 of the proofer 13 transferred to the L*a*b* space.

Also here, in a similar fashion to that of the first example and the second example, the coordinate conversion reference coordinate point c, which is a reference of the coordinate conversion, is set up on the L*axis (the grey axis). Now, let us consider a straight line coupling the coordinate conversion reference coordinate point c with the first coordinate point t, and determine an intersection point of the straight line and the boundary of the color reproduction area 102 of the printer 11 transferred to the L*a*b* space. The intersection point is referred to as a first reference coordinate point a1. Further, there is determined an intersection point of the straight line and the boundary of the color reproduction area 302 of the color printer transferred to the L*a*b* space. The intersection point is referred to as a third reference coordinate point a2 (a step d1). Here, when the adaptational conversion in the second coordinate conversion step (the step a21) of the flowchart in FIG. 8 is performed, it is supposed that the color reproduction area 102 of the proofer 13 transferred to the L*a*b* space means the color reproduction area after the adaptational conversion. This is the same as the first example and the second example.

Next, the third reference coordinate point a2 thus determined is transferred from the L*a*b* space to the first RGB space depending on the printer 11 (a step d2). A point $P_1$ transferred to the first RGB space is clipped in the first RGB space so that the point $P_1$ is subjected to the mapping on the boundary of the color reproduction area of the printer 11 (a step d3). A point $P_2$ obtained through the mapping is subjected to the mapping on the L*a*b* space (a step d4). A point on the boundary of the color reproduction area 102 of the printer 11 in the L*a*b* space thus obtained is referred to as a forth reference coordinate point b2.

Next, there is determined a difference vector v1 directed from the third reference coordinate point a2 to the fourth reference coordinate point b2 (a step d5). And now let us consider a straight line passing through the first reference coordinate point a1 and being parallel to the difference vector v1. There is determined an intersection point of the straight line and the boundary of the color reproduction area 302 of the proofer 13 on the L*a*b* space. Here, the intersection point is referred to as a second reference coordinate point b1. Next, there is determined a basic difference vector v directed from the first reference coordinate point a1 to the second reference coordinate point b1 (a step d6). Thereafter, in a similar fashion to that of the first example and the second example explained above, the first coordinate point t is subjected to a mapping on a coordinate point (a second coordinate point s) wherein the first coordinate point t is translated in parallel to the basic difference vector v and hits against a straight line coupling the coordinate conversion reference coordinate point c with the second reference coordinate point b1 (a step d7).

Such a coordinate conversion is carried out, of the coordinate points in the color reproduction area of the printer 11 on the L*a*b* space, on all the coordinate points in which in the step d1, the first reference coordinate point a1 located inside the color reproduction area 302 of the color printer on the L*a*b* space is determined (a step d8).

The third example shown in FIG. 19 and FIG. 20 is involved in errors, when there is a great discrepancy between the color reproduction area 102 of the color proofer 13 on the L*a*b* space and the color reproduction area 302 of the proofer 13, that is, there is a great discrepancy between the difference vector v1 and the basic difference vector v. However, when there is a little discrepancy between the difference vector v1 and the basic difference vector v and the error therebetween is negligible, it is possible to adopt the third example. In this case, the third example makes it possible to implement higher-speed arithmetic operation as compared with the second example of the coordinate conversion as explained referring to FIG. 15 and FIG. 16.

Figure 21:
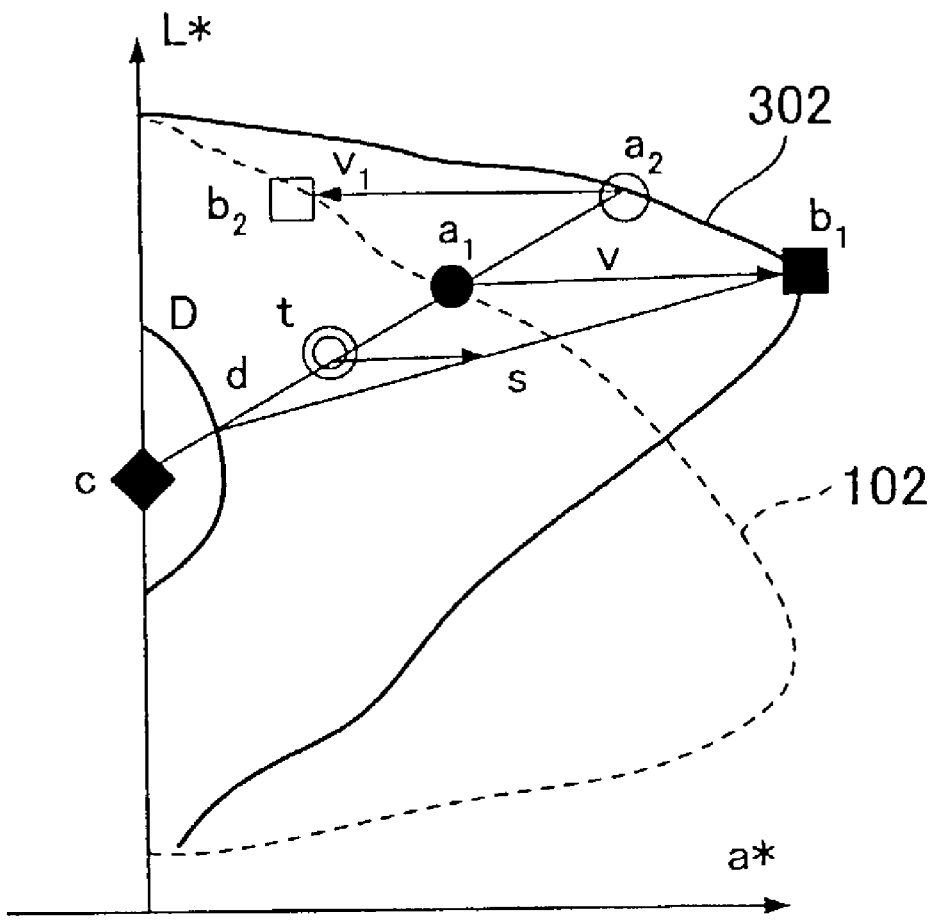
FIG. 21 is a view useful for understanding a modification of the third example of the coordinate conversion.

FIG. 21 is a view useful for understanding a modification of the third example of the coordinate conversion as explained referring to FIG. 19 and FIG. 20.

Here, in a similar fashion to that of FIG. 14 and FIG. 17, an area D surrounding the coordinate conversion reference coordinate point c is set up, and there is determined an intersection point d of a straight line coupling the coordinate conversion reference coordinate point c with the first reference coordinate point a1 and the boundary of the area D. In mapping of the first coordinate point t, the mapping is applied to the coordinate point s on the straight line coupling the intersection point d with the second reference coordinate point b1.

This makes it possible to set up an area in which coordinates are not translated, addressed as the area D.

Figure 22:
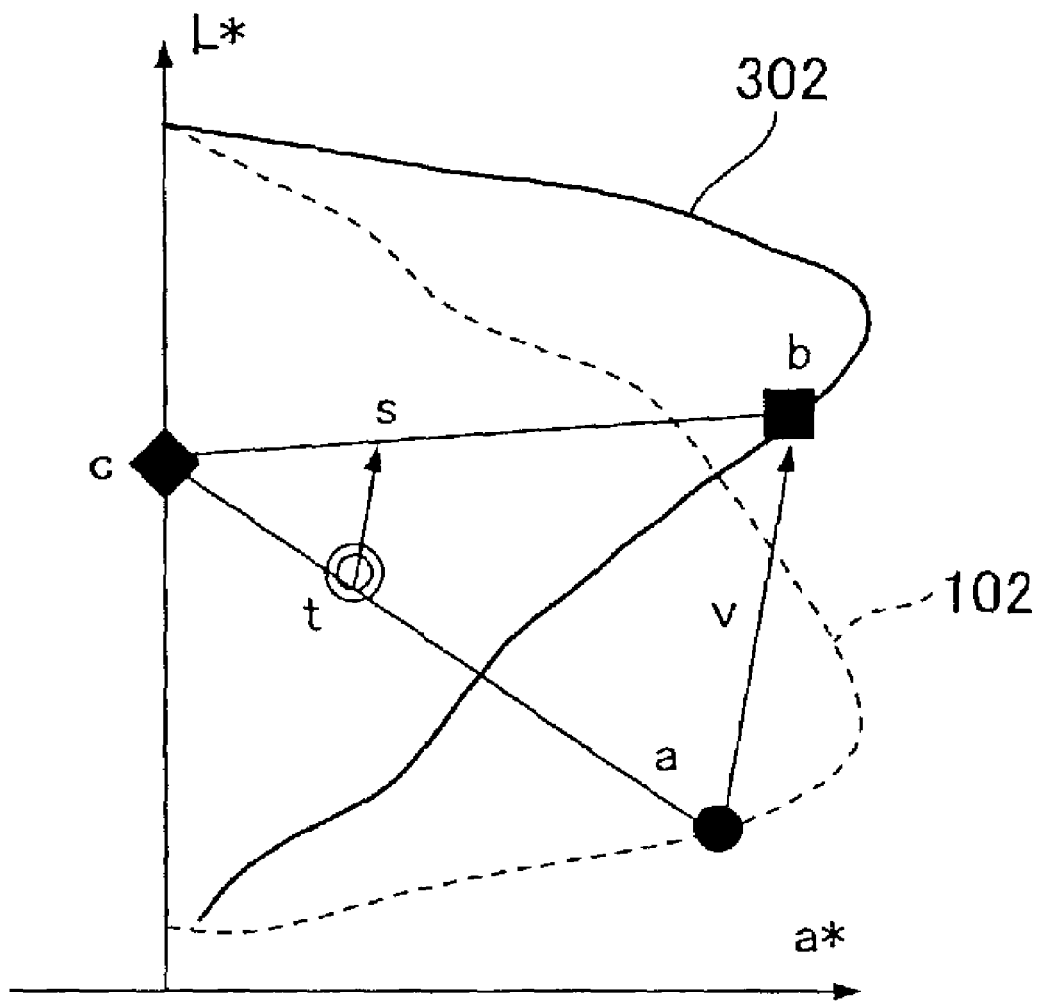
FIG. 22 is an explanatory view useful for understanding a fourth example of a coordinate conversion in the first step.
Figure 23:
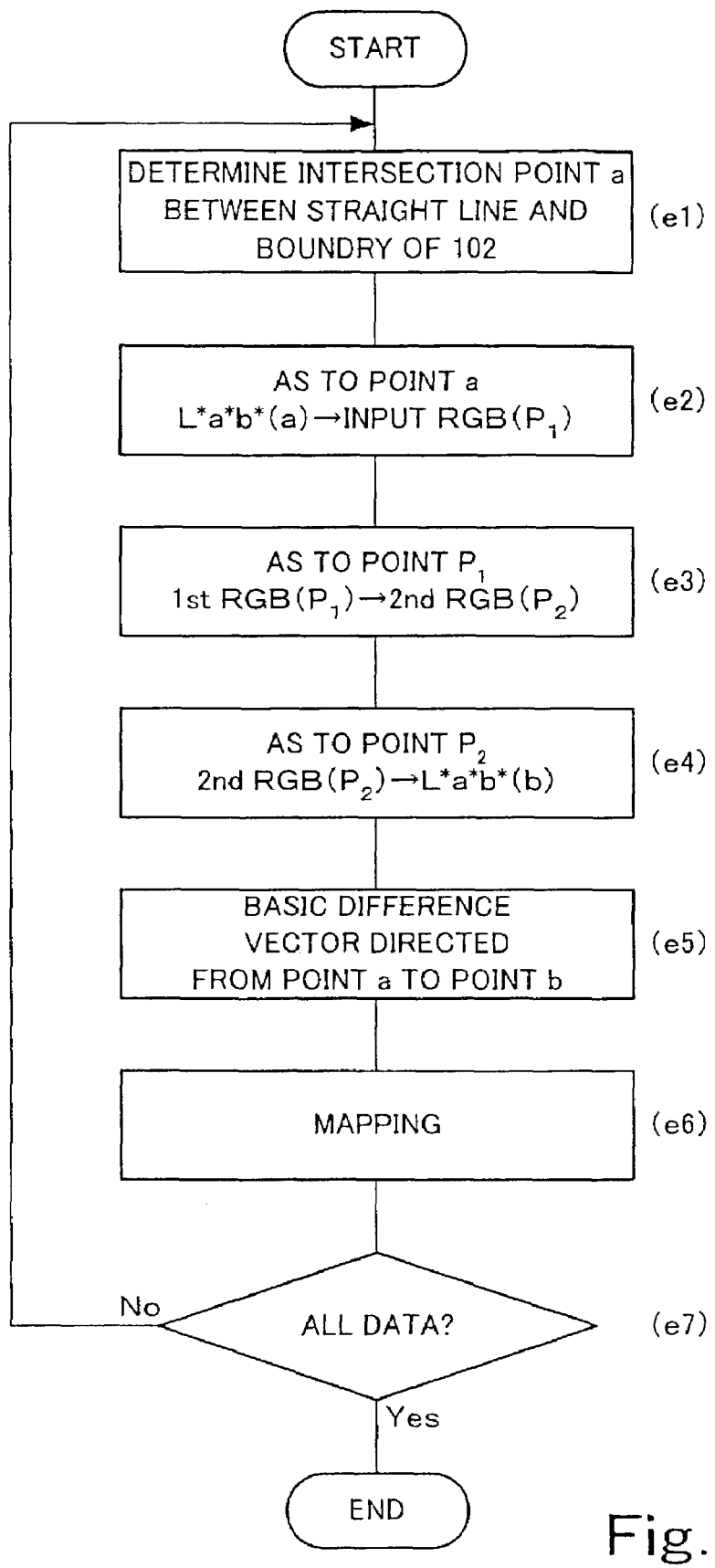
FIG. 23 is a flowchart useful for understanding a fourth example.

FIG. 22 is an explanatory view useful for understanding a fourth example of a coordinate conversion in the first step of the flowchart shown in FIG. 8. FIG. 23 is a flowchart useful for understanding the fourth example.

The fourth example is a method which is applicable without considering as to whether the first reference coordinate point a determined in the step e1 is inside the color reproduction area 302 of the proofer 13 transferred to the L*a*b* space, or the first reference coordinate point a determined in the step e1 is out of the color reproduction area 302.

Also here, in a similar fashion to that of the first example to the third example, the coordinate conversion reference coordinate point c, which is a reference of the coordinate conversion, is set up on the L* axis (the grey axis). Now, let us consider a straight line coupling the coordinate conversion reference coordinate point c with the first coordinate point t, and determine an intersection point of the straight line and the boundary of the color reproduction area 102 of the printer 11 transferred to the L*a*b* space. The intersection point is referred to as a first reference coordinate point a (a step e1).

Next, the first reference coordinate point a is transferred to the first RGB space depending on the printer 11 (a step e2).

Next, there is determined a coordinate point $P_2$ on the second RGB color space, which is a color space depending on the proofer 13, having coordinate values associated with the coordinate values of the point $P_1$ on the first RGB color space transferred to the first RGB color space, typically the same coordinate values as the coordinate values of the point $P_1$ (a step e3). Specifically, for example, when the coordinate points of the point $P_1$, wherein the first reference coordinate point a shown in FIG. 22 is transferred to the first RGB color space, are expressed by (R, G, B)=(0, 255, 0), the point on the second RGB color space having the same coordinate point (R, G, B)=(0, 255, 0) is expressed by the point $P_2$.

Next, the point $P_2$ on the second RGB color space is transferred from the second RGB color space to the L*a*b* space, and the transferred point is expressed by the second reference coordinate point b (a step e4).

The first reference coordinate point a is a point on the boundary of the color reproduction area 102 of the printer 11 on the L*a*b* space. Accordingly, even if the first reference coordinate point a is transferred to the first RGB color space, the first reference coordinate point a offers the point (for example, (R, G, B)=(0, 255, 0)) on the boundary of the color reproduction area of the printer 11 in the first RGB color space.

Assuming that it is concerned with the point on the second RGB color space, the point offers the point on the boundary of the color reproduction area of the proofer 13 in the second RGB color space. Thus, the second reference coordinate point b, which is determined through transfer of the point to the L*a*b* space, also offers the point on the boundary of the color reproduction area 302 of the proofer 13 on the L*a*b* space.

Here, there is determined a basic difference vector v directed from the first reference coordinate point a thus determined to the second reference coordinate point b (a step e5). And there is determined the second coordinate point s, that is an intersection point of a straight line passing through the first coordinate point t and being parallel to the basic difference vector v, and a straight line coupling the coordinate conversion reference coordinate point c with the second reference coordinate point b (a step e6).

The above-mentioned coordinate conversion is sequentially carried out throughout the color reproduction area 102 of the printer 11 on the L*a*b* space.

Figure 24:
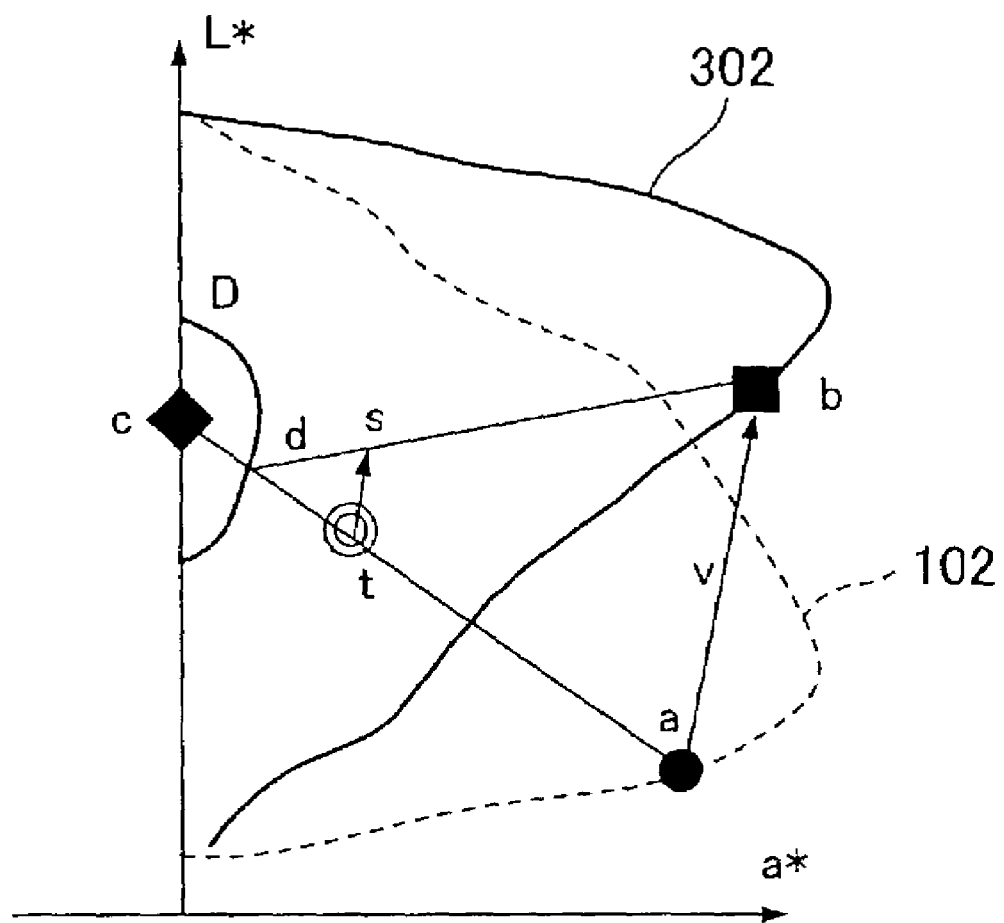
FIG. 24 is a view useful for understanding a modification of the fourth example of the coordinate conversion.

FIG. 24 is a view useful for understanding a modification of the fourth example of the coordinate conversion as explained referring to FIG. 22 and FIG. 23.

Here, in a similar fashion to that of FIG. 14, FIG. 17 and FIG. 21, an area D surrounding the coordinate conversion reference coordinate point c is set up, and the area D is not subjected to a mapping. A technology, in which the area D is not subjected to a mapping, is the same as those of FIG. 14, FIG. 17 and FIG. 21, and the redundant explanation will be omitted.

Next, returning to FIG. 8, there will be described the third coordinate conversion step (a step a3).

In the third coordinate conversion step (a step a3), the coordinate points in the color reproduction area 302 of the proofer 13, after a coordinate conversion (a mapping) from the color reproduction area 102 of the printer 11 to the color reproduction area 302 of the proofer 13 on the L*a*b* space, are transferred to the second RGB color space in accordance with a color reproduction quality (a proofer profile) of the proofer 13.

According to the first color conversion definition creating step (a step (A) of the color conversion definition creating method shown in FIG. 4 (the first color conversion definition creating section 41 of the color conversion definition creating program 40 shown in FIG. 5, and the first color conversion definition creating section 51 of the color conversion definition creating apparatus 50 shown in FIG. 6), there is determined in the manner as mentioned above the first color conversion definition for converting coordinate points in the color reproduction area of the printer 11 in the first RGB color space depending on the printer 11 into coordinate points in the color reproduction area (the color reproduction area closed to the color reproduction area of the printing system 12) of the proofer 13 in the second RGB color space depending on the proofer 13 having a color reproduction area which is roughly the same as the color reproduction area of the printing system 12.

Next, there will be described details of the second color conversion definition creating step (a step (B) of the color conversion definition creating method shown in FIG. 4 (the second color conversion definition creating section 42 of the color conversion definition creating program 40 shown in FIG. 5, and the second color conversion definition creating section 52 of the color conversion definition creating apparatus 50 shown in FIG. 6).

Figure 25:
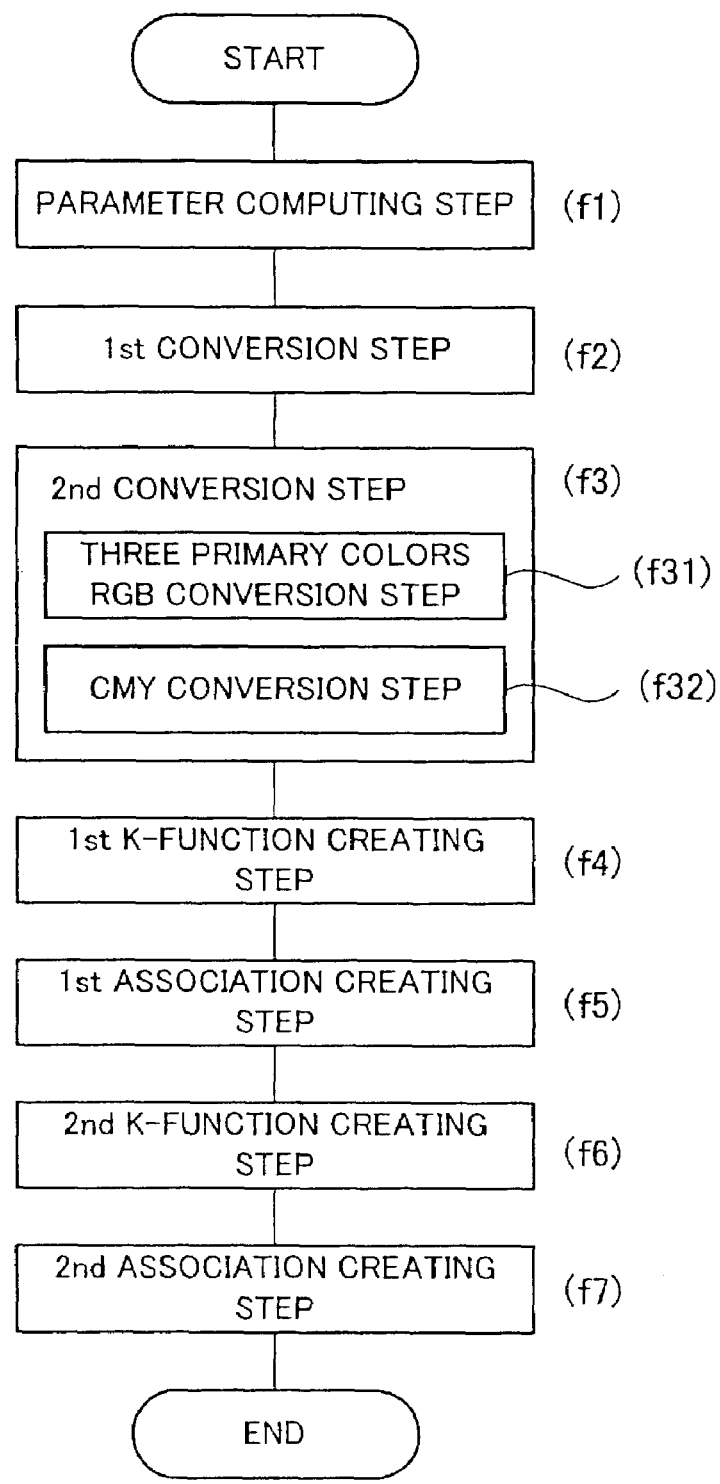
FIG. 25 is a flowchart useful for understanding details of a second color conversion definition creating step constituting the color conversion definition creating method shown in FIG. 4.

FIG. 25 is a flowchart useful for understanding details of a second color conversion definition creating step constituting the color conversion definition creating method shown in FIG. 4.

The second color conversion definition creating step comprises a parameter computing step (step f1), a first conversion step (step f2), a second conversion step (step f3), a first K-function creating step (step f4), a first association creating step (step f5), a second K-function creating step (step f6), and a second association creating step (step f7). The second conversion step (step f3) comprises a three primary colors RGB conversion step (step f31) and a CMY conversion step (step f32).

The parameter computing step (step f1) computes parameters for converting coordinate points in a common color space (colorimetric data) (here XYZ data in the XYZ color space) into coordinate points of three primary colors RGB space (three primary colors RGB data) in accordance with a chromaticity value of a predetermined white point on x-y chromaticity diagram and chromaticity values of three points associated with RGB three primary colors on the x-y chromaticity diagram. Here, defined as three points associated with RGB three primary colors are vertexes of a triangle including the reproducible color gamut, which are located at three straight lines on the x-y chromaticity diagram, coupling the predetermined white point on x-y chromaticity diagram with three points representative of main wavelengths of RGB three primary colors of the reproducible color gamut on the x-y chromaticity diagram associated with a gathering of full colors capable of being reproduced in a color reversal film.

The first conversion step (step f2) converts RGB data (coordinate points in the second RGB color space) after conversion according to the first color conversion definition determined in the above-mentioned first color conversion definition creating step, into colorimetric data (here XYZ data) for device non-dependence in accordance with a color reproduction quality (a proofer profile) of the proofer 13 shown in FIG. 1.

The second conversion step (step f3) converts the colorimetric data (XYZ) determined in the first conversion step (step f2) into CMY data (coordinate points in the CMY color space) representative of a combination of C, M and Y. The second conversion step (step f3) comprises the three primary colors RGB conversion step (step f31) and the CMY conversion step (step f32). The three primary colors RGB conversion step (step f31) converts the colorimetric data XYZ (coordinate points in the common color space) into three primary colors RGB data (coordinate points in the three primary color space) representative of a combination of values of three primary colors R, G and B in accordance with the parameters computed in the parameter computing step (step f1). The CMY conversion step (step f32) creates CMY data (coordinate points in the CMY color space) in such a manner that values of three primary colors R, G and B represented by the three primary colors RGB data obtained in the three primary colors RGB conversion step (step f31) are subjected to a logarithmic transformation.

The first K-function creating step (step f4) sets up a first color conversion parameter and determines a first function of K from CMY data of C=M=Y of CMY data (coordinate points in the CMY color space) determined in the second conversion step (step f3) in accordance with a data conversion algorithm for converting the CMY data (coordinate points in the CMY color space) into CMYK data (coordinate points in the CMYK color space) having a printability according to the first color conversion parameter set up.

The first association creating step (step f5) determines CMYK data bound by the first function of K determined in the first K-function creating step (step f4), associated with the same colorimetric data as the colorimetric data associated with CMY data of C=M=Y of CMY data determined in the second conversion step (step f3), in accordance with a color reproduction quality (a printing profile) of the printing system 12 (cf. FIG. 1), so that a first association for providing an association between the CMY data (coordinate points in the CMY color space) of C=M=Y and the CMYK data (coordinate points in the CMYK color space) is determined.

The second K-function creating step (step f6) sets up a second color conversion parameter based on the first association determined in the first association creating step (step f5) instead of the first color conversion parameter, on the data conversion algorithm, and determines a second function of K over an arbitrary combination of C, M and Y from the CMY data (coordinate points in the CMY color space) determined in the second conversion step (step f3), in accordance with the data conversion algorithm on which the second color conversion parameter is set up.

The second association creating step (step f7) determines CMYK data (coordinate points in the CMYK color space) bound by the second function of K determined in the second K-function creating step (step f6), associated with the same colorimetric data as the colorimetric data associated with an arbitrary combination (arbitrary coordinate points in the CMY color space) of C, M and Y of the CMY data determined in the second conversion step (step c), in accordance with the printing profile of the printing system (cf. FIG. 1), so that a second association for providing an association between the arbitrary combination (arbitrary coordinate points in the CMY color space) of C, M and Y of the CMY data and the CMYK data (coordinate points in the CMYK color space) is determined.

That is, the first conversion step (step f2) determines a relation between the RGB data representative of coordinate points in the second RGB color space and the colorimetric data (XYZ) representative of coordinate points in the common color space. The second conversion step (step f3) determines a relation between the colorimetric data (XYZ) representative of coordinate points in the common color space and the CMY data representative of coordinate points in the CMY color space. And passing through the middle steps, the second association creating step (step F7) determines a relation between the CMY data representative of coordinate points in the CMY color space and the CMYK data representative of coordinate points in the CMYK color space. Thus, there is obtained the second color conversion definition referred to in the present invention, representative of a relation between the RGB data representative of coordinate points in the second RGB color space and the CMYK data representative of coordinate points in the CMYK color space.

The second color conversion definition thus determined is combined with the first color conversion definition determined as mentioned above (or determined in the first color conversion definition creating step of the color conversion definition creating method in FIG. 8), so that a color conversion definition for converting coordinate points in the first RGB color space into the coordinate points in the CMYK color space is created. The color conversion definition thus created is set to the color conversion apparatus 10 shown in FIG. 1. According to the present embodiment, however, the color conversion apparatus 10 shown in FIG. 1 is implemented on the same personal computer as the color conversion definition creating apparatus of the present embodiment. Accordingly, the "setting" of the color conversion definition means that the color conversion definition thus created is placed in the available condition by a color conversion program operative in the personal computer.

The color conversion definition set to the color conversion apparatus 10 shown in FIG. 1 is used when the RGB data (RGB data representative of coordinate points in the first RGB color space) for the printer 11 representative of the actual image is converted into the CMYK data for printing, in the color conversion apparatus 10. The CMYK data, which is created in accordance with the color conversion definition, is coincident with RGB data for the proofer 13 on a colorimetric basis, and also be suitable for printing in the printing system 12. Where the RGB data for the proofer 13 is not always completely coincident with the RGB data for the printer 11 on a colorimetric basis, but is in a preferable relation with the RGB data for the printer 11 in a point that a color in impression is very close to a color of the printed image 11a outputted by the printer 11.

Figure 26:
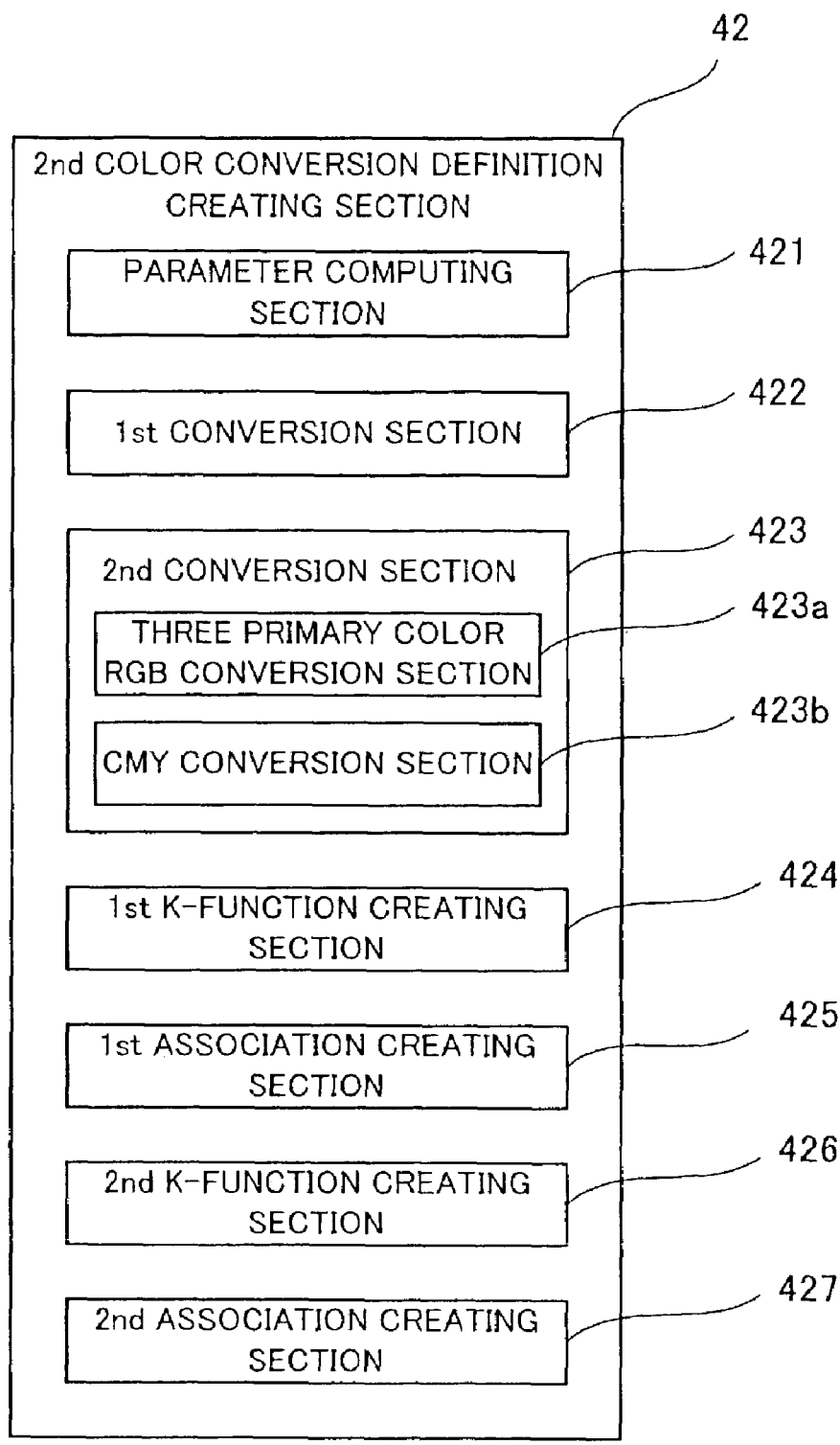
FIG. 26 is a view useful for understanding details of the second color conversion definition creating section of the color conversion definition creating program shown in FIG. 5.

FIG. 26 is a view useful for understanding details of the second color conversion definition creating section 42 of the color conversion definition creating program 40 shown in FIG. 5.

The second color conversion definition creating section 42 shown in FIG. 26 comprises a parameter computing section 421, a first conversion section 422, a second conversion section 423, a first K-function creating section 424, a first association creating section 425, a second K-function creating section 426, and a second association creating section 427. The second conversion section 423 comprises a three primary colors RGB conversion section 423a and a CMY conversion section 423b.

The parameter computing section 421, the first conversion section 422, the second conversion section 423 (the three primary colors RGB conversion section 423a and the CMY conversion section 423b), the first K-function creating section 424, the first association creating section 425, the second K-function creating section 426, and the second association creating section 427, which constitute the second color conversion definition creating section 42, are program components executing processing of the parameter computing step (step f1), the first conversion step (step f2), the second conversion step (step f3) (the three primary colors RGB conversion step (step f31) and the CMY conversion step (step f32)), the first K-function creating step (step f4), the first association creating step (step f5), the second K-function creating step (step f6), and the second association creating step (step f7), respectively, of the second color conversion definition creating step of the color conversion definition creating method shown in FIG. 25, when the color conversion definition creating program 40 (cf. FIG. 5) including the second color conversion definition creating section 42 is installed in the personal computer 20 shown in FIG. 2 and FIG. 3 and is executed.

Detailed explanation for the respective sections 421 to 427 constituting the second color conversion definition creating section 42 will be described later.

Figure 27:
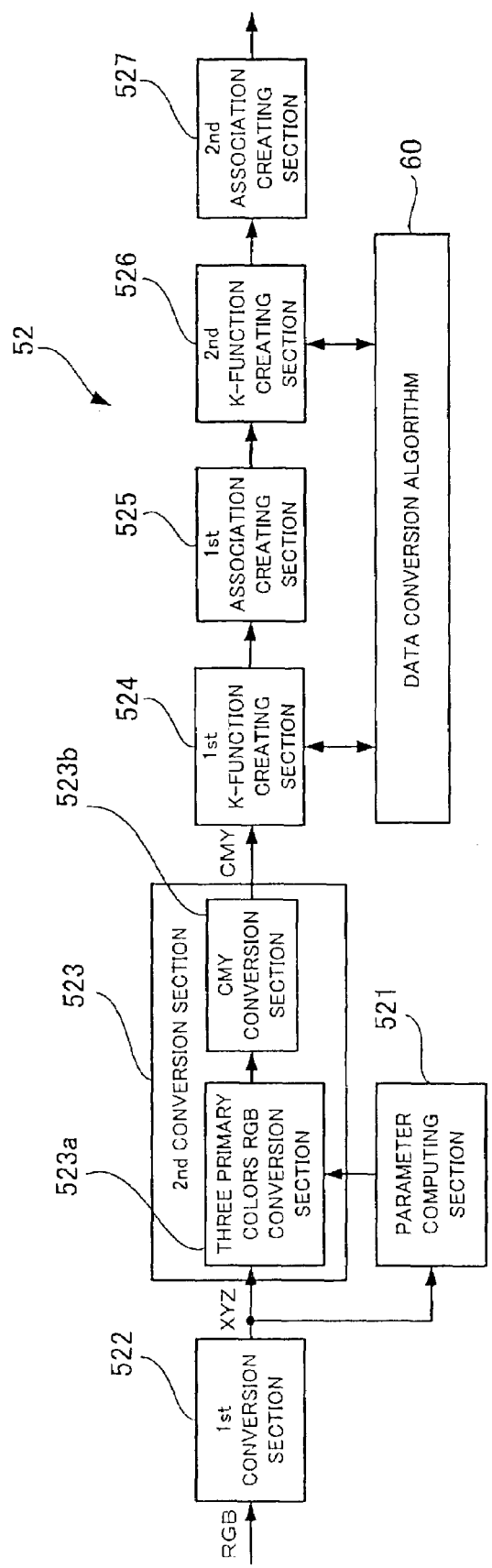
FIG. 27 is a view useful for understanding details of a second color conversion definition creating section of the color conversion definition creating apparatus shown in FIG. 6.

FIG. 27 is a view useful for understanding details of the second color conversion definition creating section 52 of the color conversion definition creating apparatus 50 shown in FIG. 6.

The second color conversion definition creating section 52 shown in FIG. 27 comprises a parameter computing section 521, a first conversion section 522, a second conversion section 523, a first K-function creating section 524, a first association creating section 525, a second K-function creating section 526, and a second association creating section 527. The second conversion section 523 comprises a three primary colors RGB conversion section 523a and a CMY conversion section 523b. FIG. 27 shows a data conversion algorithm 60 with one block. It is acceptable that the data conversion algorithm 60 is defined in the personal computer 20 shown in FIG. 2 and FIG. 3. Alternatively it is acceptable that the data conversion algorithm 60 is defined in another personal computer, and the first K-function creating section 524 and the second K-function creating section 526 perform the communication with the another personal computer to use the data conversion algorithm 60. Here, for the purpose of simplification, it is assumed that the data conversion algorithm 60 is defined in the same personal computer as the personal computer 20 shown in FIG. 2 and FIG. 3, in which the color conversion definition creating apparatus 50 (cf. FIG. 6) is constructed.

The parameter computing section 521, the first conversion section 522, the second conversion section 523 (the three primary colors RGB conversion section 523a and the CMY conversion section 523b), the first K-function creating section 524, the first association creating section 525, the second K-function creating section 526, and the second association creating section 527, which constitute the second color conversion definition creating section 52 shown in FIG. 27, correspond to the parameter computing section 421, the first conversion section 422, the second conversion section 423 (the three primary colors conversion section 423a and the CMY conversion section 423b), the first K-function creating section 424, the first association creating section 425, the second K-function creating section 426, and the second association creating section 427, which constitute the second color conversion definition creating section 42 of the color conversion definition creating program shown in FIG. 26, respectively. It is noted, however, that the elements shown in FIG. 27 are constructed by a combination of the hardware of the personal computer 20 shown in FIG. 2 and FIG. 3 with OS (operation system) and application program to be executed in the personal computer 20, while the elements of the color conversion definition creating program shown in FIG. 26 are constructed by only the application program.

The functions of the respective elements of the second color conversion definition creating section 52 in FIG. 27 are the same as those of the associated elements of the second color conversion definition creating section constituting the color conversion definition creating program when the color conversion definition creating program 40 (cf. FIG. 5) including the second color conversion definition creating section 42 in FIG. 26 is installed in the personal computer 20 shown in FIG. 2 and FIG. 3 and executed. Thus, detailed explanations of the functions of the respective elements of the second color conversion definition creating section 52 in FIG. 27 will be made later together with the functions of the respective steps of the second color conversion definition creating step of FIG. 25 and the functions of the respective elements of the second color conversion definition creating section 42 of FIG. 26. Also detailed explanation of the data conversion algorithm 60 shown in FIG. 27 will be made later.

Next, there will be described the steps of the second color conversion definition creating step of FIG. 25, the program parts of the second color conversion definition creating section 42 of FIG. 26, and the sections of the second color conversion definition creating section 52 of FIG. 27.

The program parts of the second color conversion definition creating section 42 of FIG. 26, and the sections of the second color conversion definition creating section 52 of FIG. 27 are associated with the steps of the second color conversion definition creating step of FIG. 25, respectively. Hereinafter, there will be explained the steps of the second color conversion definition creating step of FIG. 25. The explanation of the steps of the second color conversion definition creating step of FIG. 25 will serve as the explanation of the program parts of the second color conversion definition creating section 42 of FIG. 26, and the sections of the second color conversion definition creating section 52 of FIG. 27.

In the parameter computing step (step f1) of the second color conversion definition creating step of FIG. 25, a parameter for converting colorimetric data into three primary colors RGB data is computed in the manner as set for below.

This parameter computing step is not always needed for the present invention. In the event that the parameter is already computed, it is effective that the parameter is obtained.

As a typical example of the color system representative of colorimetric data, there exists, for example, L*a*b* and the like besides XYZ. Those can be converted into XYZ uniquely. Here, XYZ is dealt with.

Conversion from XYZ data into three primary colors RGB data is performed in accordance with formula (7) set forth below. Where elements $A_{ij}$ (i, j=1, 2, 3) of a matrix $(A_{ij})$ in the formula (7) are parameters to be determined.

$$\begin{bmatrix} R \\ G \\ B \end{bmatrix} = \begin{bmatrix} A_{11} & A_{12} & A_{13} \\ A_{21} & A_{22} & A_{23} \\ A_{31} & A_{32} & A_{33} \end{bmatrix} \begin{bmatrix} X \\ Y \\ Z \end{bmatrix} \quad (7)$$

Figure 28:
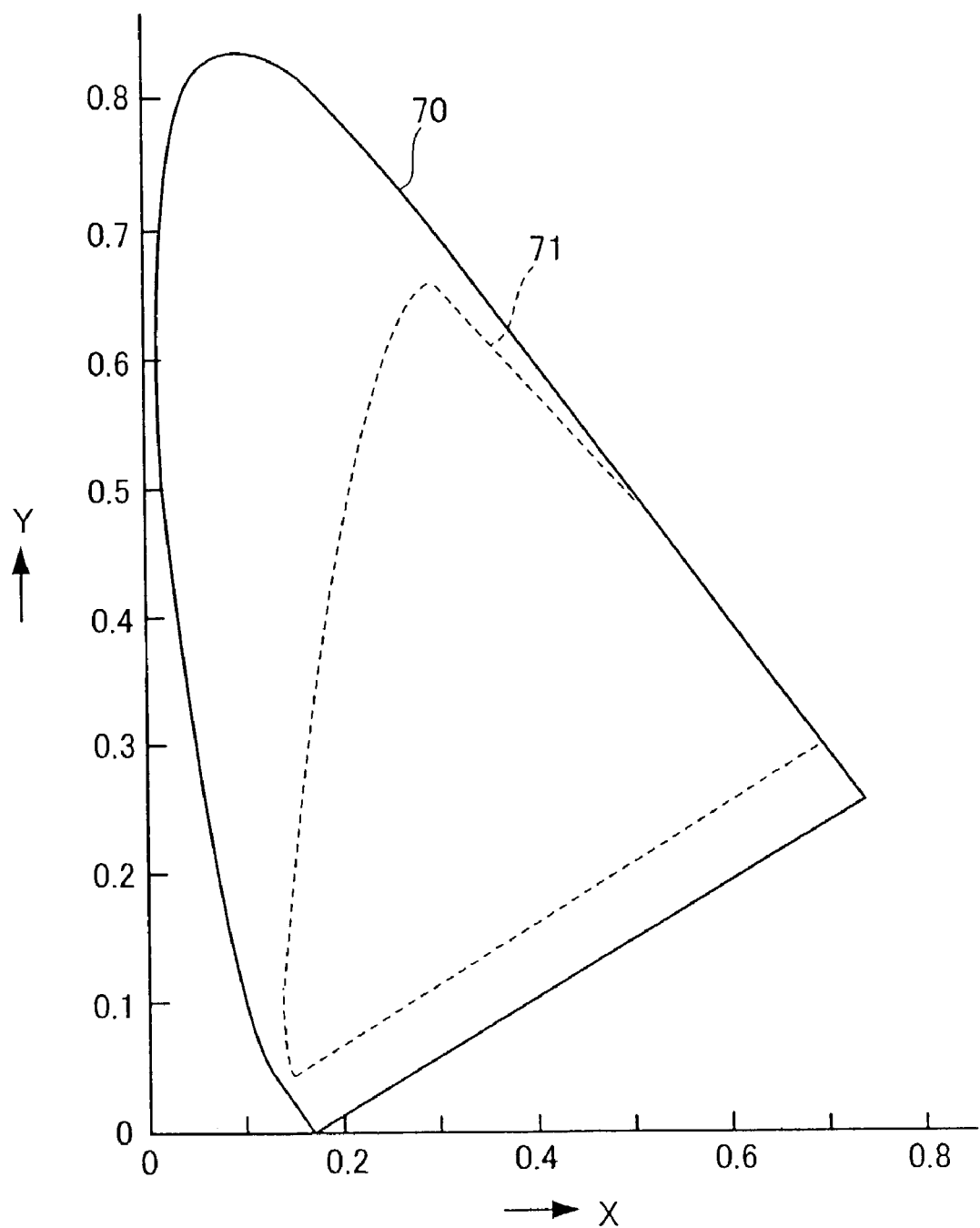
FIG. 28 is an explanatory view useful for understanding x-y chromaticity diagram.
Figure 29:
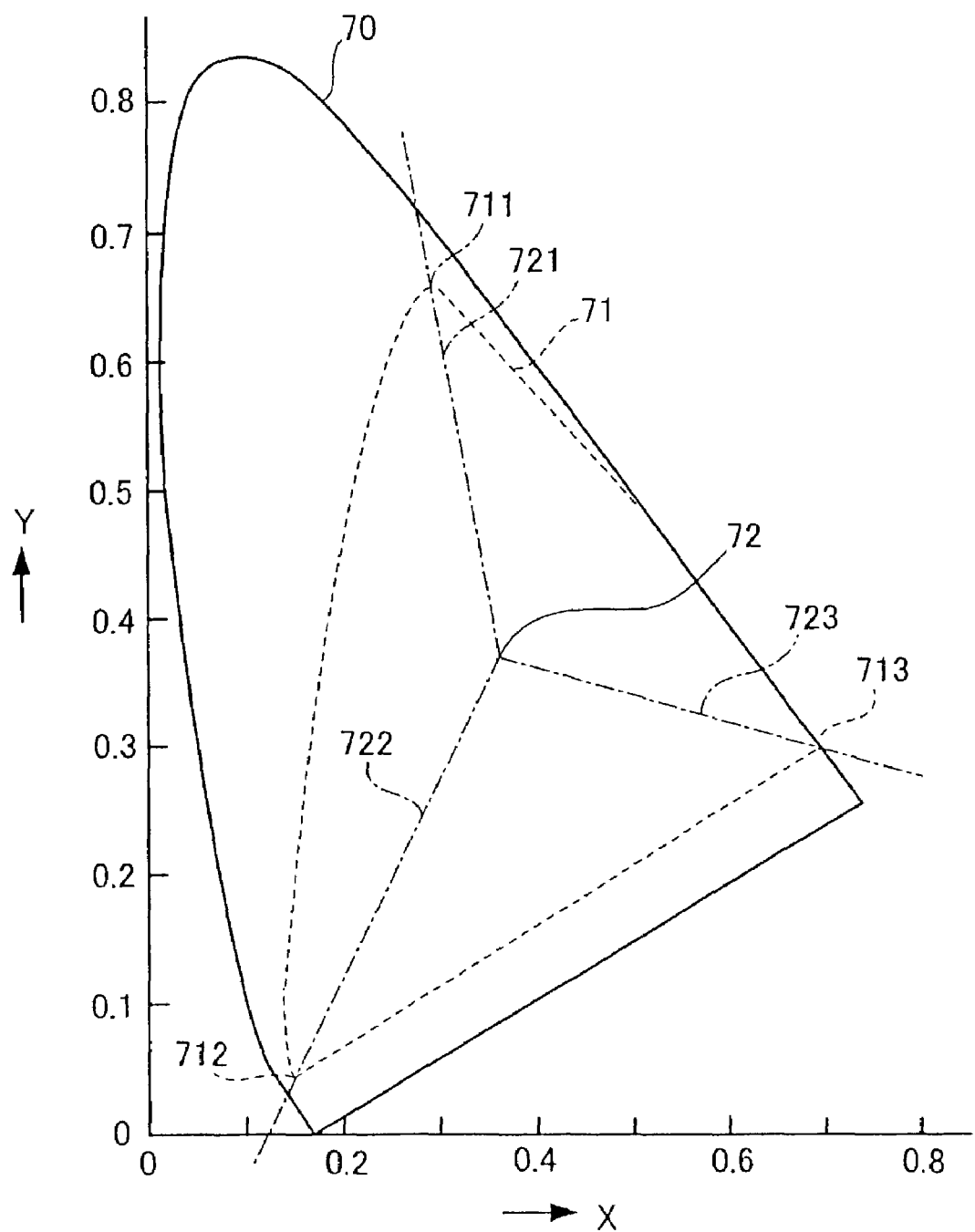
FIG. 29 is an explanatory view useful for understanding x-y chromaticity diagram.
Figure 30:
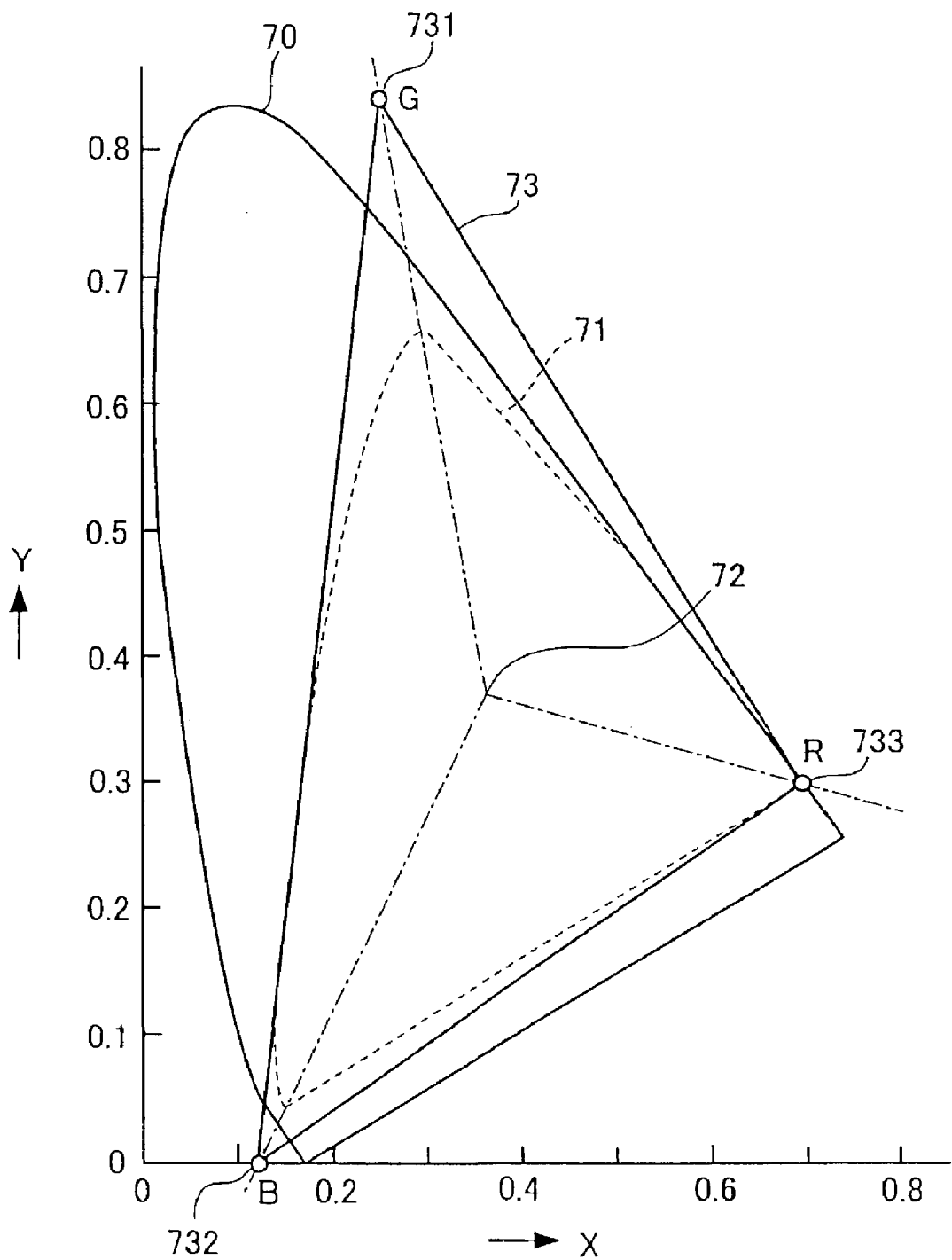
FIG. 30 is an explanatory view useful for understanding x-y chromaticity diagram.

FIG. 28 to FIG. 30 are explanatory views useful for understanding x-y chromaticity diagrams.

FIG. 28 shows a reproducible color gamut 71 in a full color gamut 70 encircling the whole area of existing colors. The reproducible color gamut 71 is an area encircling a large number of points (for example, 729 points) on x-y chromaticity diagram determined from colorimetric data of XYZ obtained in such a manner that there is created a color chart consisting of a large number (for example, 729 colors) of color patches, which is of the maximum capable of being represented as colors on a reversal film, and the color chart is measured by a calorimeter.

The reason why the reproducible color gamut of the reversal film is adopted is that the reversal film is a recording medium having a considerably broad reproducible color gamut of the various recording mediums capable of recording images. It is noted that an adoption of the reversal film simply implies a typical example, and it is acceptable that recording mediums besides the reversal film or a reproducible color gamut of a colorimetric system is adopted.

Colorimetric data for XYZ and coordinates points (x, y) on x-y chromaticity diagram are expressed with the following relation.

$$x=X/(X+Y+Z)$$

$$y=Y/(X+Y+Z) \quad (8)$$

z chromaticity value is expressed by $$z=1-x-y=Z/(X+Y+Z) \quad (9)$$

z chromaticity value is not necessary for notation of x-y chromaticity diagrams of FIG. 28 to FIG. 30, but is necessary for the computation, which will be described later.

Next, as shown in FIG. 29, a predetermined white point is determined on the x-y chromaticity diagram. According to the present embodiment, the following point $(x_w, y_w)$ representative of the chromaticity value of light $D_{50}$ of the auxiliary standard of CIE is established as a white point 72.

$$(x_w, y_w)=(0.3457, 0.3586) \quad (10)$$

Next, let us consider on the x-y chromaticity diagram three straight lines 721, 722 and 723 coupling the white point 72 with coordinates points 711, 712 and 713 (vertexes of the triangle of the reproducible color gamut 71) corresponding to the primary colors of the reproducible color gamut 71, respectively, and as shown in FIG. 30, a triangle 73 having vertexes on the three straight lines and including the reproducible color gamut 71. It is preferable that the triangle 73 includes the reproducible color gamut 71 and has the minimum area.

According to the present embodiment, the vertexes of the triangle 73 thus established are expressed by primary color points 731, 732 and 733 representative of the chromaticity values of the primary colors for R, G and B.

From the white point 72 and three primary color points 731, 732 and 733 thus determined, the elements $A_{ij}$ of the matrix $(A_{ij})$ shown in the formula (7) is determined in the manner as set forth below (cf. Mituo Ikeda: Fundamentals of color engineering science, pp. 125-130, Asakura Bookstore).

Here, xyz chromaticity values (x, y, z) of the white point 72 is expressed by $(x_w, y_w, z_w)$, and xyz chromaticity values of the primary colors points 731, 732 and 733 are expressed by $(x_G, y_G, z_G)$, $(x_B, y_B, z_B)$ and $(x_R, y_R, z_R)$, respectively.

Formula (7) is expressed by $$R=A_{11}X+A_{12}Y+A_{13}Z$$

$$G=A_{21}X+A_{22}Y+A_{23}Z$$

$$B=A_{31}X+A_{32}Y+A_{33}Z \quad (11)$$

(a) With respect to white point $(x_w, y_w, z_w)$, $$A_{11}x_w+A_{12}y_w+A_{13}z_w=1$$

$$A_{21}x_w+A_{22}y_w+A_{23}z_w=1$$

$$A_{31}x_w+A_{32}y_w+A_{33}z_w=1 \quad (12)$$

(b) With respect to primary colors point $(x_G, y_G, z_G)$ for G, $$A_{11}x_G+A_{12}y_G+A_{13}z_G=0$$

$$A_{31}x_G+A_{32}y_G+A_{33}z_G=0 \quad (13)$$

(c) With respect to primary colors point $(x_B, y_B, z_B)$ for B, $$A_{11}x_B+A_{12}y_B+A_{13}z_B=0$$

$$A_{21}x_B+A_{22}y_B+A_{23}z_B=0 \quad (14)$$

(d) With respect to primary colors point $(x_R, y_R, z_R)$ for R, $$A_{21}x_R+A_{22}y_R+A_{23}z_R=0$$

$$A_{31}x_R+A_{32}y_R+A_{33}z_R=0 \quad (15)$$

Those relations are applied.

Those formulas (12) to (15) includes, taking notice of the formulas including $A_{11}, A_{12}, A_{13}$, for instance, the following three formulas:

$$A_{11}x_w+A_{12}y_w+A_{13}z_w=1$$

$$A_{11}x_G+A_{12}y_G+A_{13}z_G=0$$

$$A_{11}x_B+A_{12}y_B+A_{13}z_B=0$$

Solving simultaneous equations of those three formulas makes it possible to determine $A_{11}, A_{12}$, and $A_{13}$. In the same way as this, those formulas (12) to (15) includes three formulas including $A_{21}, A_{22}$, and $A_{23}$, and three formulas including $A_{31}, A_{32}$, and $A_{33}$. Solving simultaneous equations of those formulas makes it possible to determine all elements $A_{ij}$ (i, j=1, 2, 3) of the matrix $(A_{ij})$ shown in the formula (7). According to the present embodiment, the elements $A_{ij}$ are parameters to be determined in the parameter computing step (step f1) in FIG. 25.

While the above-mentioned example considerably strictly determines the white point and the primary colors points, it is acceptable that the elements of the matrix in the formula (7) are determined in accordance with points determined on an experimental basis in some extent omitting the steps involved in the strict determination of the white point and the primary colors points. In this case, however, as compared with a case where the white point and the primary colors points are strictly determined in the manner as mentioned above, accuracy of the final color processing will be lowered, or in order to prevent accuracy of the color processing from being lowered, there is a possibility that it imposes on an operator burdens.

In the parameter computing step (step f1) in FIG. 25, the parameters (according to the example as mentioned above, elements $A_{ij}$ of the matrix $(A_{ij})$ shown in the formula (7)) are computed in the manner as mentioned above. The parameters thus computed are saved for the purpose of processing in the three primary colors RGB conversion step (step f31) of the second conversion step (step f3) of the color conversion definition creating method in FIG. 25.

Incidentally, as mentioned above, when the parameters are already computed, the parameter computing step (step f1) is unnecessary.

The first conversion process (step f2) constituting the second color conversion definition creating step of FIG. 25 converts RGB data (RGB data representative of coordinate points in the second RGB color space) for the proofer 13 shown in FIG. 1 into colorimetric data for device non-dependence in accordance with a color reproduction quality (a proofer profile) of the proofer 13 shown in FIG. 1.

Figure 31:
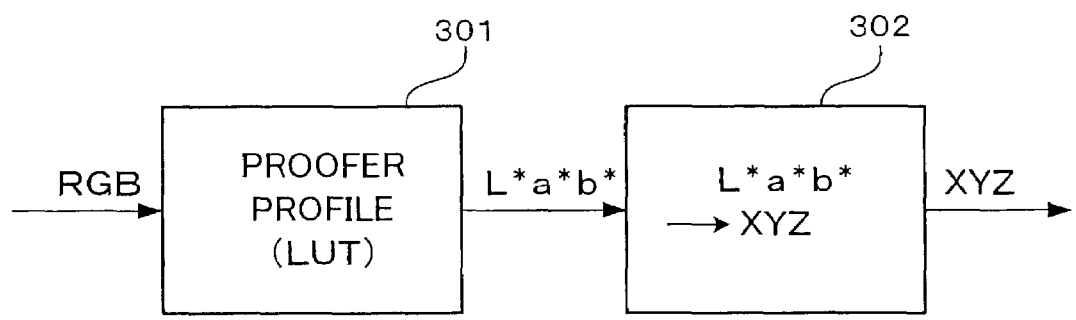
FIG. 31 is a conceptual view useful for understanding processing in a first conversion process (step f2).

FIG. 31 is a conceptual view useful for understanding processing in the first conversion step (step f2).

First, RGB data for a proofer is converted into colorimetric data L*a*b* in accordance with a color reproduction quality (a printer profile 301) of the proofer 13 in FIG. 1, which is determined in form of LUT (look-up table) type of data. It is well known how the proofer profile is determined. Thus, the explanation will be omitted. There is no need to determine the proofer profile per se in the first conversion process (step f2), and it is effective that the proofer profile is derived, if it exists.

It is noted that the RGB data for a proofer shown in FIG. 31 is not the RGB data representative of the proof image 13$a$, but is RGB data on all the lattice points in the second RGB color space depending on the proofer 13, which is mechanically generated.

After the RGB data is converted into the colorimetric data L*a*b* in accordance with the printer profile 301, the colorimetric data L*a*b* is converted into colorimetric data XYZ in accordance with transformation 302 from L*a*b* to XYZ. Transformation from L*a*b* to XYZ is performed unequivocally and reversibly. Transformation from L*a*b* to XYZ is also well known, and thus the explanation will be omitted.

In this manner, the first conversion step (step f2) in FIG. 25 converts the RGB data for a proofer into the colorimetric data XYZ.

Next, the second conversion step (step f3) in FIG. 25 converts the XYZ data thus determined into CMY data.

Figure 32:
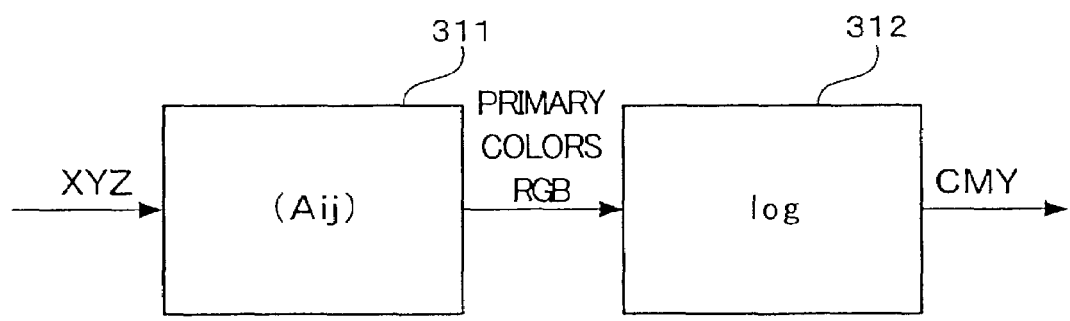
FIG. 32 is a conceptual view useful for understanding processing in a second conversion process (step f3).

FIG. 32 is a conceptual view useful for understanding processing in the second conversion step (step f3).

The second conversion step (step f3) comprises the three primary colors RGB conversion step (step f31) and the CMY conversion step (step f32). The three primary colors RGB conversion step (step f31) performs data conversion 311 according to formula (7) using the parameters ($A_{ij}$) determined in the parameter computing step (step f1), so that XYZ data is converted into primary colors RGB data.

Further, in the CMY conversion step (step f32) of the second conversion step (step f3), the three primary colors RGB data is converted into the CMY data in accordance with a logarithmic transformation 312 according to formula (16) set forth below.

$$C = -\log R$$

$$M = -\log G$$

$$Y = -\log B \quad (16)$$

CMY thus determined are referred to as block CMY. Here, in order to clarify that the CMY data thus determined is CMY data represented by the block CMY, this CMY data is referred to as $C_b M_b Y_b$ data.

Next, the first K-function creating step (step f4) constituting the second color conversion definition creating step of FIG. 25 determines a first K-function from data of $C_b = M_b = Y_b$ (gray axis) of the $C_b M_b Y_b$ determined in the second conversion step (step f3), in accordance with the data conversion algorithm 60 with one block shown in FIG. 27. Details of the data conversion algorithm 60 will be described later.

According to the present embodiment, as the first function of K, there is determined a function $K = K_{out}(C_{out})$ of $K_{out}$ wherein $C_{out}$ of CMYK data (this is referred to as $C_{out} M_{out} Y_{out} K_{out}$ data) determined from $C_b M_b Y_b$ data in accordance with the data conversion algorithm is a variable. However, there is no need that the first function of K is one wherein $C_{out}$ is a variable, and it is acceptable that the first function of K is one wherein $M_{out}$ or $Y_{out}$ is a variable.

When the first function ($K_1 = K_{out}(C_{out})$) of K is determined, the data conversion algorithm 60 is set up with a color conversion parameter (the first color conversion parameter referred to in the present invention) customized by a skilled person for color operation, which is capable of converting the $C_b M_b Y_b$ data into the CMYK data having the printing aptitude.

Now the detailed description for the steps of the second color conversion definition creating step of FIG. 25 will be interrupted, and hereinafter, there will be described in detail the data conversion algorithm 60 shown in FIG. 27.

Figures 33A, 33B:
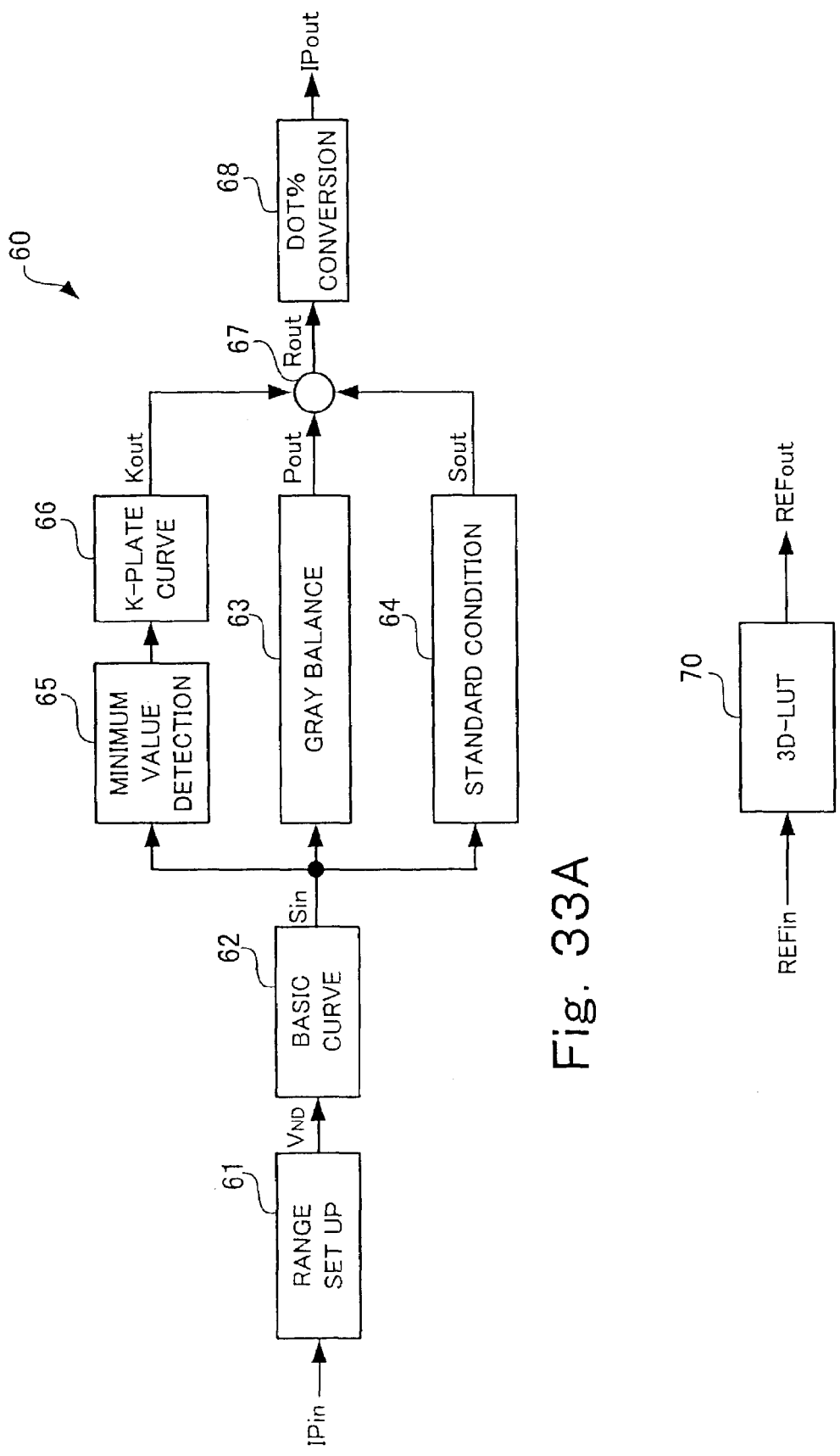
FIG. 33A is a block diagram useful for understanding details of data conversion algorithm shown in FIG. 27 with one block.
FIG. 33B is a 3D-LUT (three-dimensional Look-Up Table) for converting CMY data into CMYK data, which is adjusted by a skilled person of a color operation.

FIG. 33A is a block diagram useful for understanding details of data conversion algorithm shown in FIG. 27 with one block. FIG. 33B is a 3D-LUT (three-dimensional Look-Up Table) for converting CMY data into CMYK data, which is adjusted by a skilled person of a color operation.

While the data conversion algorithm referred to in the present invention is not restricted to the structure shown in FIG. 33A, there will be explained, by way of example, the data conversion algorithm having the structure shown in FIG. 33A.

It is assumed that there is already constructed 3D-LUT 70 for converting CMY data into CMYK data having a printability to the printing system 12 in FIG. 1 and taking in views of skilled persons for color customization and printing companies for colors (those are referred to as "taste"), that is, which is not always coincident with the original image in color. While the construction way of the 3D-LUT 70 is not restricted to the specified way, it is acceptable that a way disclosed in for example Japanese Patent Application No. 2001-291691 is adopted to construct 3D-LUT 70 including the "taste". The data conversion algorithm 60 shown in FIG. 27 is also used in the second K-function creating step (step f6), upon replacement of the color conversion parameters of the data conversion algorithm 60 by the second color conversion parameters based on the first association (which will be described later) determined the first association creating step (step f5), as well as the first K-function creating step (step f4) of the second color conversion definition creating step in FIG. 25.

When data conversion algorithm is used in the first K-function creating step (step f4), it is possible to use 3D-LUT 70 in FIG. 33B as it is, as the data conversion algorithm, but the use of 3D-LUT 70 alone makes it difficult to replace the color conversion parameters.

Here, there will be described a way of determining color conversion parameters to be set up on elements, of the data conversion algorithm 60 separated from the 3D-LUT 70 into a plurality of elements as shown in FIG. 33A. The way, which will be described hereinafter, is a way disclosed in the above-referenced Japanese Patent Application No. 2001-291691.

The data conversion algorithm 60 shown in FIG. 27 comprises, as shown in FIG. 33A, a range set up 61, a basic curve 62, a gray balance 63, a standard condition 64, a minimum value detection 65, a K-plate curve 66, an addition 67, and a dot % conversion 68. Of those elements, the range set up 61, the basic curve 62, the gray balance 63, the standard condition 64, the K-plate curve 66, and the dot % conversion 68, excepting the minimum value detection 65 and the addition 67, are set up with parameters for a color conversion, so that data processing for the color conversion is performed in accordance with the parameter set up. The minimum value detection 65 and the addition 67 are not set up with parameters. The minimum value detection 65 detects the minimum value of the entered three data of C, M and Y. The addition 67 adds output $P_{out}$ of the gray balance 63, output $S_{out}$ of the standard condition 64, and output $K_{out}$ of the K-plate curve 66 for each color of C, M, Y and K, and generates addition value $R_{out}$ for each color of C, M, Y and K.

Here, for the purpose of the distinction on the notation between the input data and the output data in FIG. 33B, the input data ($C_b$, $M_b$, $Y_b$) to the data conversion algorithm 60 is denoted as $IP_{in}$, and the output data ($C_{out}$, $M_{out}$, $Y_{out}$, $K_{out}$) from the data conversion algorithm 60 is denoted as $IP_{out}$.

The input data ($C_b$, $M_b$, $Y_b$) and the output data ($C_{out}$, $M_{out}$, $Y_{out}$, $K_{out}$) of the 3D-LUT 70 shown in FIG. 33B are denoted as $REF_{in}$ and $REF_{out}$, respectively.

The color conversion parameters to be set to the respective sections of the data conversion algorithm 60 shown in FIG. 33A are determined in accordance with the 3D-LUT 70 which is already determined.

FIG. 34A, FIG. 34B, FIG. 34C, and FIG. 34D show curves $C_{out}$, $M_{out}$, $Y_{out}$, and $K_{out}$ on $C_{out}$ $M_{out}$ $Y_{out}$ and $K_{out}$ color coordinates systems associated with gray axes of $C_b=M_b=Y_b$, of 3D-LUT 70 shown in FIG. 33B, respectively. Here, the minus portion of the curve $K_{out}$ is a curve inserted from the plus portion.

First, $C_bM_bY_b$ data on the gray axes of $C_b=M_b=Y_b$, of $C_bM_bY_b$ color coordinates systems of the input side ($REF_{in}$) of the 3D-LUT 70 are converted by the 3D-LUT 70 to obtain curves of $C_{out}$, $M_{out}$, $Y_{out}$, and $K_{out}$ on $C_{out}$ $M_{out}$ $Y_{out}$ and $K_{out}$ color coordinates systems of the output side ($REF_{out}$), as shown in FIG. 34A, FIG. 34B, FIG. 34C, and FIG. 34D.

FIG. 34A, FIG. 34B, FIG. 34C, and FIG. 34D show dot % set up, that is, 3% at the high light (HL) side, 95% at the shadow (SH) side, regarding C; 3% at the HL side, 88% at the SH side, regarding M; 3% at the HL side, 88% at the SH side, regarding Y; and −15% at the HL side, 75% at the SH side, regarding K, respectively.

Those set up dot % are designated by a printing company, and establish standards for HL and SH for each color of C, M, Y and K.

Here, the set up dot % for HL and SH for each color of C, M, Y and K are applied to the associated curves, respectively, so that set up densities for HL and SH for each color of C, M, Y and K are determined, as shown in the figures.

The set up densities of HL/SH for C, M, Y and K are denoted by $D_{HLC}/D_{SHC}$, $D_{HLM}/D_{SHM}$, $D_{HLY}/D_{SHY}$, $D_{HLK}/D_{SHK}$, respectively.

Figure 35A:
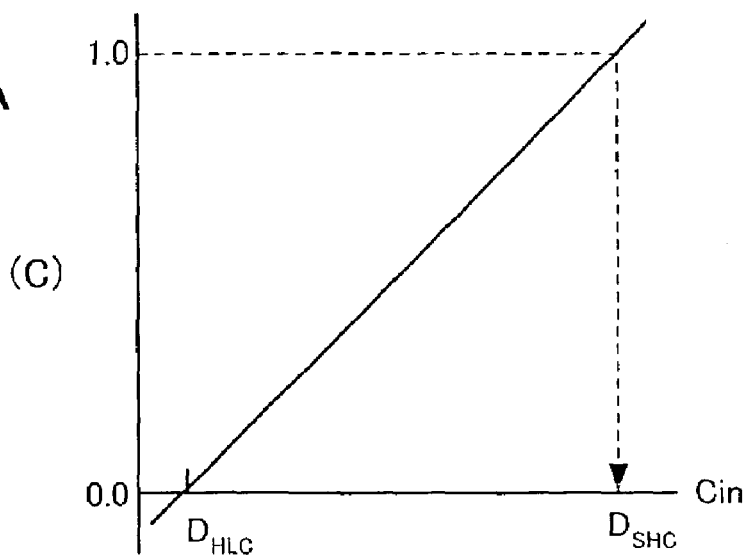
FIG. 35A, FIG. 35B, and FIG. 35C show range set up parameters for normalizing $C_{in}$, $M_{in}$, and $Y_{in}$, respectively.
Figure 35B:
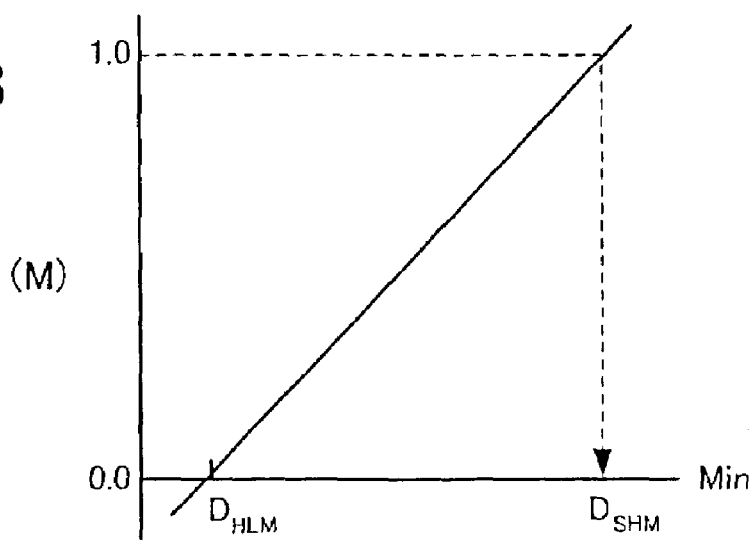
Figure 35C:
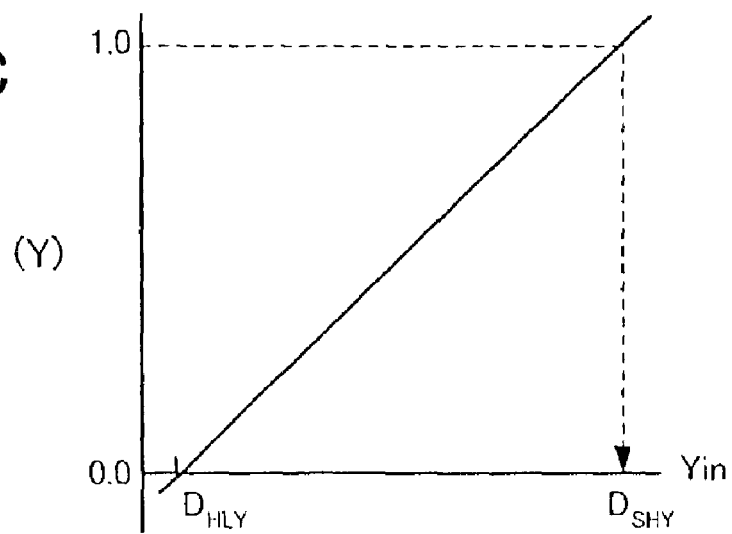

FIG. 35A, FIG. 35B, and FIG. 35C show range set up parameters for normalizing $C_{in}$, $M_{in}$, and $Y_{in}$, respectively.

FIG. 35A, FIG. 35B, and FIG. 35C show range set up parameters of C, M, and Y, respectively, and parameters for range setting (normalizing) $C_{in}$, $M_{in}$, and $Y_{in}$ to values of 0.1 to 1.0 in such a manner that set up dot % at the high light (HL) side and set up dot % at the shadow (SH) side, which are explained referring to FIG. 34A, FIG. 34B, FIG. 34C, and FIG. 34D, are associated with 0.0 and 1.0 on C, M and Y, respectively.

Those range set up parameters of C, M, and Y are set to the range set up 61 in FIG. 33A, and are used for range setting (normalization) of data for $C_b$, $M_b$, and $Y_b$ fed to the data conversion algorithm 60. Those range set up parameters of C, M, and Y are one of the color conversion parameters referred to in the present invention.

Incidentally, since the data conversion algorithm 60 does not receive data for K, the range set up parameter as to K is unnecessary.

Figure 36:
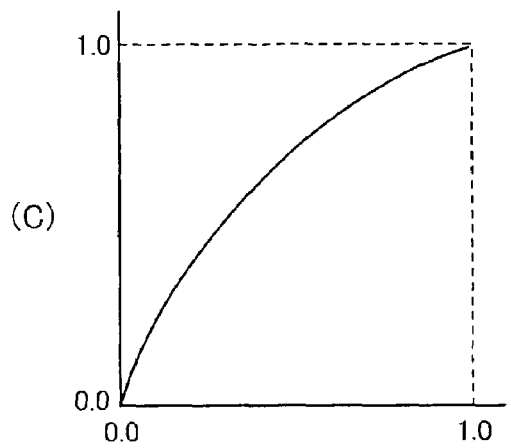
FIG. 36 is a view showing a basic curve.

FIG. 36 is a view showing a basic curve.

Figure 34A:
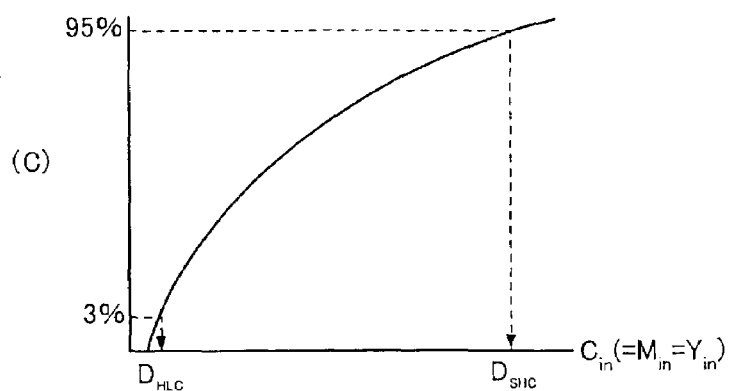
FIG. 34A, FIG. 34B, FIG. 34C, and FIG. 34D show curves $C_{out}$, $M_{out}$, $Y_{out}$, and $K_{out}$ on $C_{out}$ $M_{out}$ $Y_{out}$ and $K_{out}$ color coordinates systems associated with gray axes of $C_b=M_b=Y_b$, of 3D-LUT 70 shown in FIG. 33B, respectively.

The basic curve is obtained in such a manner that the set up densities $D_{HLC}/D_{SHC}$ of HL/SH of the horizontal axis of FIG. 34A are associated with 0.0/1.0, respectively, and 3%/95%, which are set up dot % of HL/SH of the vertical axis, are associated with 0.0/1.0, respectively, so that the curve of FIG. 34A is normalized. According to the present embodiment, the curve of C thus normalized is established as the basic curve. Incidentally, it is acceptable that besides C, the curve of M or Y normalized in a similar fashion to that of C as mentioned above is established as the basic curve. Alternatively, it is acceptable that the average normalized curve on C, M and Y is established. However, regarding K, the geometry of the curve is greatly different from C, M and Y, and thus it should be avoided that the curve of K normalized is established as the basic curve.

Thus, the curve of C normalized is established as the basic curve, and the basic is set to the basic curve 62 shown in FIG. 33A. This basic curve is also one of the color conversion parameters referred to in the present invention.

FIG. 37A, FIG. 37B, FIG. 37C, and FIG. 37D are explanatory views useful for understanding as to how to determine a gray balance.

Figure 37A:
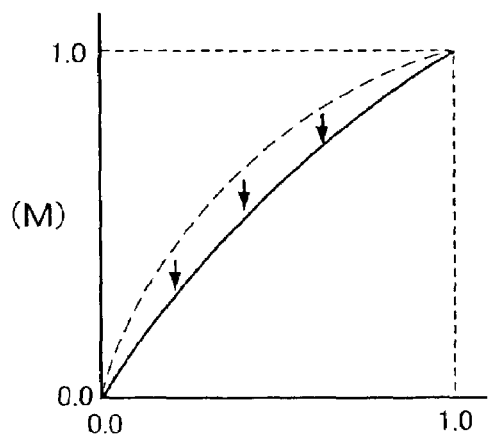
FIG. 37A, FIG. 37B, FIG. 37C, and FIG. 37D are explanatory views useful for understanding as to how to determine a gray balance.
Figure 37B:
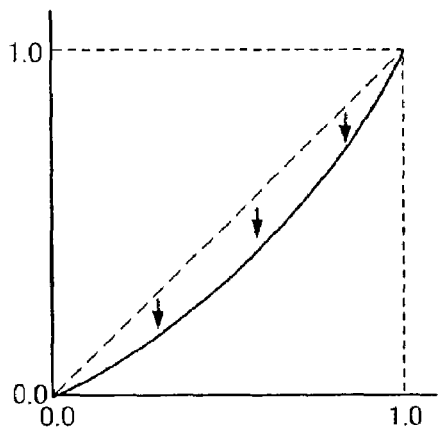
Figure 37C:
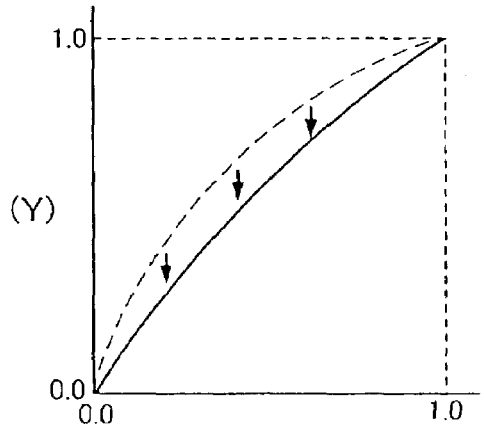

Solid curves shown in FIG. 37A and FIG. 37C show normalized curves obtained on M and Y, respectively, in a similar fashion to that mentioned above.

Figure 34B:
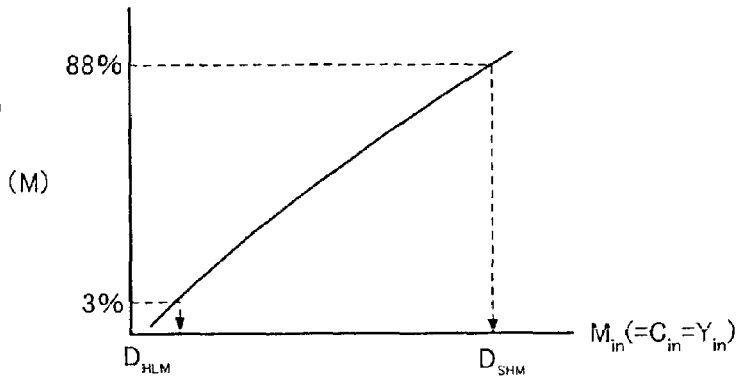
Figure 34C:
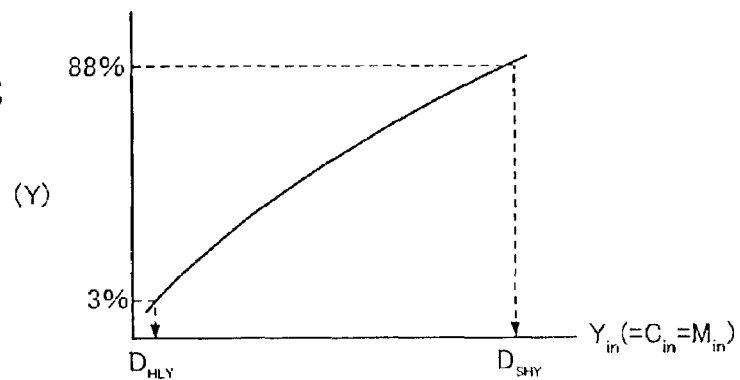

The solid curve of FIG. 37A is obtained when the set up densities $D_{HLM}/D_{SHM}$ of HL/SH of the horizontal axis of FIG. 34B are associated with 0.0/1.0, respectively, and 3%/88%, which are set up dot % of HL/SH of the vertical axis, are associated with 0.0/1.0, respectively. The solid curve of FIG. 37C is obtained when the set up densities $D_{HLY}/D_{SHY}$ of HL/SH of the horizontal axis of FIG. 34C are associated with 0.0/1.0, respectively, and 3%/88%, which are set up dot % of HL/SH of the vertical axis, are associated with 0.0/1.0, respectively.

Curves of broken lines shown in FIG. 37A and FIG. 37C show basic curves (normalized curves of C) shown in FIG. 36.

Figure 37D:
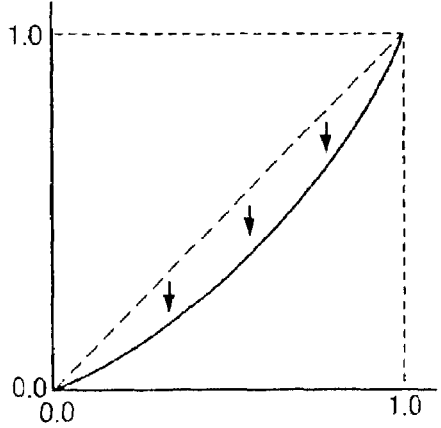

Regarding values between 0.0 and 1.0 of the horizontal axis, the normalized curve of M (FIG. 37A) and the normalized curve of Y (FIG. 37C) are subtracted from the basic curve (the normalized curve of C) to determine the differences, respectively, and then as shown in FIG. 37B and FIG. 37D, there are obtained downward convex curves wherein only the differences determined in the manner as mentioned above are subtracted from the straight lines of broken lines of a slope of 45 degrees. The curves shown by the solid lines in FIG. 37B and FIG. 37D, which are determined in the manner as mentioned above as to M and Y, are gray balances representative of differences from the basic curve with respect to M and Y, respectively. And thus those curves are set to the gray balance 63 shown with one block in FIG. 33A. The curves of those gray balances of M and Y are also one of the color conversion parameters referred to in the present invention.

Incidentally, according to the present embodiment, the normalized curve as to C is established as the basic curve, and thus the gray balance as to C offers 0 extending over overall extent of 0.0 to 1.0 of the horizontal axis. Accordingly, set up to the gray balance 63 is unnecessary. However, in the event that a curve other than the normalized curve of C, for example, an average curve of normalized curves of C, M and Y is established as the basic curve, there occur parameters of the gray balance as to C, too.

Figure 38A:
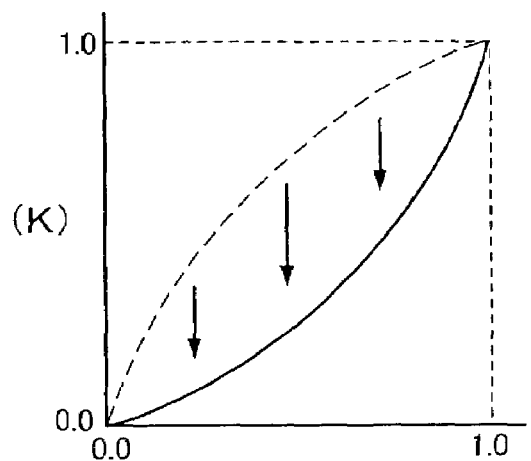
FIG. 38A and FIG. 38B are explanatory views useful for understanding as to how to determine a K-plate curve.
Figure 38B:
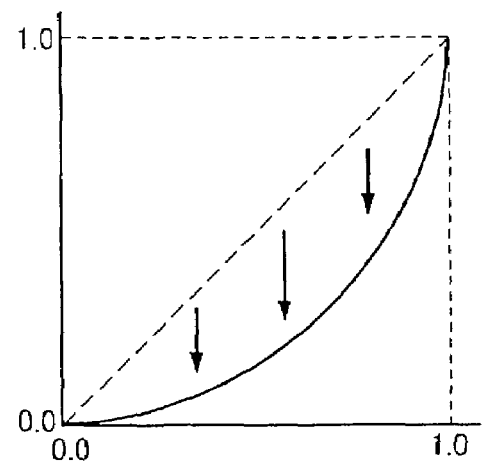

FIG. 38A and FIG. 38B are explanatory views useful for understanding as to how to determine a K-plate curve.

A way of determining a K-plate curve is same as that of the gray balances for M and Y shown in FIG. 37A, FIG. 37B, FIG. 37C, and FIG. 37D.

Figure 34D:
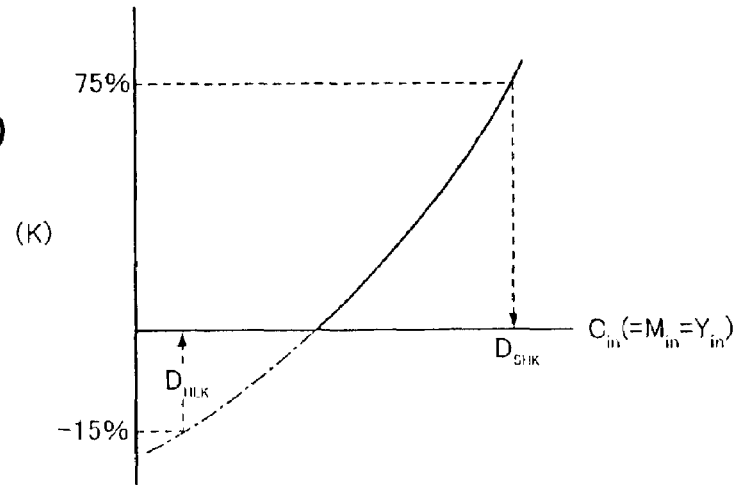

Curves of broken lines shown in FIG. 38A show basic curves (normalized curves of C) shown in FIG. 36. The solid curve of FIG. 38A is a normalized curve obtained in such a manner that the set up densities $D_{HLK}/D_{SHK}$ of HL/SH of the horizontal axis of FIG. 34D are associated with 0.0/1.0, respectively, and −15%/75%, which are set up dot % of HL/SH of the vertical axis, are associated with 0.0/1.0, respectively.

At the respective points between 0.0 and 1.0 of the horizontal axis, as shown with downward arrows in FIG. 38A, a difference between the basic curve (the normalized curve of C) and the normalized curve of K is determined, and then as shown in FIG. 38B, there is obtained a downward convex curve wherein only the differences determined in the manner as mentioned above is subtracted from the straight lines of a broken line of a slope of 45 degrees. This curve is set to the K-plate curve 66 shown in FIG. 33A. The K-plate curve 66 is also one of the color conversion parameters referred to in the present invention.

There will be described later an explanation as to how the standard condition 64 in FIG. 33A is determined, and next there will be explained parameters to be set to the dot % conversion 68 in FIG. 33A.

FIG. 39A, FIG. 39B, FIG. 39C, and FIG. 39D show parameters to be set to the dot % conversion 68 in FIG. 33A.

$IP_{in}$ in FIG. 33A, that is, input data for $C_b$, $M_b$ and $Y_b$, is normalized by the range set up 61 shown in FIG. 33A to values of 0.0-1.0 in accordance with parameters shown in FIG. 35A to FIG. 35C, and then the basic curve 62 and the gray balance 63 perform data processing with the values normalized to 0.0-1.0 as they are. Thus, the dot % conversion 68 in FIG. 33A converts values of 0.0-1.0 into the dot % in accordance with the parameters shown in FIG. 39A, FIG. 39B, FIG. 39C, and FIG. 39D.

Figure 39A:
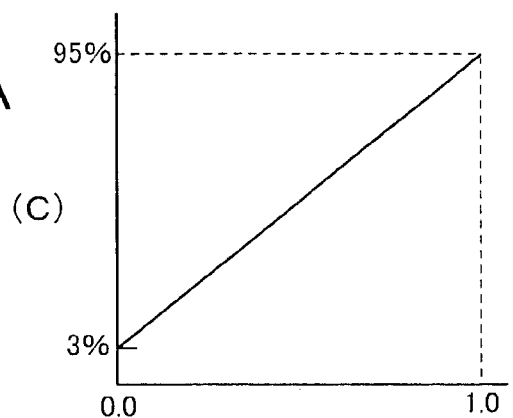
FIG. 39A, FIG. 39B, FIG. 39C, and FIG. 39D show parameters to be set up in dot % conversion in FIG. 33A and FIG. 33B.
Figure 39B:
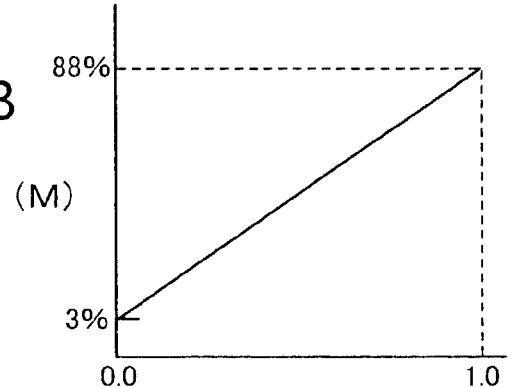
Figure 39C:
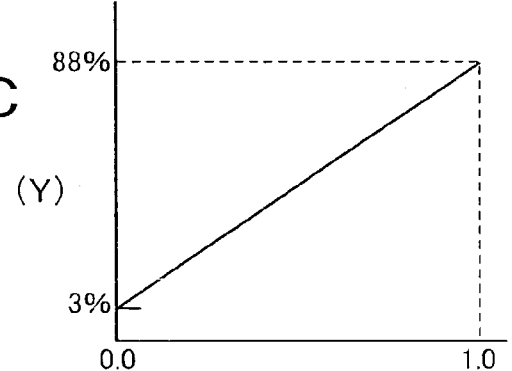
Figure 39D:
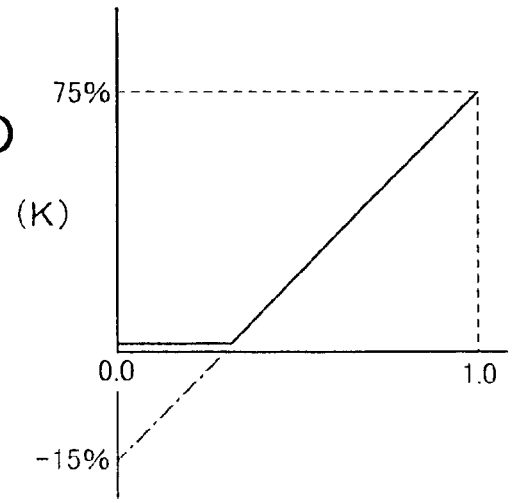

FIG. 39A, FIG. 39B, FIG. 39C, and FIG. 39D show dot % conversion parameters as to C, M, Y and K, respectively. FIG. 39A indicates that values of 0.0-1.0 as to C are converted into the dot % in accordance with the straight line wherein 0.0/1.0 are associated with 3%/95% which are the set up dot % of HL/SH shown in FIG. 34A too, respectively. FIG. 39B indicates that values of 0.0-1.0 as to M are converted into the dot % in accordance with the straight line wherein 0.0/1.0 are associated with 3%/88% which are the set up dot % of HL/SH shown in FIG. 34B too, respectively. FIG. 39C indicates that values of 0.0-1.0 as to Y are converted into the dot % in accordance with the straight line wherein 0.0/1.0 are associated with 3%/88% which are the set up dot % of HL/SH shown in FIG. 34C too, respectively. FIG. 39D indicates that values of 0.0-1.0 as to K are converted into the dot % in accordance with the straight line wherein 0.0/1.0 are associated with −15%/75% which are the set up dot % of HL/SH shown in FIG. 34D too, respectively.

With respect to the dot % set up parameters for K, it is noted that set up dot % is clipped to 0%, since there is no minus dot %.

That is, with respect to K, it is converted into dot % in accordance with a solid line graph shown in FIG. 39D.

The dot % conversion parameters shown in FIG. 39A, FIG. 39B, FIG. 39C, and FIG. 39D are set to dot % conversion 68 shown in FIG. 33A. According to the present embodiment, those dot % conversion parameters are also ones of the color conversion parameters referred to in the present invention.

While a way as to how to determine the standard condition 64 shown in FIG. 33A is not yet explained, it will be described later. Here, there will be described a flow of the color conversion processing along FIG. 33A.

The color data $IP_{in}$ shown in $C_b M_b Y_b$ color coordinates systems are first normalized by the range set up 61 to values of 0.0 to 1.0 along the straight lines shown in FIG. 35A, FIG. 35B and FIG. 35C, respectively, so that data $V_{ND}$ are generated.

Next, data $V_{ND}$ for C, M and Y are converted by the basic curve 62 into data $S_{in}$ for C, M and Y in accordance with the curve shown in FIG. 36. The data $S_{in}$ are fed to the minimum value detection 65, the gray balance 63 and the standard condition 64.

The minimum value detection 65 compares data for C, M and Y constituting the data $S_{in}$ with one another to detect the minimum value. The detected minimum value is fed to the K-plate curve 66. The K-plate curve 66 converts the minimum value on the horizontal axis into a value on the vertical axis in accordance with the curve shown by the solid line in FIG. 38B to provide $K_{out}$ as to K.

Of the data $S_{in}$ entered from the basic curve 62 to the gray balance 63, data for M and Y are converted by the gray balance 63 in accordance with the curves shown by the solid lines in FIG. 37B and FIG. 37D, respectively. According to the present embodiment, since the curve for C is adopted as the basic curve, the gray balance 63 is bypassed for C. An output of the gray balance 63 is referred to as $P_{out}$.

The data $S_{in}$ fed from the basic curve 62 to the standard condition 64 are converted into data $S_{out}$ for C, M, Y and K. With respect to the color conversion parameters to be set to the standard condition 64, it will be described later.

The addition 67 adds the data $K_{out}$, $P_{out}$ and $S_{out}$, which are obtained in the K-plate curve 66, the gray balance 63 and the standard condition 64, respectively, for each color of C, M, Y and K to generate data $R_{out}$ for C, M, Y and K. The $R_{out}$ data are converted by the dot % conversion 68 into dot % for C, M, Y and K in accordance with the straight lines shown in FIG. 39A, FIG. 39B, FIG. 39C, and FIG. 39D, respectively, and then outputted in form of data $IP_{out}$.

The parameters set up to the standard condition 64 are determined in a manner as set forth below. This makes it possible to consider that the relation between the input data $IP_{in}$ and the output data $IP_{out}$ of FIG. 33A is equivalent to the relation between the input data $REF_{in}$ and the output data $REF_{out}$ of FIG. 33B. That is, when the same data as $REF_{in}$ as $IP_{in}$ is inputted, the same data as $REF_{out}$ as $IP_{out}$ is outputted.

Next, there will be explained a way as to how the standard condition of FIG. 33A is determined.

Parameters are set up to the standard condition 64 in form of LUT (Look-up table). For this reason, it is desired that an input of the standard condition 64 is data on a lattice. According to the present embodiment, as the input data $S_{in}$ to the standard condition 64, data associated with the whole lattice points are generated, and data on the respective lattice points are reversely converted by the basic curve 62 (a conversion of values on the horizontal axis from values on the vertical axis in FIG. 36), and further reversely converted by the range set up 61 (values on the horizontal axis are determined from values on the vertical axis in accordance with the straight lines in FIG. 35A, FIG. 35B, and FIG. 35C). Thus, there are briefly determined the input data $IP_{in}$ in which the input data $S_{in}$ of the standard condition 64 are values on the lattice.

The range set up 61 is concerned with a straight conversion, and thus there occurs no error on the reverse conversion. On the other hand, the basic curve 62 is concerned with the curve as shown in FIG. 36. While FIG. 36 shows the continuous curve, actually, the curve is concerned with parameters defined by LUT (Look-up table) and the like in form of a set of discrete points. For this reason, conversions of the basic curve 62 in FIG. 33A in a reverse direction bring about errors. Thus, next, while the values of the input data $IP_{in}$ briefly determined in the manner as mentioned above are altered little by little, the input data $IP_{in}$, wherein the input values $S_{in}$ of the standard condition 64 are values on the lattice points, are determined, tracing the range set up 61 and the basic curve 62 in the forward direction.

Next, the input data $IP_{in}$ thus determined are used as the input data $REF_{in}$ of 3D-LUT 70 in FIG. 33B to convert the input data $REF_{in}$ by the 3D-LUT 70, so that the output data $REF_{out}$ associated with input data $REF_{in}$ are determined.

Next, the output data $REF_{out}$ determined by the 3D-LUT 70 are used as the output data $IP_{out}$ in FIG. 33A to perform a reverse conversion (a conversion from dot % on the vertical axes in FIG. 39A, FIG. 39B, FIG. 39C, and FIG. 39D to numerical values on the horizontal axis in FIG. 40) by the dot % conversion 68, so that $REF_{out}$ are determined.

Further, the input values $S_{in}$ of the standard condition 64 on the lattice points thus determined are fed to the minimum value detection 65 to determine $K_{out}$ by the minimum value detection 65 and the K-plate curve 66. And the same input values $S_{in}$ are fed to the gray balance 63 to determine $P_{out}$.

Performing the above-mentioned processing makes it possible to determine $R_{out}$, $K_{out}$ and $P_{out}$. Thus, performing the subtraction of $K_{out}$ and $P_{out}$ from $R_{out}$ for each color of C, M, Y and K makes it possible to determine $S_{out}$. Associating $S_{out}$ with the input values $S_{in}$ of the lattice points of the standard condition 64 makes it possible to determine parameters to be set up to the standard condition 64. Those parameters are also ones of color conversion parameters referred to in the present invention. Setting up the standard condition 64 in the manner as mentioned above makes it possible to implement the same color conversion as the 3D-LUT 70 in FIG. 33B as the whole of FIG. 33A.

Thus, there is determined the color conversion parameters taking in color customizing of the 3D-LUT 70 in FIG. 33B, which reflects color customizing of a skilled person.

Here, the explanation of the data conversion algorithm 60 with one block in FIG. 27 will be terminated, and next the description returns to the explanation for the steps of the color conversion definition creating method of FIG. 25.

In the first K-function creating step (step f4) of the second color conversion definition creating step of FIG. 25, $C_b M_b Y_b$ data of the gray axes ($C_b=M_b=Y_b$) of $C_b$, $M_b$, and $Y_b$ color spaces are fed to the data conversion algorithm 60. At this stage, the data conversion algorithm 60 is set up with the color conversion parameters (the first color conversion parameters referred to in the present invention) taking in "taste" determined in the manner as mentioned above.

In the first K-function creating step (step f4), $C_b M_b Y_b$ data of $C_b=M_b=Y_b$ are fed to the data conversion algorithm 60 (FIG. 33A) to determine $C_{out}$, $M_{out}$, $Y_{out}$ and $K_{out}$ data.

Figure 40:
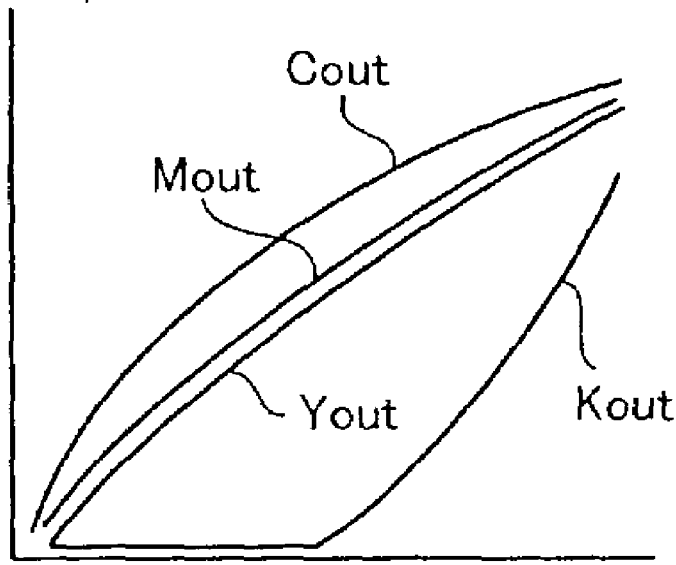
FIG. 40 is a conceptual view showing $C_{out}$ $M_{out}$ $Y_{out}$ and $K_{out}$ data determined by data conversion algorithm to $C_b M_b Y_b$ data (horizontal axis) on grey axes ($C_b=M_b=Y_b$).

FIG. 40 is a conceptual view showing $C_{out}$, $M_{out}$, $Y_{out}$ and $K_{out}$ data determined by data conversion algorithm to $C_b M_b Y_b$ data (horizontal axis) of ($C_b=M_b=Y_b$).

In the first K-function creating step (step f4), according to the present embodiment, as mentioned above, it is sufficient to determine $K_{out}$, wherein $C_{out}$ is converted, that is, $K_1=K_{out}(C_{out})$, and it is not always necessary to determine the curves for $M_{out}$ and $Y_{out}$. However, for the purpose of easy understanding, FIG. 40 shows the curves for $M_{out}$ and $Y_{out}$, too.

$K_1=K_{out}(C_{out})$ thus determined is completely suitable to the printing aptitude of the printing system 12 (cf. FIG. 1) of interest.

When the first K-function creating step (step f4) determines $K_1=K_{out}(C_{out})$, then the first association creating step (step f5) determines $C_{out}$, $M_{out}$, $Y_{out}$ and $K_{out}$ data for colorimetric data $L^*a^*b^*$, which are same as colorimetric data $L^*a^*b^*$ for $C_b M_b Y_b$ data, with respect to $C_b=M_b=Y_b$ (gray axis).

That is, according to the present embodiment, the process goes up the data conversion explained referring to FIG. 31 and FIG. 32: specifically, $C_b M_b Y_b$ data on the lattice points on the gray axes for $C_b M_b Y_b$ color conversion are converted by the inverse function of the logarithmic transformation 312 into the primary colors RGB data; the primary colors RGB data are converted by the data conversion 311 according to formula (7) into the XYZ data; and the XYZ data are converted by the transformation 302 from $L^*a^*b^*$ to XYZ into $L^*a^*b^*$ data, in FIG. 31.

Next, with respect to $C_{out}$, $M_{out}$, and $Y_{out}$, data on lattices are generated 1% by 1% on ranges of $0\% \leq C_{out} \leq 100\%$, $0\% \leq M_{out} \leq 100\%$, $0\% \leq Y_{out} \leq 100\%$, respectively. And with respect to K, K wherein $C_{out}$ by 1% is a variable is determined in accordance with the function of $K_1=K_{out}(C_{out})$ generated in the first K-function creating step (step f4). And all $C_{out}$, $M_{out}$, $Y_{out}$ and $K_{out}$ data thus generated are converted into $L^*a^*b^*$ in accordance with the printing profile.

Figure 41:
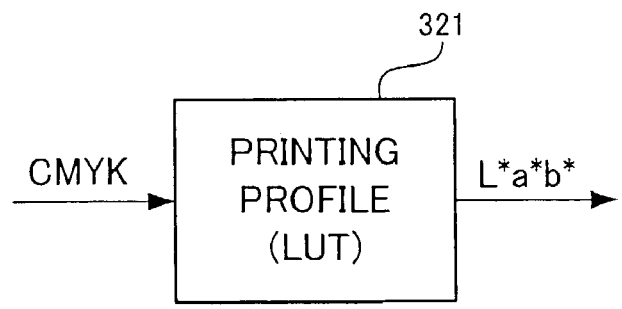
FIG. 41 is a conceptual view useful for understanding processing of converting CMYK data into L*a*b* data.

FIG. 41 is a conceptual view useful for understanding processing of converting CMYK data into $L^*a^*b^*$ data.

A printing profile 321 is representative of color reproduction characteristics of the printing system (cf. FIG. 1) of interest and is defined in form of LUT (look-up table).

$C_{out}$, $M_{out}$, $Y_{out}$ and $K_{out}$ data by 1% generated in the manner as mentioned above (but, with respect to $K_{out}$, data determined in accordance with the first function $K_1=K_{out}(C_{out})$ of K wherein $C_{out}$ by 1% is a variable) are fed to the printing profile 321 to determine $L^*a^*b^*$ data associate with all $C_{out}$, $M_{out}$, $Y_{out}$ and $K_{out}$ data.

Thus, both $C_b M_b Y_b$ data of $C_b=M_b=Y_b$ (gray axis) and all $C_{out}$, $M_{out}$, $Y_{out}$ and $K_{out}$ data are converted into $L^*a^*b^*$, so that from all $C_{out}$, $M_{out}$, $Y_{out}$ and $K_{out}$ data, $C_{out}$, $M_{out}$, $Y_{out}$ and $K_{out}$ data matched in values of $L^*a^*b^*$ are extracted. According to the preset embodiment, an extent being out of lattice points by 1% of $C_{out}$, $M_{out}$, and $Y_{out}$ is considered as an error, and in the event that there is no data wherein values of $L^*a^*b^*$ are completely matched, $C_{out}$, $M_{out}$, $Y_{out}$ and $K_{out}$ data closest in values of $L^*a^*b^*$ (color difference is small) are extracted as data matched in values of $L^*a^*b^*$.

Figure 42:
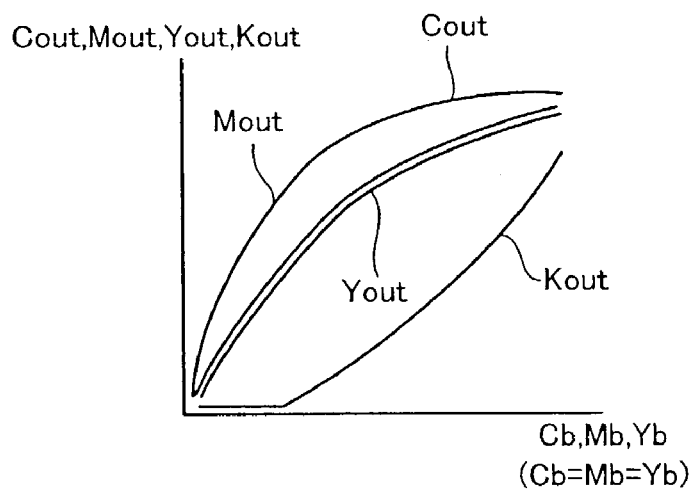
FIG. 42 is a conceptual view showing a first association.

FIG. 42 is a conceptual view showing a first association determined by the processing as mentioned above.

FIG. 42 shows the first association between $C_b M_b Y_b$ data of $C_b=M_b=Y_b$ (gray axis) and $C_{out}$, $M_{out}$, $Y_{out}$ and $K_{out}$ data matched to the $C_b M_b Y_b$ data on a colorimetric basis.

While the first association is different in function form as compared with FIG. 40, $K_{out}$ is restricted by the first function $K_1=K_{out}(C_{out})$ of K determined in accordance with the data conversion algorithm 60 (cf. FIG. 33A) in the first K-function creating step (step f4). Accordingly, $C_{out}$, $M_{out}$, $Y_{out}$ and $K_{out}$ data, wherein the first association is determined as the restriction condition, have printing aptitude for the printing system 12 (cf. FIG. 1) of interest, and are data of colors matched with colors of $C_b M_b Y_b$ data on a colorimetric basis, too.

Here, however, it is noted that the association is determined on only the gray axis of $C_b=M_b=Y_b$. Next, there will be determined associations of arbitrary combinations of $C_b$, $M_b$ and $Y_b$.

In the second K-function creating step (step f6) of the second color conversion definition creating step in FIG. 25, there are determined color conversion parameters to be set up to the data conversion algorithm 60 shown in FIG. 33A.

According to the explanation as to how to determine the color conversion parameters to be set up to the data conversion algorithm 60, the curves of $C_{out}$, $M_{out}$, $Y_{out}$ and $K_{out}$ to the gray axis of $C_b=M_b=Y_b$ are determined from 3D-LUT 70 in FIG. 33B, taking in the element "taste" (cf. FIG. 34A, FIG. 34B, FIG. 34C, and FIG. 34D), and then the color conversion parameters are determined providing their curves as starting points. However, here, instead of determination from the 3D-LUT 70 in FIG. 33B, the first association (cf. FIG. 42) determined as mentioned above is adopted to determine the color conversion parameters providing the curves of the first association as starting points. Here, only the curves of the starting points are different, and the way of determining the color conversion parameters is the same as one mentioned above. Thus, redundant explanation will be omitted as to the way of determining the color conversion parameters. The color conversion parameters, which are determined in accordance with the curves of the first association in FIG. 42, are referred to as the second color conversion parameter. The second color conversion parameter thus determined is set up to the data conversion algorithm 60 shown in FIG. 33A with replacement for the color conversion parameter (the first color conversion parameter set up).

The curve in FIG. 42 is representative of the association between $C_b M_b Y_b$ data and $C_{out}$, $M_{out}$, $Y_{out}$ and $K_{out}$ data matched to the $C_b M_b Y_b$ data on a colorimetric basis. And with respect to K, the curve in FIG. 42 is determined in accordance with the function relation of $K_1 = K_{out}(C_{out})$ Thus, the curve in FIG. 42 represents $C_{out}$, $M_{out}$, $Y_{out}$ and $K_{out}$ data having the printability. When the color conversion parameters (the second color conversion parameter) is determined in accordance with the curve in FIG. 42 to be set up to the data conversion algorithm 60, it is possible to determine the color conversion parameters involving no influence of "taste", with respect to K. However, as seen from the above-mentioned way of determining the color conversion parameters, the color conversion parameters of the standard condition 64 in FIG. 33A is determined in such a manner that the association between $IP_{in}$ and $IP_{out}$ in FIG. 33A is coincident with the association between $REF_{in}$ and $REF_{out}$ in FIG. 33B. For this reason, even if it is concerned with a case starting from the curve of FIG. 21, with respect to colors besides the gray axis, the influence of "taste" is kept contained. Accordingly, even if the color conversion parameters (the second color conversion parameter) is determined providing the curves of FIG. 42 as starting points to be set up to the data conversion algorithm 60 in FIG. 33A, the data conversion algorithm 60 is used only in determination of values of K.

In the second K-function creating step (step f6) of the color conversion definition creating step in FIG. 25, the second color conversion algorithm is determined in the manner as mentioned above to be set up to the data conversion algorithm 60 shown in FIG. 33A, and thereafter, in a similar fashion to that of the above-mentioned first K-function creating step (step f4), but $C_b M_b Y_b$ data on not only the gray axis ($C_b = M_b = Y_b$) but also the whole color spaces of $C_b M_b Y_b$ color system are fed to the data conversion algorithm 60 shown in FIG. 33A, and of $C_{out}$, $M_{out}$, $Y_{out}$ and $K_{out}$ data, $K_{out}$ data is determined, so that the second function $K_2 = K_{out}(C_b, M_b, Y_b)$ of K, wherein three of $C_b$, $M_b$, $Y_b$ are provided as variables, is determined.

The second function $K_2 = K_{out}(C_b, M_b, Y_b)$ of K thus determined has the printability on not only the gray axis, but also the whole color spaces of $C_b M_b Y_b$ color system.

Next, in the second association creating step (step f7) of the color conversion definition creating step in FIG. 25, there are determined $C_{out}$, $M_{out}$, $Y_{out}$ and $K_{out}$ data associated with the colorimetric data L*a*b* which are the same as the colorimetric data L*a*b* associated with $C_b M_b Y_b$ data. In the above-mentioned first association creating step (step f5), there are determined $C_{out}$, $M_{out}$, $Y_{out}$ and $K_{out}$ data matched to $C_b M_b Y_b$ data on a colorimetric basis on only the gray axis of $C_b = M_b = Y_b$, and thereby determining the first association (cf. FIG. 42) between $C_b M_b Y_b$ data and $C_{out}$, $M_{out}$, $Y_{out}$ and $K_{out}$ data. On the other hand, in the second association creating step (step f7), there is determined the association (the second association) between the $C_b M_b Y_b$ data, which are same on a colorimetric basis, and $C_{out}$, $M_{out}$, $Y_{out}$ and $K_{out}$ data over not only the gray axis of $C_b = M_b = Y_b$, but also the whole color spaces of $C_b M_b Y_b$ color system. The way of determining the second association is the same as that of first association in the first association creating step (step f5). Thus, redundant explanation will be omitted. In the first association creating step (step f5), $C_{out}$, $M_{out}$, $Y_{out}$ and $K_{out}$ data are determined while being restricted by the first function $K_1 = K_{out}(C_{out})$ On the other hand, in the second association creating step (step f6), $C_{out}$, $M_{out}$, $Y_{out}$ and $K_{out}$ data are determined providing the second function $K_2 = K_{out}(C_b, M_b, Y_b)$ as the restriction condition.

Figure 43:
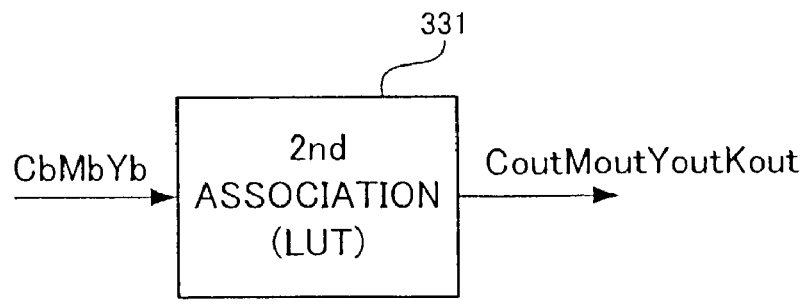
FIG. 43 is a conceptual view showing a second association.

FIG. 43 is a conceptual view showing a second association.

FIG. 43 shows in form of LUT a second association 331 for providing the association between $C_b M_b Y_b$ data as to the whole color space of the $C_b M_b Y_b$ color system and $C_{out}$, $M_{out}$, $Y_{out}$ and $K_{out}$ data matched with the $C_b M_b Y_b$ data on a colorimetric basis, which are determined through the above-mentioned processing.

The second association is restricted, as to $K_{out}$, by the second function $K_2 = K_{out}(C_b, M_b, Y_b)$ of K determined by the data conversion algorithm 60 (cf. FIG. 33A) set up with the second color conversion parameter in the second K-function creating step (step f5). Accordingly, $C_{out}$, $M_{out}$, $Y_{out}$ and $K_{out}$ data, which are determined wherein the second association is provided as the restriction condition, have the printability for the printing system 12 (cf. FIG. 1) of interest, and are data matched with $C_b M_b Y_b$ data on a colorimetric basis.

Thus, there is determined throughout the whole color space the second color conversion definition for converting RGB data (coordinate points in the second RGB color space) for a proofer into $C_{out}$, $M_{out}$, $Y_{out}$ and $K_{out}$ data (coordinate points in the CMYK color space) for printing having the printability for the printing system of interest and matched on a colorimetric basis.

Figure 44:
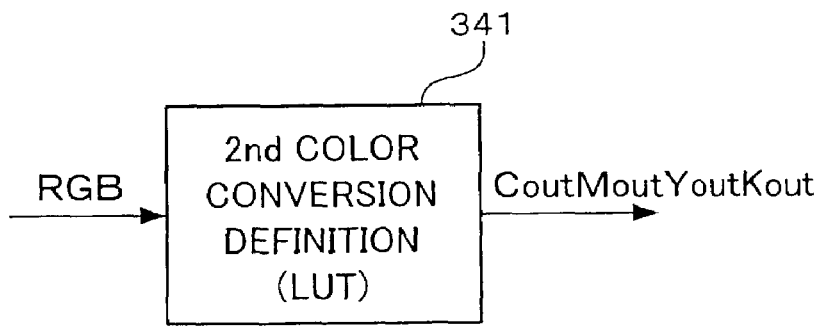
FIG. 44 is a conceptual view showing a second color conversion definition defining a relation of color conversion between RGB data for a proofer and $C_{out}$ $M_{out}$ $Y_{out}$ and $K_{out}$ data for printing.

FIG. 44 is a conceptual view showing a second color conversion definition defining a relation of color conversion between RGB data for a proofer and $C_{out}$ $M_{out}$ $Y_{out}$ and $K_{out}$ data for printing.

A second color conversion definition 341 is determined in form of LUT.

RGB data for a proofer are converted into CMYK data for printing matched with RGB data on a colorimetric basis and having the printability, through a conversion of primary colors RGB from XYZ by the printer profile 301 shown in FIG. 31, the transformation 302 from L*a*b* to XYZ, and the data conversion 311 shown in FIG. 32 according to the data of the formula (7); a conversion by the logarithmic transformation 312 of FIG. 32 from the primary colors RGB into CMY ($C_b M_b Y_b$); and a conversion by the second association 331 shown in FIG. 43 from $C_b M_b Y_b$ into $C_{out}$, $M_{out}$, $Y_{out}$ and $K_{out}$ data.

FIG. 44 shows a process of converting RGB data for proofer into CMYK data for printing in form of the color conversion definition 341 in united body.

Figure 45:
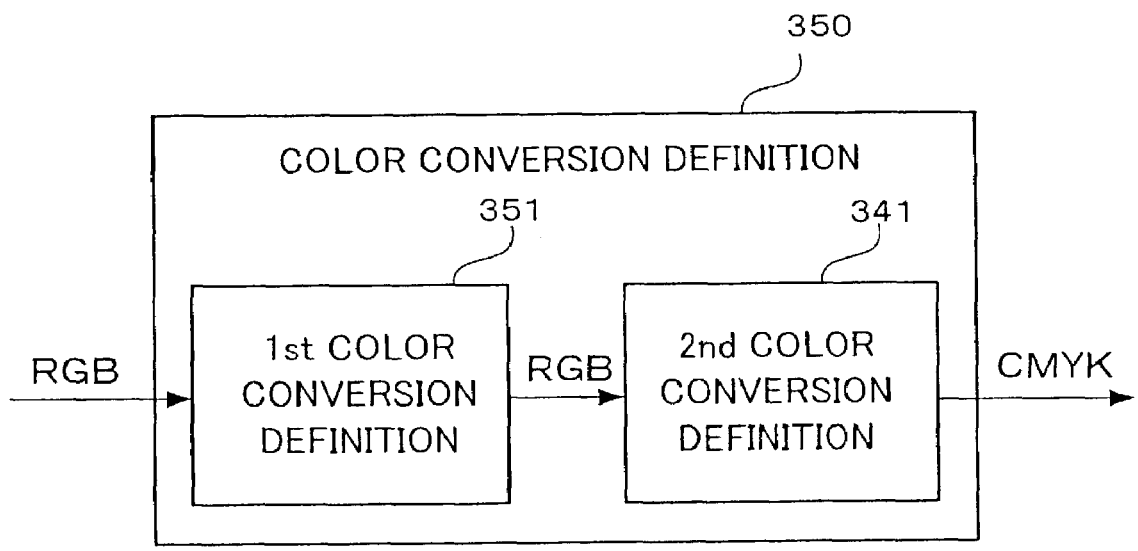
FIG. 45 is a conceptual view showing a color conversion definition consisting of a first color conversion definition and a second color conversion definition.

FIG. 45 is a conceptual view showing a color conversion definition consisting of a first color conversion definition and a second color conversion definition.

Here, a first color conversion definition 351, which is determined in the first color conversion definition creating step (the step (A) in FIG. 4) explained referring to FIG. 7 to FIG. 24, is combined with a second color conversion definition 341, which is determined in the second color conversion definition creating step (the step (B) in FIG. 4) explained referring to FIG. 25 to FIG. 44, so that there is created a color conversion definition 350 for converting RGB data (data representative of coordinate points in the first RGB color space)

for a printer into CMYK data (data representative of coordinate points in the CMYK color space suitable for the printing system 12 (cf. FIG. 1) for a printer. As mentioned above, the color conversion definition 350 thus created is set up to the color conversion apparatus 10 shown in FIG. 1. The color conversion definition 350 set up to the color conversion apparatus 10 is used when RGB data for the printer 11 representative of the actual image is converted into CMYK data for printing in the color conversion apparatus 10.

The CMYK data created by the conversion using the color conversion definition 350 has a value of K suitable for the printing system 12 (that is, excellent in printability), and "well" absorbs a difference between the color reproduction area of the printer 11 and the color reproduction area of the printing system 12, and thereby being capable of obtaining the printing image 12a reproducing a preferable color very close to the printed image 11a printed out by the printer 11 based on the RGB data for the printer 11 before the conversion.

Incidentally, according to the present embodiment, as the first device referred to in the present invention, there is adopted the printer 11 shown in FIG. 1. However, the first device referred to in the present invention is not restricted to an output device such as the printer 11, and it is acceptable that the first device referred to in the present invention is, for example, an input device such as a color scanner that reads an image and outputs image data for R, G and B. And the present invention is applicable in case of a creation of a color conversion definition for converting RGB data obtained through the input device into CMYK data having preferable colors involved in the basic image for the RGB data and being excellent in printability.

According to the present embodiment, as the second device referred to in the present invention, there is adopted the proofer 13 shown in FIG. 1. It is noted, however, that the proofer 13 is adopted since the color reproduction area of the proofer 13 is close to the color reproduction area of the printing system 12, and any one is acceptable, as the second device referred to in the present invention, which is a device having a color reproduction area close to the color reproduction area of the printing system 12.

Hereinafter, there will be described a modification of the present invention.

Figure 46:
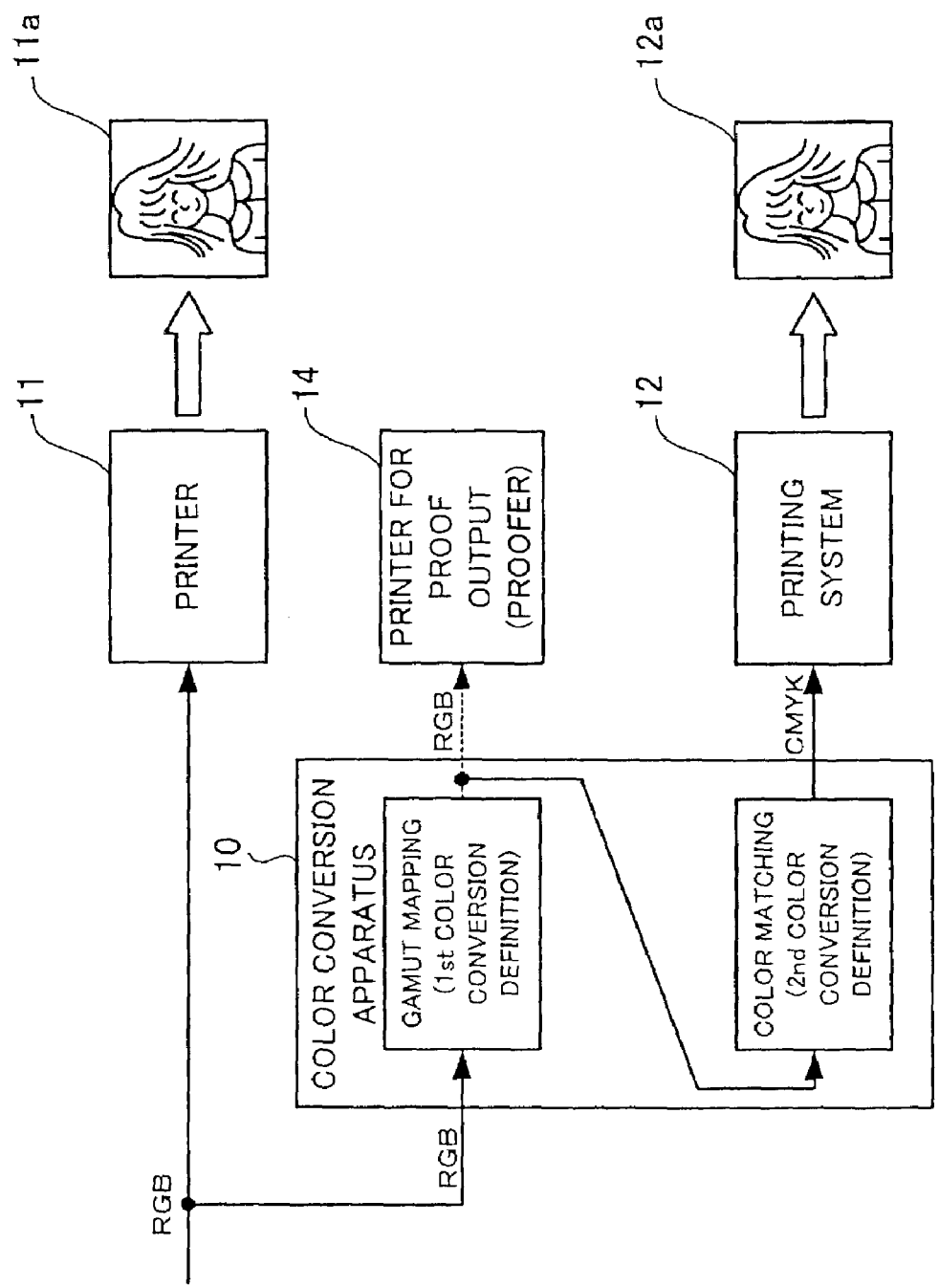
FIG. 46 is a view showing a system adopting a color conversion definition created in accordance with the modification of the present invention.

FIG. 46 is a view showing a system adopting a color conversion definition created in accordance with the modification of the present invention. Here, there will be described a position of the modification of the present invention, referring to FIG. 46.

For the system shown in FIG. 1, according to the system shown in FIG. 46, there is assumed an imaginary proofer 14 in which its color reproduction area is completely coincident with the color reproduction area of the printing system 12, instead of the actual proofer 13 shown in FIG. 1 that is used for previous confirmation for the printing image 12a. The above-mentioned first color conversion definition is created as one for converting RGB data for the input side to RGB data for the an imaginary proofer 14. The imaginary proofer 14 is defined by the color reproduction quality (a proofer profile) which is created in such a way that its color reproduction area is completely coincident with the color reproduction area of the printing system 12. It is acceptable that such a proofer profile is created by either the trial and error from the proofer profile of the actual proofer or the logical computation.

According to the modification shown in FIG. 46, as the imaginary second device referred to in the present invention, there is adopted the proofer 14. The reason why the proofer 14 is adopted is that a replacement of the second device by the proofer in the ordinary printing makes it easy for understanding. Any one is acceptable, as the imaginary second device referred to in the present invention, which has a color reproduction area that is coincident with the color reproduction area of the printing system 12.

Embodiments of the modification shown in FIG. 46 can be obtained by a replacement of the proofer 13 by the proofer 14. Thus, the redundant explanation will be omitted.

As mentioned above, according to the present invention, it is possible to convert coordinate points of an RGB color space into coordinate points in a CMYK color space, which is capable of obtaining a printed image that is excellent in the printability and is reproduced faithfully on colorimetric basis with a color having a preferable approximation even if it is different.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion definition creating method of creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating method comprising:

a first color conversion definition creating step of creating a first color conversion definition for converting the coordinate points within the color reproduction area of the first device in the first RGB color space into coordinate points within a color reproduction area of a second device mediating between an image and image data, in a second RGB color space, depending on the second device, the color reproduction area of the second device being closer to the color reproduction area of the printing than the first device; and a second color conversion definition creating step of creating a second color conversion definition for converting the coordinate points within the color reproduction area of the second device in the second RGB color space into coordinate points within a color reproduction area of printing in a CMYK color space, wherein the first color conversion definition creating step is a step of creating a color conversion definition defining an association between the coordinate points in the first RGB color space and the coordinate points in the second RGB color space via a first coordinate conversion step, a second coordinate conversion step, and a third coordinate conversion step, the first coordinate conversion step converting coordinate points within the color reproduction area of the first device in the first RGB color space depending on the first device into the coordinate points within the color reproduction area of the first device transferred to a common color space of device non-dependence, the second coordinate conversion step converting the coordinate points within the color reproduction area of the first device transferred to the common color space, which is obtained by the first coordinate conversion step, into the coordinate points within the color reproduction area of the second device transferred to the common color space, and the third coordinate conversion step converting the coordinate points within the color reproduction area of the second device transferred to the common color space, which is obtained by the second coordinate conversion step, into the coordinate points within the color reproduction area of the second device in the second RGB color space, and wherein when a first coordinate point within the color reproduction area of the first device transferred to the common color space is converted into a second coordinate point within the color reproduction area of the second device transferred to the common color space, the second coordinate conversion step includes a first step of:

determining a first reference coordinate point in the color reproduction area of the first device transferred to the common color space, in accordance with the first coordinate point;

determining a second reference coordinate point associated with the first reference coordinate point, in the color reproduction area of the second device transferred to the common color space, in accordance with a first algorithm including a coordinate operation in at least either one of the first RGB color space and the second RGB color space; and determining the second coordinate point associated with the first coordinate point in accordance with a second algorithm using a basic difference vector that is representative of a difference between the first reference coordinate point and the second reference coordinate point.

2. A color conversion definition creating method of creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating method comprising:

a first color conversion definition creating step of creating a first color conversion definition for converting the coordinate points within the color reproduction area of the first device in the first RGB color space into coordinate points within a color reproduction area of a second device mediating between an image and image data, in a second RGB color space, depending on the second device, the color reproduction area of the second device being closer to the color reproduction area of the printing than the first device; and a second color conversion definition creating step of creating a second color conversion definition for converting the coordinate points within the color reproduction area of the second device in the second RGB color space into coordinate points within a color reproduction area of printing in a CMYK color space, wherein the second color conversion definition creating step comprises:

a first conversion step of converting coordinate points in the second RGB color space into coordinate points within the common color space of device non-dependence in accordance with a color reproduction quality of the second device;

a second conversion step of converting the coordinate points within the common color space determined in the first conversion step into coordinate points within a CMY color space;

a first K-function creating step of setting up a first color conversion parameter and determining a first function of K from coordinate points of C=M=Y of coordinate points in the CMY color space determined in the second conversion step in accordance with a data conversion algorithm for converting the coordinate points in the CMY color space into coordinate points in the CMYK color space having a printability according to the first color conversion parameter set up;

a first association creating step of determining coordinate points within the CMYK color space bound by the first function of K determined in the first K-function creating step, associated with coordinate points of C=M=Y of the coordinate points within the CMY color space determined in the second conversion step, in accordance with a color reproduction quality of the printing, so that a first association for providing an association between the coordinate points in the CMY color space of C=M=Y and the coordinate points in the CMYK color space is determined;

a second K-function creating step of setting up a second color conversion parameter based on the first association determined in the first association creating step instead of the first color conversion parameter, on the data conversion algorithm, and determining a second function of K from the coordinate points consisting of an arbitrary combination of C, M and Y in the CMY color space determined in the second conversion step, in accordance with the data conversion algorithm on which the second color conversion parameter is set up; and a second association creating step of determining coordinate points in the CMYK color space bound by the second function of K determined in the second K-function creating step, associated with the same coordinate points as the coordinate points in the common color space associated with the coordinate points consisting of an arbitrary combination of C, M and Y in the CMY color space determined in the second conversion step, in accordance with a color reproduction quality of the printing, so that a second association for providing an association between the coordinate points consisting of an arbitrary combination of C, M and Y in the CMY color space and the coordinate points in the CMYK color space is determined.

3. A color conversion definition creating method of creating a color conversion definition converting coordinate points within a color reproduction area of a first device mediating between an image and image data, in a first RGB color space, depending on the first device, into coordinate points within a color reproduction area of printing in a CMYK color space for printing, the color conversion definition creating method comprising:

a first color conversion definition creating step of creating a first color conversion definition for converting the coordinate points within the color reproduction area of the first device in the first RGB color space into coordinate points within a color reproduction area of an imaginary second device mediating between an image and image data, in a second RGB color space, depending on the imaginary second device, the imaginary second device having a color reproduction area that is coincident with the color reproduction area for printing; and a second color conversion definition creating step of creating a second color conversion definition for converting the coordinate points within the color reproduction area of the second device in the second RGB color space into coordinate points within a color reproduction area of printing in a CMYK color space, wherein the second color conversion definition creating step comprises:

a first conversion step of converting coordinate points in the second RGB color space into coordinate points within the common color space of device non-dependence in accordance with a color reproduction quality of the second device;

a second conversion step of converting the coordinate points within the common color space determined in the first conversion step into coordinate points within a CMY color space;

a first K-function creating step of setting up a first color conversion parameter and determining a first function of K from coordinate points of C=M=Y of coordinate points in the CMY color space determined in the second conversion step in accordance with a data conversion algorithm for converting the coordinate points in the CMY color space into coordinate points in the CMYK color space having a printability according to the first color conversion parameter set up;

a first association creating step of determining coordinate points within the CMYK color space bound by the first function of K determined in the first K-function creating step, associated with coordinate points of C=M=Y of the coordinate points within the CMY color space determined in the second conversion step, in accordance with a color reproduction quality of the printing, so that a first association for providing an association between the coordinate points in the CMY color space of C=M=Y and the coordinate points in the CMYK color space is determined;

a second K-function creating step of setting up a second color conversion parameter based on the first association determined in the first association creating step instead of the first color conversion parameter, on the data conversion algorithm, and determining a second function of K from the coordinate points consisting of an arbitrary combination of C, M and Y in the CMY color space determined in the second conversion step, in accordance with the data conversion algorithm on which the second color conversion parameter is set up; and a second association creating step of determining coordinate points in the CMYK color space bound by the second function of K determined in the second K-function creating step, associated with the same coordinate points as the coordinate points in the common color space associated with the coordinate points consisting of an arbitrary combination of C, M and Y in the CMY color space determined in the second conversion step, in accordance with a color reproduction quality of the printing, so that a second association for providing an association between the coordinate points consisting of an arbitrary combination of C, M and Y in the CMY color space and the coordinate points in the CMYK color space is determined.

* * * * *